US012753259B2

(12) United States Patent
Azoulay et al.

(10) Patent No.: US 12,753,259 B2
(45) Date of Patent: Oct. 6, 2026

(54) NARROW BAND GAP CONJUGATED POLYMERS EMPLOYING CROSS-CONJUGATED DONORS USEFUL IN ELECTRONIC DEVICES

(71) Applicants: THE UNIVERSITY OF SOUTHERN MISSISSIPPI, Hattiesburg, MS (US); THE REGENTS OF THE UNIVERSITY OF CALIFORNIA, Oakland, CA (US)

(72) Inventors: Jason D. Azoulay, Hattiesburg, MS (US); Benjamin A. Zhang, San Mateo, CA (US); Yi Liu, San Ramon, CA (US)

(73) Assignees: THE UNIVERSITY OF SOUTHERN MISSISSIPPI, Hattiesburg, MS (US); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 1157 days.

(21) Appl. No.: 17/660,213

(22) Filed: Apr. 22, 2022

(65) Prior Publication Data

US 2022/0332870 A1 Oct. 20, 2022

Related U.S. Application Data

(63) Continuation-in-part of application No. 16/327,770, filed as application No. PCT/US2017/048213 on Aug. 23, 2017, now Pat. No. 11,312,819.

(Continued)

(51) Int. Cl.
*C08F 228/06* (2006.01)

(52) U.S. Cl.
CPC .................................. *C08F 228/06* (2013.01)

(58) Field of Classification Search
CPC ...... C08G 2261/3223; C08G 2261/126; C08G 2261/124; C08G 2261/95; C08G 2261/91; C07D 417/14
See application file for complete search history.

(56) References Cited

U.S. PATENT DOCUMENTS 5,510,438 A 4/1996 Ferraris et al.
5,552,236 A 9/1996 Ohtake et al.

(Continued)

FOREIGN PATENT DOCUMENTS

EP 0223336 A1 8/1987
EP 1756193 B1 11/2009

(Continued)

OTHER PUBLICATIONS

Azoulay, Jason D., et al. "Bridgehead Imine Substituted Cyclopentadithiophene Derivatives: An Effective Strategy for Band Gap Control in Donor-Acceptor Polymers." Macromolecules 46.4 (2013): 1337-1342.

(Continued)

*Primary Examiner* — Shane Fang
(74) *Attorney, Agent, or Firm* — Mendelsohn Dunleavy, P.C.; Kevin J. Dunleavy; Kristina Harmon

(57) ABSTRACT

The invention provides for new polymer compounds and methods for the preparation of modular narrow band gap conjugated compounds and polymers that incorporate exocyclic cross-conjugated donors or substituents, as well as novel monomer components of such polymers and the resulting products which comprise materials and useful electronic devices with novel functionality.

15 Claims, 11 Drawing Sheets

P1

P2

P3

Related U.S. Application Data

(60) Provisional application No. 62/378,600, filed on Aug. 23, 2016.

(56) References Cited

U.S. PATENT DOCUMENTS

| | | | |
|---|---|---|---|
| 5,629,665 | A | 5/1997 | Kaufmann et al. |
| 6,083,557 | A | 7/2000 | Belcher et al. |
| 6,262,306 | B1 | 7/2001 | Leriche et al. |
| 6,835,576 | B2 | 12/2004 | Matsuzaki et al. |
| 6,982,514 | B1 | 1/2006 | Lu et al. |
| 8,283,438 | B2 | 10/2012 | David et al. |
| 8,471,204 | B2 | 6/2013 | Bornfreund |
| 8,507,865 | B2 | 8/2013 | Boberl et al. |
| 8,658,751 | B2 | 2/2014 | Han et al. |
| 8,809,487 | B2 | 8/2014 | Seferos et al. |
| 9,035,016 | B2 | 5/2015 | Seferos et al. |
| 9,127,020 | B2 | 9/2015 | Hildebrandt et al. |
| 9,985,211 | B2 | 5/2018 | Blouin et al. |
| 10,426,801 | B2 | 10/2019 | Aboody et al. |
| 10,914,637 | B2 | 2/2021 | Lin et al. |
| 11,312,819 | B2 | 4/2022 | Azoulay et al. |
| 2003/0062480 | A1 | 4/2003 | Kanzaki |
| 2004/0115437 | A1 | 6/2004 | Dammann et al. |
| 2004/0187917 | A1 | 9/2004 | Pichler |
| 2006/0269664 | A1 | 11/2006 | Gleason et al. |
| 2007/0014939 | A1 | 1/2007 | Gaudiana et al. |
| 2007/0111027 | A1 | 5/2007 | Chen et al. |
| 2007/0138945 | A1 | 6/2007 | Hoshi et al. |
| 2007/0181179 | A1 | 8/2007 | Brabec et al. |
| 2010/0181552 | A1 | 7/2010 | So |
| 2011/0006287 | A1 | 1/2011 | You et al. |
| 2011/0028656 | A1 | 2/2011 | Bazan et al. |
| 2011/0049367 | A1 | 3/2011 | Forrest et al. |
| 2011/0132460 | A1 | 6/2011 | Yang et al. |
| 2012/0153274 | A1* | 6/2012 | Sonar .................. H01L 51/0036 257/40 |
| 2012/0178893 | A1 | 7/2012 | Martin et al. |
| 2013/0032791 | A1 | 2/2013 | Bazan et al. |
| 2013/0092912 | A1 | 4/2013 | You |
| 2013/0225421 | A1 | 8/2013 | Li et al. |
| 2014/0080717 | A1 | 3/2014 | Li et al. |
| 2014/0080986 | A1 | 3/2014 | Bazan et al. |
| 2015/0056142 | A1 | 2/2015 | Tao et al. |
| 2016/0118444 | A1 | 4/2016 | Liu |
| 2016/0290998 | A1 | 10/2016 | Leif et al. |
| 2017/0069814 | A1 | 3/2017 | Bazan et al. |
| 2017/0324901 | A1 | 11/2017 | Mandelli |
| 2018/0017679 | A1 | 1/2018 | Valouch et al. |
| 2019/0194385 | A1 | 6/2019 | Azoulay et al. |
| 2020/0052216 | A1 | 2/2020 | Mitchell et al. |
| 2020/0095371 | A1 | 3/2020 | Tropp et al. |
| 2020/0362098 | A1 | 11/2020 | Azoulay et al. |
| 2021/0088449 | A1 | 3/2021 | Makkad et al. |
| 2021/0293706 | A1 | 9/2021 | Tropp et al. |

FOREIGN PATENT DOCUMENTS

| | | | | |
|---|---|---|---|---|
| EP | 1743388 | B1 | 3/2012 | |
| JP | 2011116961 | A | 6/2011 | |
| JP | 2013254943 | A | 12/2013 | |
| JP | 2016065218 | A | 4/2016 | |
| KR | 10-2015-0113631 | A | 10/2015 | |
| WO | 99/19883 | A1 | 4/1999 | |
| WO | 2007016454 | A2 | 2/2007 | |
| WO | 2011028827 | A2 | 3/2011 | |
| WO | 2011028827 | A3 | 3/2011 | |
| WO | 2011052725 | A1 | 5/2011 | |
| WO | WO 2011052725 | * | 5/2011 | ............ C08G 61/12 |
| WO | 2011156478 | A2 | 12/2011 | |
| WO | 2011156478 | A3 | 12/2011 | |
| WO | 2012136675 | A3 | 10/2012 | |
| WO | 2012174561 | A2 | 12/2012 | |
| WO | 2013124688 | A3 | 8/2013 | |
| WO | 2013168709 | A1 | 11/2013 | |
| WO | 2017125456 | A1 | 7/2017 | |
| WO | 2017180998 | A2 | 10/2017 | |
| WO | 2018009924 | A1 | 1/2018 | |
| WO | 2018039347 | A2 | 3/2018 | |
| WO | 2018039347 | A3 | 3/2018 | |
| WO | 2018085055 | A1 | 5/2018 | |
| WO | 2019012514 | A1 | 1/2019 | |
| WO | 2022026882 | A1 | 2/2022 | |

OTHER PUBLICATIONS

Azoulay, Jason D., et al. "Narrow Band Gap Conjugated Polymers for Emergent Optoelectronic Technologies." Proc. of SPIE, Light Manipulating Organic Materials and Devices II. vol. 9564. (2015): 46-51.

Foster, Michael E., et al. "Solution-Processable Donor-Acceptor Polymers with Modular Electronic Properties and Very Narrow Bandgaps." Macromolecular Rapid Communications 35.17 (2014): 1516-1521.

Grimm, Bruno, et al. "Structural dependence of the optical properties of narrow bandgap semiconductors with orthogonal donor-acceptor geometries." Chemical Science 4.4 (2013): 1807-1819.

Rodovsky, Deanna B., et al. "Quantifying the Relationship between the Maximum Achievable Voltage and Current Levels in Low-Bandgap Polymer Photovoltaics." The Journal of Physical Chemistry C 117.49 (2013): 25955-25960.

Wright, Brendan F., et al. "Driving Force Dependence of Electron Transfer Kinetics and Yield in Low-Band-Gap Polymer Donor-Acceptor Organic Photovoltaic Blends." The Journal of Physical Chemistry C 119.23 (2015): 12829-12837.

Non-Final Office Action for U.S. Appl. No. 16/404,622; dated Dec. 19, 2022 (13 pages).

Extended European Search Report for corresponding European application No. 19887229.3 dated Jun. 29, 2022 (13 pages).

Davis, Andrew R., et al. "Surface Grafting of Vinyl-Functionalized Poly(fluorene)s via Thiol-Ene Click Chemistry." Langmuir 30.15 (2014): 4427-4433.

Davis, Andrew R., et al. "Controlling Optoelectronic Behavior in Poly(fluorene) Networks using Thiol-Ene Thoto-Click Chemistry." Macromolecules 48.6 (2015): 1711-1722.

Hoyle, Charles E., et al. "Thiol-Ene Click Chemistry." Angewandte Chemie International Edition 49.9 (2010): 1540-1573.

Killops, Kato L., et al. "Robust, Efficient, and Orthogonal Synthesis of Dendrimers via Thiol-Ene "Click" Chemistry." Journal of the American Chemical Society 130.15 (2008): 5062-5064.

Non-Final Office Action for U.S. Appl. No. 17/139,707; dated Jun. 27, 2022 (10 pages).

Tanwar, Arvin Sain, et al. ""Receptor free" inner filter effect based universal sensors for nitroexplosive picric acid using two polyfluorene derivatives in the solution and solid states." Analyst 144.2 (2019): 669-676.

Hildner, Richard. "Investigation of the Photophysical Properties of pi-Conjugated Polymers: A Study by Non-Linear, Time-Resolved, and Single-Molecule Spectroscopy." Dissertation, University of Bayreuth (2008): 1-147.

Kumar, Jatin N., et al. "Challenges and opportunities of polymer design with machine learning and high throughput experimentation." MRS Communications 9.2 (2019): 537-544.

Communication pursuant to Article 94(3) EPC for corresponding European application No. 17844346.1; dated Jun. 23, 2023 (6 pages).

Chemical Abstracts Service, "Polymeric compound for photoelectric conversion devices." Sumitomo Chemical Co., Ltd., Database accession No. 2011:557876 (2011): 1-2.

Chemical Abstracts Service, "Organic thin film solar cell, monomers and organic semiconductor material composition used in organic thin film solar cell." Fujifilm Corporation, Database accession No. 2013:1763412 (2013): 1-29.

International Search Report and Written Opinion for corresponding International application No. PCT/US19/30950; dated Mar. 19, 2020 (20 pages).

Guarino, Vincenzo, et al. "Electro-Active Polymers (EAPs): A Promising Route to Design Bio-Organic/Bioinspired Platforms with

(56) References Cited

OTHER PUBLICATIONS on Demand Functionalities." Polymers 8.5 Article 185 (2016): 1-26.
Jonas, Friedrich, et al. "Conductive modifications of polymers with polypyrroles and polythiophenes." Synthetic Metals 41.3 (1991): 831-836.
Mirabedini, Azadehsadat, et al. "Developments in conducting polymer fibres: from established spinning methods toward advanced applications." RSC Advances 6.50 (2016): 44687-44716.
Roncali, J. "Molecular Engineering of the Band Gap of π-Conjugated Systems: Facing Technological Applications." Macromolecular Rapid Communications 28.17 (2007): 1761-1775.
Hai, Jiefeng, et al. "Synthesis and photovoltaic performance of novel thiophenyl-methylene-9H-fluorene-based low bandgap polymers." Polymer 54.18 (2013): 4930-4939.
Liu, Jun, et al. "Highly crystalline and low bandgap donor polymers for efficient polymer solar cells." Advanced Materials 24.4 (2012): 538-542.
London, Alexander E., et al. "Donor-acceptor polymers with tunable infrared photoresponse." Polymer Chemistry 8.19 (2017): 2922-2930.
Wu, Zhenghui, et al. "Temperature-Dependent Detectivity of Near-Infrared Organic Bulk Heterojunction Photodiodes." ACS Applied Materials & Interfaces 9.2 (2017): 1654-1660.
Taylor, D. M., et al. "Memory effect in the current-voltage characteristic of alow-band gap conjugated polymer", Journal of Applied Physics, American Institute of Physics, 90.1 (2001): 306-309.
Cheng, Yen-Ju, et al. "Synthesis of conjugated polymers for organic solar cell applications." Chemical Reviews 109.11 (2009): 5868-5923.
Lee, Kwang-hoi, et al. "Synthesis and photovoltaic behaviors of narrow-band-gap π-conjugated polymers composed of dialkoxybenzodithiophene-and thiophene-based fused aromatic rings." Journal of Polymer Science Part A: Polymer Chemistry 49.6 (2011): 1427-1433.
Wu, Zhenghui, et al. "Elucidating the detectivity limits in shortwave infrared organic photodiodes." Advanced Functional Materials 28.18 (2018): 1800391-1800400.
Willot, Pieter, et al. "The Use of Cyclopenta[2,1-b;3,4-b']dithiophene Analogues for the Development of Low-Bandgap Materials." Macromolecular Chemistry and Physics 213.12 (2012): 1216-1224.
Gautier, Christelle, et al. "A poly (cyclopentadithiophene) matrix suitable for electrochemically controlled DNA delivery." Analytical Chemistry 79.20 (2007): 7920-7923.
Kostianovskii, Vladislav A., et al. "Synthesis of novel conjugated polymers comprising modified cyclopentadithiophene units in the main chain." High Performance Polymers 29.6 (2017): 670-676.
Kim, Hyonwoong, et al. "Solution-processed phototransistors combining organic absorber and charge transporting oxide for visible to infrared light detection." ACS Applied Materials & Interfaces 11.40 (2019): 36880-36885.
Benincori, T., et al.: "Steric Control of Conductivity in Highly Conjugated Polythiophenes . . . " Chemistry Of Materials 13.5 (2001): 1665-1673.
Loganathan, Kavithaa, et al. "Δ4, 4 '-Dicyclopenta [2, 1-b: 3, 4-b '] dithiophene. A Conjugated Bridging Unit for Low Band Gap Conducting Polymers." Chemistry of Materials 15.9 (2003): 1918-1923.
Berlin, Anna, et al. "New low-gap polymers from 3,4-ethylenedioxythiophene-bis-substituted electron-poor thiophenes. The roles of thiophene, donor-acceptor alternation, and copolymerization in intrinsic conductivity." Chemistry of Materials 16.19 (2004): 3667-3676.
Bünnagel, Torsten W., et al. "A Novel Poly [2, 6-(4-dialkylmethylenecyclopentadithiophene)] with "in-Plane" Alkyl Substituents." Macromolecules 25.39 (2006): 8870-8872.
Pao, Yu-Chieh, et al. "Synthesis and molecular properties of tricyclic biselenophene-based derivatives with nitrogen, silicon, germanium, vinylidene, and ethylene bridges." Organic Letters 16.21 (2014): 5724-5727.
Sabuj, Md. Abdus, et al. "Benzobisthiadiazole-based high-spin donor-acceptor conjugated polymers with localized spin distribution." Materials Advances 2.9 (2021): 2943-2955.
Hou, Jianhui, et al. "Bandgap and molecular energy level control of conjugated polymer photovoltaic materials based on benzo [1, 2-b: 4, 5-b'] dithiophene." Macromolecules 41.16 (2008): 6012-6018.
Extended European Search Report for corresponding European application No. 19869325.1; dated Feb. 16, 2022 (21 pages).
Lowe, Andrew B. "Thiol-ene "click" reactions and recent applications in polymer and materials synthesis: a first update." Polymer Chemistry 5.17 (2014): 4820-4870.
Feldman, Kathleen E., et al. "Functional Conducting Polymers via Thiol-ene Chemistry." Biosensors 2.3 (2012): 305-317.
Ibrahimova, Vüsala, et al. "Optical and Electronic Properties of Fluorene-Based Copolymers and Their Sensory Applications." Journal of Polymer Science Part A: Polymer Chemistry 51.4 (2013): 815-823.
Wei, Bin, et al. "Post-polymerization functionalization of poly(3,4-propylenedioxythiophene) (PProDOT) via thiol-ene click chemistry.", Journal of Materials Chemistry B 3.25 (2015): 5028-5034.
International Search Report and Written Opinion for International application No. PCT/UST2019/052489; dated Jul. 23, 2020 (11 pages).
International Search Report and Written Opinion for International application No. PCT/US21/43986; dated Dec. 27, 2021 (11 pages).
Abdellah, Alaa, et al. "Transfer printed P3HT/PCBM photoactive layers: From material intermixing to device characteristics." ACS Applied Materials & Interfaces 8.4 (2016): 2644-2651.
London, Alex E., et al. "A high-spin ground-state donor-acceptor conjugated polymer." Science Advances 5.5 Article eaav2336 (2019): 1-9.
Vella, Jarrett H., et al. "Broadband infrared photodetection using a narrow bandgap conjugated polymer." Science Advances 7.24 Article eabg2418 (2021): 1-7.
Adams, Daniel, et al., U.S. Appl. No. 63/253,529, filed Oct. 23, 2021. "Molecular and Macromolecular Materials & Compositions Exhibiting Magnetic Anisotropies & Ferromagnetism." (34 pages).
Azoulay, Jasond D., et al. U.S. Appl. No. 63/197,352, filed Jun. 5, 2021. "Infrared Bolometer Based on with Intrinsically Conductive Open-Shell Conjugated Polymers." (23 pages).
First Office Action for Chinese application No. 201780065658.2; dated Nov. 24, 2020 (17 pages).
Second Office Action for Chinese application No. 201780065658.2; dated Aug. 31, 2021 (10 pages).
International Preliminary Report on Patentability for International Application No. PCT/US2017/048213; dated Mar. 26, 2019 (6 pages).
Office action for corresponding European application No. 17 844 346.1-1102; dated Nov. 5, 2025 (12 pages).

* cited by examiner

P1

P2

P3

Donor Polymer

Molecular Acceptor a)

P4a b)

P4b c)

[70]PCBM b c

NARROW BAND GAP CONJUGATED POLYMERS EMPLOYING CROSS-CONJUGATED DONORS USEFUL IN ELECTRONIC DEVICES

CROSS-REFERENCE TO RELATED APPLICATIONS

This application claims benefit of U.S. Provisional Patent Application No. 62/378,600 filed Aug. 23, 2016, and U.S. patent application Ser. No. 16/327,770, filed on Feb. 22, 2019, both of which applications are hereby incorporated by reference in their entirety.

STATEMENT OF GOVERNMENT SUPPORT

This invention was made with government support under grant/contract DE-AC02-05CH11231 awarded by the U.S. Department of Energy. The government has certain rights in the invention.

FIELD OF THE INVENTION

This invention relates to the field of polymers and more specifically to novel polymers and methods of preparing narrow band gap conjugated polymers utilizing exocyclic cross-conjugated donors, as well as novel monomer components of such polymers, and the resulting products that comprise materials and useful electronic and optoelectronic devices having novel functionality. The materials, methods, and compositions of the invention provide the ability to fine-tune structural and/or electronic properties to obtain modular, solution-processable donor-acceptor (DA) conjugated polymers.

BACKGROUND OF THE INVENTION

The present invention relates generally to new polymer compounds and methods of preparation of modular narrow band gap conjugated compounds and polymers incorporating exocyclic cross-conjugated substituents, as well as novel monomer components of such polymers and the resulting products. These products comprise materials and useful electronic devices with novel functionalities.

Conjugated organic molecules are playing a pivotal role in the development of a new generation of electronic materials. These materials effectively produce and harvest visible light and find utility in a variety of commercially relevant optoelectronic technologies offering distinct manufacturing paradigms. There is currently considerable interest in expanding the scope of these materials to afford complementary functionality in the NIR-SWIR spectral regions and to endow functionality relevant in emergent technologies. Considerable effort has therefore been directed toward the identification of suitable materials. However, a direct way to tailor structural, electronic, and optical properties remains a critical challenge and precludes further investigation.

Donor-acceptor (DA) conjugated copolymers comprised of alternating electron-rich (donor) and electron-poor (acceptor) moieties have emerged as the dominant class of high-performance materials to date and offer properties not attainable in conjugated homopolymers. These materials exhibit improved efficiencies of charge separation and transport, strong absorption profiles that can be adjusted across a wide wavelength (λ) range, high chemical stability, and properties that can be readily tuned through chemical modification. The primary photoexcitations in these materials result in bound electron-hole pairs (excitons), which require a suitable downhill energy offset (typically facilitated by a distinct molecular electron acceptor) so that the electron and hole may overcome their mutual Coulomb attraction. In prototypical light-harvesting devices, the products of exciton dissociation are unbound charge carriers and bound interfacial polaron pairs. The formation of high yields of polaronic species and increased charge generation yields arises as a result of the built-in intramolecular charge-transfer in DA systems. While many strategies exist to modify the properties of conjugated materials, molecular species with absorption profiles above 1 μm (comparable to Si) are relatively rare, difficult to access, and generally exhibit low optical sensitivity. The requisite to form a type-II (staggered) heterojunction with appropriately positioned energy levels and maintain a suitable energetic offset between materials sets further complicates identifying combinations to harness longer 2 light. Other constraints relate to diminishing exciton lifetimes as the band gap is reduced due to exciton-phonon induced recombination and reduced efficiencies of charge separation.

State-of-the-art polymer photodetectors (PPDs) exhibit a broad spectral response (300-1,450 nm), high detectivities ($10^{12}$-$10^{13}$ cm $Hz^{0.5}$ $W^{-1}$), and a linear dynamic range (>100 dB at 500 and 800 nm), affording performance parameters better than their inorganic counterparts, while operating at room temperature. The optical sensitivity in the NIR arises from a long absorption tail emanating from vibronic features within the molecular species and as such limits the achievable performance. These difficulties have motivated the development of hybrid organic-inorganic devices using polymeric and small-molecule materials in conjunction with II-VI quantum dots (with external quantum efficiency (EQE) <1% at λ>1 μm) or single-walled carbon nanotubes (EQE≈2% at λ=1.15 and 1.3 μm). In contrast, fused porphyrins can be modified to exhibit a longer λ response by spatially extending the conjugation of the π-electron system, but suffer from low efficiencies of charge separation, difficulties associated with synthesis, limited utility, and therefore only result in low EQEs (6.5% at 2=1.35 μm). Detection in the information-rich NIR-SWIR spectral regions can therefore only be achieved using conventional solid-state inorganic-based systems, such as those based on Ge and alloys of $Ga_xIn_{1-x}As$. These suffer from limited modularity, intrinsic fragility, require cooling to achieve reasonable performance, and are largely incompatible with Si CMOS (complementary metal-oxide-semiconductor) processes. Sensing in these spectral regions forms the basis for a wide variety of scientific and technological applications, such as image sensing, optical communications, environmental monitoring, remote control, day- and night-time surveillance, chemical/biological sensing, and spectroscopic and medical instrumentation. Solution-processable photodetectors that do not require cooling to obtain high detectivities would be a transformative technological breakthrough.

The advantages of being able to precisely influence the electronic structure of conjugated copolymers extends well beyond their applicability in light harvesting applications. New technologies, particularly in the areas of non-linear optical materials, organic memories, NIR organic light emitting diodes, electrochromics, thin-film transistors, integrated circuits, improved photovoltaic devices, energy storage, defense applications, and healthcare engineering provide relevant examples. Moreover, emergent technologies will rely on materials with progressively more complex properties, such as redox amphotericity, open shell ground state (GS) configurations, magnetic properties, spin injection/ transport, thermoelectric properties, singlet fission phenomena, strong electron correlation effects, and improved stability. Hybrid organic-inorganic systems are also anticipated to overcome problems associated with both fields, but require a more thorough understanding of energy transfer between various components. Emergent technologies therefore rely on revolutionary breakthroughs primarily in the availability of new materials and control over the physical properties.

Molecular design strategies aimed at narrowing the band gap include stabilization of the quinoidal resonance structure, extension of aromatic character, covalent rigidification of repeat units, and variations in the occupancy of frontier orbitals. Soluble polythiophene derivatives, such as regioregular poly(3-hexylthiophene), typically exhibit a band gap ~2 eV. A significant reduction is achieved in poly(isothianaphthene) ($E_g$~1 eV), in which an appended aromatic substituent favors a quinoid-like ground state geometry. Fused ring analogs of thiophenes, such as 4H-cyclopenta[2,1-b:3,4-b']dithiophene (CPDT), have demonstrated utility as donors in the construction of narrow band gap copolymers as a result of extended conjugation, reduced frontier orbital energy separation, and stronger intermolecular interactions. In combination with highly electronegative, proquinoidal acceptors such as benzobisthiadiazole, solution-processable materials with very narrow band gaps $$\left(E_g^{opt} \sim 0.5 - 0.6 \text{ eV}\right)$$

have been generated, but do not possess properties (electronic structure) appropriate for detecting light.

Bridgehead imine substituted CPDT structural units can be used to systematically modify the HOMO-LUMO (highest occupied/lowest unoccupied molecular orbital) positions of DA copolymers by virtue of competing electronic effects between the cross-conjugated imine aryl functionality and the polymer backbone. This structural motif, in combination with strong acceptors with progressively delocalized π-systems, results in the capability to fine-tune structural and electronic features, and overcome conjugation saturation behavior so as to achieve very narrow optical band gaps $$\left(E_g^{opt} < 0.5 \text{ eV}\right).$$

This strategy affords modular DA copolymers with broad and long wavelength light absorption in the IR, materials with some of the narrowest band gaps reported to date, and elucidates important aspects of the role of chemical structure in controlling the primary photoexcitations in conjugated copolymers. A further narrowing of the band gap is not possible in these systems, thereby precluding access to materials with primary photoexcitations in the SWIR and extending into the MWIR spectral regions. Furthermore, utility in other applications which would require further band gap and electronic control is not possible. The imine functionality, with its electron withdrawing character and characteristic lone pair, largely dictate the electronic structure of the materials and preclude high charge generation yields. Owing to the known planarity of building blocks based on bridgehead olefins (C═C) (in contrast to the modest curvature of bridgehead imines, N, C, and Si atoms), the necessary modifications to lead to more significant narrowing of the band gap and better control of the resultant properties of the materials is therefore possible.

The capability of the invention to systematically control the structural and electronic properties and the band gap $$\left(E_g^{opt} = \text{optical band gap}\right)$$

of conjugated copolymers within the $$1.2 \text{ eV} > E_g^{opt} > 0.1 \text{ eV}$$

range across multiple systems, and employing a variety of molecular configurations affords unprecedented opportunities for basic, potentially transformative materials science research. These results afford a further narrowing of the band gap thereby affording polymers that can interact with a substantially larger portion of the electromagnetic spectrum and afford different physical properties than previously possible. The isomorphic olefin variant also provides for a different electronic structure (such as adaptation of tunable open-shell ground states) when compared to other exocyclic substituents and molecular configurations. Such narrow band gaps afforded through the materials, methods, and compositions of the invention provide access to novel functionality, physical properties, and new electrical and optoelectronic devices.

A need exists for new narrow band gap conjugated polymers and compounds and methods to make such compounds to overcome the long-standing issues of conjugated polymers, which limit current electronic and optoelectronic devices and materials. The present invention provides such compounds and methods, as well as novel monomer components of such polymers, and resulting devices, materials, and products having materials and devices with new functionalities.

SUMMARY OF THE INVENTION

The present invention relates generally to the method of preparation of modular narrow band gap conjugated polymers incorporating exocyclic cross-conjugated substituents, as well as novel monomer components of such polymers, and the resulting products. The products comprise materials and useful electronic and optoelectronic devices with novel functionality. These materials, methods, and compositions afford the capability to fine-tune structural and electronic properties to achieve modular, solution-processable donor-acceptor (DA) conjugated polymers with absorption profiles that span technologically-relevant wavelength (λ) ranges from about $$0.7 \text{ μm} < \lambda < 8 \text{ μm}\left(E_g^{opt} < 0.15 \text{ eV}\right),$$

thereby affording polymers that can interact with a substantially larger portion of the electromagnetic spectrum than previously possible. Such control suggests that a further narrowing of the hand gap is possible and also results in new physical properties, such as intrinsic electrical conductivity (in the absence of "dopants") and photoconductive devices that operate in the infrared region of the electromagnetic spectrum.

The capability to systematically control the structural and electronic properties and the band gap of conjugated copolymers with this degree of synthetic precision affords unprecedented opportunities for basic, potentially transformative materials science research. Applicability in light harvesting applications, non-linear optical materials, NIR organic light emitting diodes, electrochromics, thin-film transistors, integrated circuits, improved photovoltaic devices, energy storage, defense applications, and healthcare engineering provide relevant examples. Emergent technologies will rely on materials with progressively more complex properties, such as redox amphotericity, open shell ground state (GS) configurations, magnetic properties, spin injection/transport, thermoelectric properties, singlet fission phenomena, strong electron correlation effects, and improved stability anticipated to arise from structural, electronic, and band gap control.

The present invention overcomes two major long-standing issues associated with conjugated polymers: 1) Control over the frontier orbital energetics (separation, position, and alignment), ground state electronic configurations, interchain arrangements, solid-state properties, and other molecular features; and 2) access to narrow band gap (<1 eV) donor-acceptor conjugated copolymers with tunable properties. No examples of solution-processable materials with band gaps of about <0.5 eV exist, which has precluded new optoelectronic devices that rely on interactions with electromagnetic radiation within these spectral regions and fundamental investigations of the physical properties of these materials.

With the foregoing and other objects, features, and advantages of the present invention that will become apparent hereinafter, the nature of the invention may be more clearly understood by reference to the following detailed description of the preferred embodiments of the invention and to the appended claims.

BRIEF DESCRIPTION OF THE DRAWINGS

These drawings accompany the detailed description of the invention and are intended to illustrate further the invention and its advantages. The drawings, which are incorporated in and form a portion of the specification, illustrate certain preferred embodiments of the invention and, together with the entire specification, are meant to explain preferred embodiments of the present invention to those skilled in the art. Relevant FIGURES are shown or described in the Detailed Description of the Invention as follows.

$$a)\ E_g^{opt}$$

was estimated from the absorption onset ($\lambda_{onset}$≈0.12 eV) via FTIR on NaCl substrates, b) Two-dimensional GIWAXS pattern of a thin film on a silicon substrates. The color scale shown in panel corresponds to the scattered intensities (a.u.), c) Temperature-dependent susceptibility measurement using a SQUID magnetometer is consistent with the EPR intensity measurement after subtraction of the diamagnetic background, and d) The ground-state spin-multiplicity was confirmed from M(H) measurement at 3 K, confirming the triplet is lower in energy than an open-shell singlet ground-state.

Figure 10:
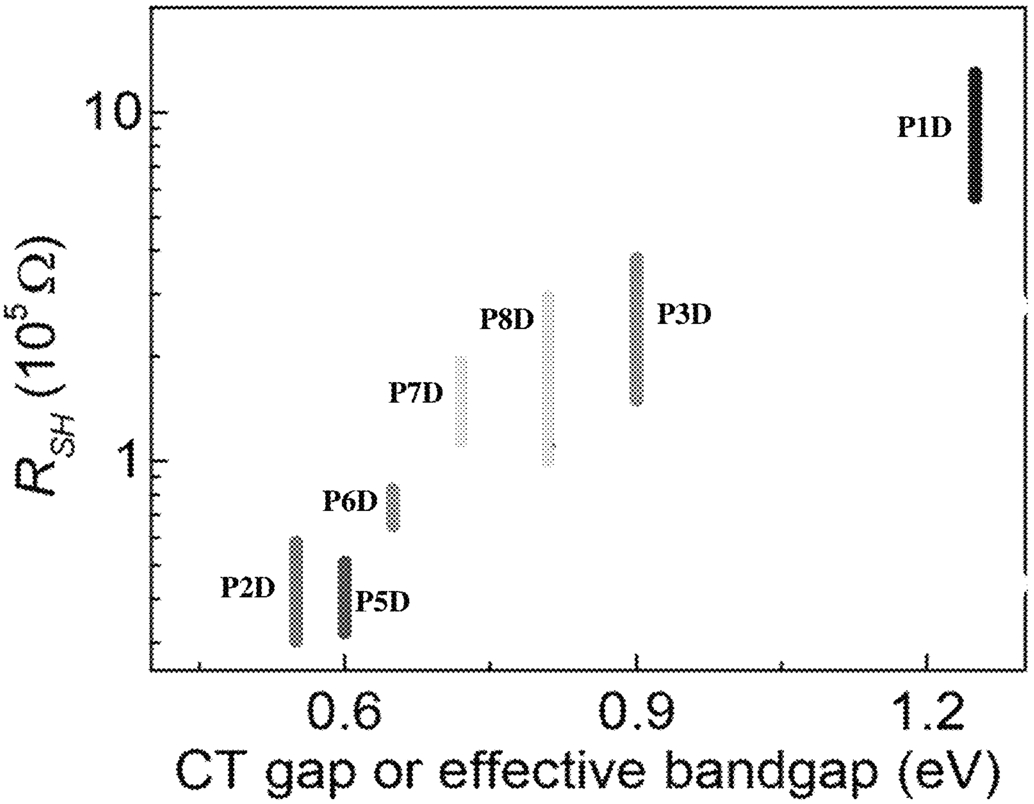

FIG. 10 shows the CT gap or effective bandgap (eV) for polymers P1D-P3D and P5D-P8D.

DETAILED DESCRIPTION OF THE INVENTION

The invention provides for the synthesis of novel polymer compounds and methods of preparing narrow band gap conjugated polymers utilizing exocyclic cross-conjugated donor substituents, as well as novel monomer components of such polymers, and the resulting products that comprise materials and useful electronic and optoelectronic devices having novel functionalities. The materials, methods, and compositions of the invention provide the ability to fine-tune structural and/or electronic properties to obtain modular, solution-processable donor-acceptor (DA) conjugated polymers. The invention provides new polymers suitable for use in electronic devices as well as novel monomer components of such polymers, and electronic devices incorporating such novel polymers.

1. In one embodiment, the invention provides polymers of the formula:

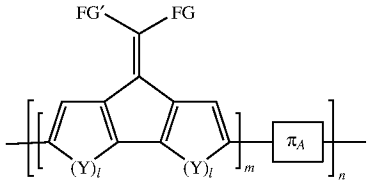

-continued

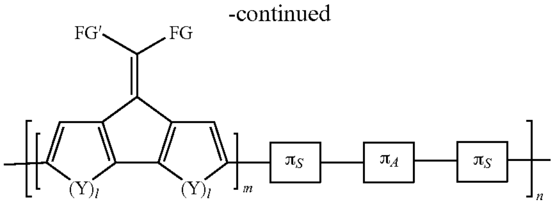

wherein FG and FG' are selected from the group consisting of substituted $C_1$-$C_{36}$ hydrocarbyl, unsubstituted $C_6$-$C_{20}$ aryl, substituted $C_6$-$C_{20}$ aryl, unsubstituted $C_3$-$C_{20}$ heteroaryl, substituted $C_3$-$C_{20}$ heteroaryl, unsubstituted $C_6$-$C_{20}$ aryl-$C_0$-$C_{36}$ hydrocarbyl, $C_6$-$C_{20}$ aryl, $C_0$-$C_{36}$ hydrocarbyl, F, Cl, Br, I, CN, —$R^2$, $SR^2$—OH, —$OR^2$, —COOH, —$COOR^2$, —$NH_2$, —$NHR^2$, or $NR^2R^3$, where $R^2$ and $R^3$ are independently selected from a $C_1$-$C_{24}$ hydrocarbyl group, and when FG' is unsubstituted hydrocarbyl or substituted hydrocarbyl, FG cannot be $C_0$-hydrdoxarbyl;

$\pi_A$ is an electron-poor or electron-deficient aromatic moiety;

$\pi_S$ represents a conjugated spacer comprising double or triple bonds in a molecule that are separated by a single bond, across which some sharing of electrons occurs;

m is an integer of at least 1;

Y is selected from the group consisting of S, —CH═CH—, $BR^3$, $PR^3$, Se, Te, NH, $NR^4$ or Si, wherein $R^3$ and $R^4$ comprise suitable functionalities, and n is an integer >1.

The "$\pi_A$" components which are used as intrachain units in the polymers can be any electron-deficient heteroaromatic ring system. "Electron-deficient aromatic ring system" and "electron-poor aromatic ring system" are used synonymously, and are intended to embrace 1) heteroaromatic ring systems, where the electron density on the carbon atoms of the heteroaromatic system is reduced compared to the analogous non-heteroaromatic system, and 2) aromatic ring systems, where the electron density on the carbon atoms of the aromatic system is reduced due to electron-withdrawing substituents on the aromatic ring (e.g., replacement of a hydrogen of a phenyl group with fluorine). The copolymers of the invention utilize a structure which permits an internal charge transfer (ICT) from an electron-rich unit to an electron-deficient moiety within the polymer backbone.

In some embodiments, $\pi_A$ is selected from substituted and unsubstituted moieties selected from the group consisting of thiadiazoloquinoxaline; quinoxaline; thienothiadiazole; thienopyridine; thienopyrazine; pyrazinoquinoxaline; benzothiadiazole; bis-benzothiadiazole; benzobisthiadiazole; thiazole; thiadiazolothienopyrazine; diketopyrrolopyrrole, etc.

2. In additional embodiments, the invention provides synthesized polymers comprising at least one novel monomer and/or oligomer compound of the formula:

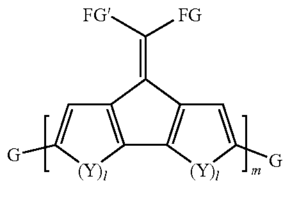

where leaving group G can be a leaving group suitable for a cross-coupling reaction such as a Stille or Suzuki-type polymerization reactions. In some embodiments, G can be Br, Cl, I, triflate (trifluoromethanesulfonate), a trialkyl tin compound, boronic acid (—$B(OH)_2$), or a boronate ester (—$B(OR^5)_2$, where each $R_5$ is $C_1$-$C_{12}$ alkyl or the two $R^5$ groups combine to form a cyclic boronic ester. In some embodiments, G can be a trialkyl tin compound, such as $(CH_3)_3$—Sn—. In some embodiments, G can be H, Br or any group suitable for a direct heteroarylation polycondensation. Other embodiments include functionality relevant for Kumada, Sonogashira, Negishi, and Hiyama couplings.

3. In additional embodiments, the invention provides compounds wherein said donor is incorporated into a small molecule or oligomer.

4. The invention further provides for methods for producing organic, or hybrid organic-inorganic, optoelectronic devices, which incorporate the materials described in paragraphs 1-3 above.

Some embodiments described herein are recited as "comprising" or "comprises" with respect to their various elements. In alternative embodiments, those elements can be recited with the transitional phrase "consisting essentially of" or "consists essentially of" as applied to those elements. In further alternative embodiments, those elements can be recited with the transitional phrase "consisting of" or "consists of" as applied to those elements. Thus, for example, if a composition or method is disclosed herein as comprising A and B, the alternative embodiment for that composition or method of "consisting essentially of A and B" and the alternative embodiment for that composition or method of "consisting of A and B" are also considered to have been disclosed herein. Likewise, embodiments recited as "consisting essentially of" or "consisting of" with respect to their various elements can also be recited as "comprising" as applied to those elements. Finally, distances, sizes, amounts, percentages, quantities, temperatures, and similar features and data provided herein are approximations, and can vary with the possible embodiments described and those not necessarily described but encompassed by the invention.

EXAMPLES

Example 1. Synthesis of 2,6-dibromo-(3,5-didodecylbenzylidene)-4H-cyclopenta[2,1-b:3,4-b']dithiophene (1)

This example involved the synthesis of monomer 1. The inventors' synthetic approach is depicted in Scheme 1 and begins with the preparation of 3,5-didodecylbenzyl alcohol (1a). Linear (R=n-$C_{12}H_{25}$) solubilizing groups were chosen on the basis of minimizing steric and electronic contributions and for promoting sufficient solubility of the polymer products. The coupling of dodecylzinc bromide with 3,5-dibromobenzyl alcohol was accomplished using a sterically bulky Pd-PEPPSI-IPent pre-catalyst. Heating of the reaction mixture ensured high conversion without a loss in specificity providing 1a in good overall yield (>70%). Conversion of the alcohol to the bromide was accomplished using $PBr_3$ in $CH_2Cl_2$. Subsequent reaction with $PPh_3$ provided the phosphonium salt (1c). The olefin can be accessed through the reaction of 1c (as illustrated in Scheme 1) and Wittig olefination from the ketone. Alternative routes also exist. This strategy should provide facile access to a wide variety of functionalized derivatives for subsequent examination. The reaction of 2,6-dibromo-4H-cyclopenta[2,1-b:3,4-b']dithiophene-4-one with 1c proceeds using NaOEt in EtOH, affording the desired aryl olefin functionalized CPDT building block (1) in 73% yield.

Scheme 1. Synthesis of 1.

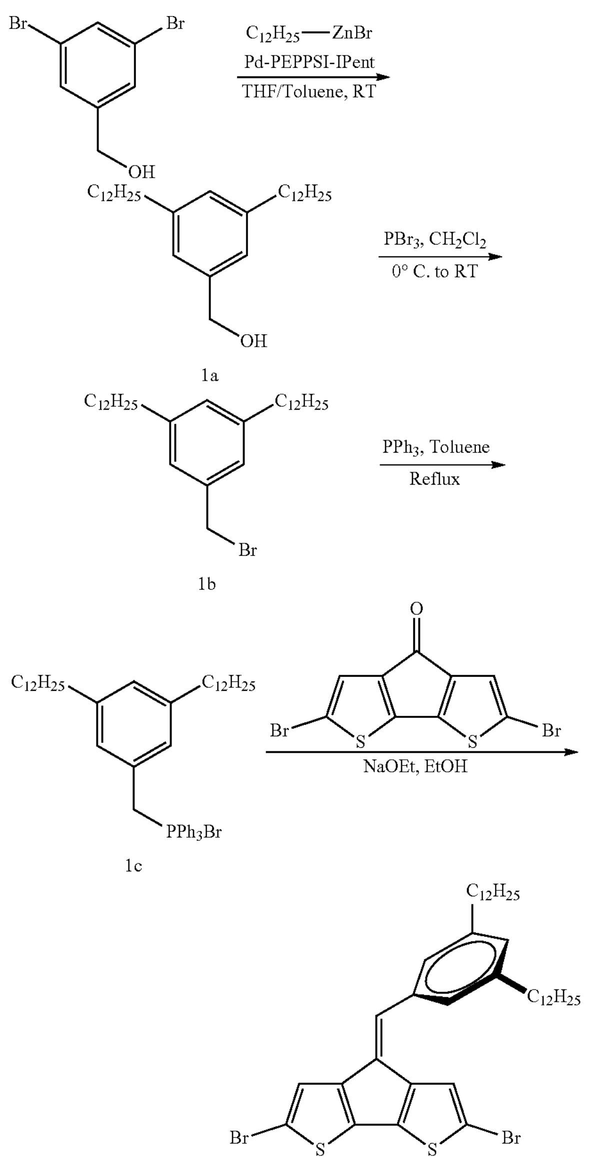

1a

1b

1c

1

Monomer Synthesis 3,5-Didodecylbenzyl alcohol (1a). Pd-PEPPSI-IPent (84 mg, 1.5 mol %) and 3,5-dibromobenzyl alcohol (2.0 g, 7.58 mmol) were added to an oven-dried flask equipped with a stir bar. The flask was sealed and purged with argon. Toluene (15 mL) was added to dissolve the contents and the resulting solution was cooled to 0° C. in an ice bath. A THF solution of dodecylzinc bromide (25 mL, 19 mmol) was added dropwise over a period of 5 minutes. The ice bath was then removed, and the reaction was allowed to warm to room temperature and stirred for 16 hours. After this time, the reaction was heated to reflux for 2 hours. After cooling, the reaction mixture was quenched by the addition of hydrochloric acid (1 N) and subsequently neutralized with KOH (1 N). The mixture was poured into a separatory funnel and extracted with 3×50 mL ethyl acetate. The combined organic layer was washed with brine (50 mL) and dried over anhydrous $MgSO_4$. Solvents were removed in vacuo and purification by flash chromatography using (10:1 hexanes: ethyl acetate) as the eluent gave 2.4 g of a colorless oil (5.82 mmol, 71%). $^1H$ NMR (500 MHz, $CDCl_3$, 298 K): δ 7.02 (s, 2H), 6.95 (s, 1H), 4.67 (d, J=5.8 Hz, 2H), 2.60 (t, J=7.5 Hz, 4H), 1.60 (m, 4H), 1.36-1.20 (m, 36H), 0.90 (t, J=7.0 Hz, 6H). MALDI/TOF m/z: 443.18, calculated: 444.43.

3,5-Didodecylbenzyl bromide (1b). 1a (2.0 g, 4.5 mmol) was dissolved in 20 ml anhydrous $CH_2Cl_2$ and the solution was cooled to 0° C. in an ice bath. While stirring, $PBr_3$ (1.2 g, 4.5 mmol) was added dropwise. The ice bath was then removed and the reaction was allowed to warm to room temperature and stirred overnight. The reaction mixture was quenched by the addition of DI water. The mixture was poured into a separatory funnel and extracted with 3×30 mL $CH_2Cl_2$. The combined organic layer was washed with brine (50 mL) and dried over anhydrous $MgSO_4$. Solvents were removed in vacuo and yielded 2.24 g of a white solid (4.4 mmol, 99%). $^1H$ NMR (500 MHz, $CDCl_3$, 298 K): δ 7.04 (s, 2H), 6.95 (s, 1H), 4.5 (s, 2H), 2.58 (t, J=7.8 Hz, 4H), 1.62 (m, 4H), 1.36-1.20 (m, 36H), 0.90 (t, J=6.8 Hz, 6H). MALDI/TOF m/z: 505.82, calculated: 506.35.

2,6-dibromo-(3,5-didodecylbenzylidene)-4H-cyclopenta[2,1-b:3,4-b']dithiophene (1). 1b was dissolved in 20 ml anhydrous toluene with triphenylphosphine (1.16 g, 4.4 mmol). The solution was heated at reflux overnight. Solvents were removed in vacuo and 3.34 g of a waxy white solid (4.4 mmol) was obtained and used without further purification. 1c (2 g, 2.60 mmol) was combined with 2,6-dibromo-4H-cyclopenta[2,1-b:3,4-b']dithiophene-4-one (0.90 g, 2.60 mmol) and dissolved in 20 ml of ethanol. The solution was heated to 60° C. and a solution of 15% NaOEt (1.50 ml, 2.60 mmol) in EtOH (10 mL) was added dropwise. The solution was stirred at 60° C. overnight. The reaction was then allowed to cool to room temperature, quenched with DI water (10 ml) and extracted with dichloromethane. The organic layer was washed with water, brine and solvents were removed in vacuo. The residue was purified by flash chromatography using hexanes as the eluent, affording 1.44 g of a red solid (1.89 mmol, 73%). $^1H$ NMR (500 MHz, $C_6D_6$, 298 K): δ 7.25 (s, 1H), 7.00 (s, 2H), 6.82 (s, 1H), 2.57 (t, J=7.8 Hz, 4H), 1.66 (m, 4H), 1.49-1.29 (m, 36H), 0.91 (t, J=7.1 Hz, 4H). MALDI/TOF m/z: 759.79 calculated: 758.22.

Example 2. Synthesis of the Reactive Monomers 2 and 3

The copolymerization of monomers, such as those shown in Scheme 1, is limited as a result of lithiation-based approaches used to install reactive functionalities necessary for polymerization reactions. Subsequent reaction of the brominated monomers with 3.5 equiv. of hexamethylditin $(SnMe_3)_2$ using $Pd(PPh_3)_4$ in toluene affords the corresponding bis-trimethylstannyl species in yields ~75%. Importantly, the same reaction conditions, purification procedures, and approach can be applied in the presence of a wide variety of functionality and monomer combinations. This approach provides access to a substantially more diverse array of materials than traditional lithiation-based strategies and can be used for the generation of more diverse building blocks and the installation of a variety of functionality where necessary. Due to the statistical nature of the reaction, higher analogs of (2) are formed. Under these reaction conditions, the dimeric species (3) constitutes ~10% of the product and can be isolated from the monomeric species through standard chromatographic methods. Adjustment of the reaction conditions can be used to tailor the product distribution. Scheme 2 shows the synthesis of 2 and 3.

Scheme 2. Synthesis of 2 and 3.

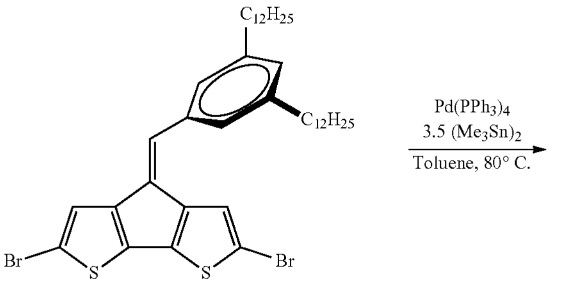

1

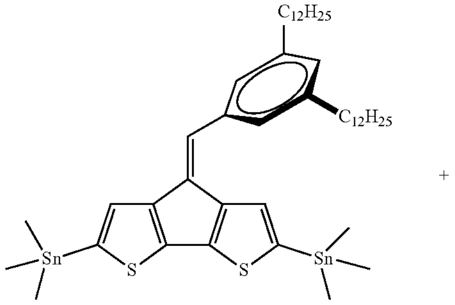

2

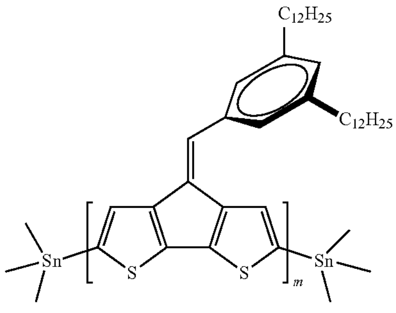

3
m = 2

(4-(3,5-didodecylbenzylidene)-4H-cyclopenta[2,1-b:3,4-b']dithiophene-2,6-diyl)bis(trimethylstannane) (2). In an nitrogen filled glove box, 1 (1.00 g, 1.31 mmol), 3.5 equivalents $Me_3SnSnMe_3$ (1.50 g, 4.58 mmol) and $Pd(PPh_3)_4$ (151 mg, 0.13 mmol) were combined in a schlenk flask and 20 mL of toluene was added. The flask was sealed, removed from the glove box and heated to 80° C. for 12 hours. The reaction mixture was allowed to cool and volatiles were removed in vacuo. The residue was extracted with diethyl ether, filtered and poured into a separatory funnel containing 50 mL DI water. The organic layer was washed with 3×50 mL DI water, dried over anhydrous $MgSO_4$, and all volatiles were removed in vacuo. Purification was accomplished by column chromatography on reverse phase silica using ethanol (containing 1% triethylamine) as the eluent affording 864 mg of a viscous red oil (0.93 mmol, 71%). $^1H$ NMR (500 MHz, $C_6D_6$, 298 K): δ 7.56 (s, 1H), 7.44 (m, 2H), 7.38 (s, 1H), 7.31 (s, 1H), 7.07 (s, 1H), 2.64 (t, J=7.8 Hz, 4H), 1.70 (m, 4H), 1.47-1.25 (m, 36H), 0.92 (t, J=6.7 Hz, 6H), 0.30 (s, 9H, Sn—$CH_3$), 0.23 (s, 9H, Sn—$CH_3$).

Example 3. Copolymerization Reactions

Copolymerization of 2 with 4,9-dibromo-6,7-dimethyl-[1,2,5]thiadiazolo[3,4-g]quinoxaline (P1), 4,9-dibromo-6,7-diphenyl-[1,2,5]thiadiazolo[3,4-g]quinoxaline (P2), 4,9-dibromo-6,7-dithienyl-[1,2,5]thiadiazolo[3,4-g]quinoxaline (P3) was carried out via microwave heating using $Pd(PPh_3)_4$ (3-4 mol %) as the catalyst in xylenes. The copolymers were obtained in >80% yields following purification via soxhlet extraction. Scheme 3 shows microwave mediated copolymerization of 2.

Scheme 3. Microwave mediated copolymerization of 2: 3-4 mol % $Pd(PPh_3)_4$, xylenes, 120° C. (5 min), 140° C. (5 min), 170° C. (40 min).

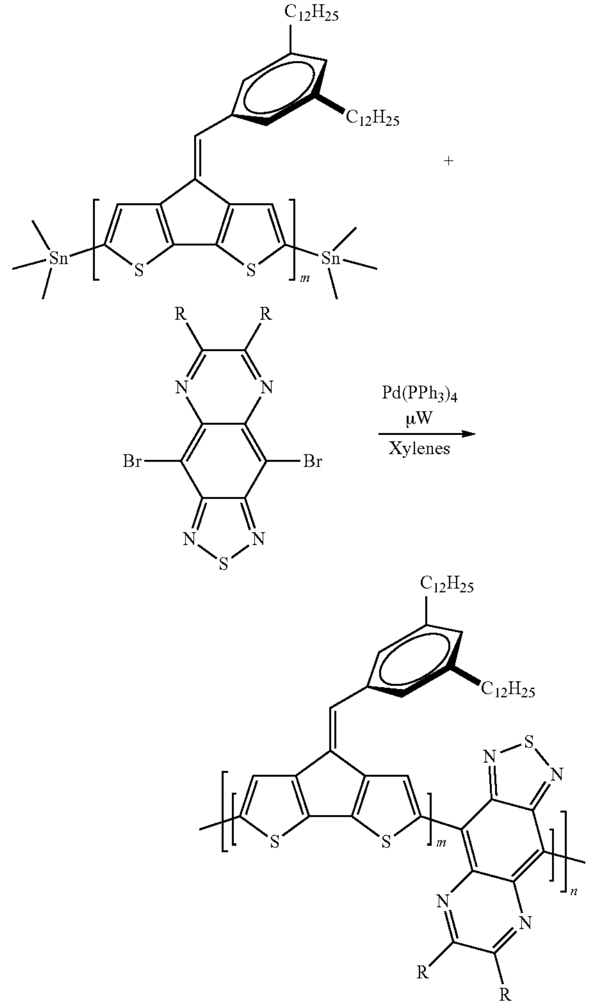

General Procedure for Copolymerization Reactions of P1-P3.

Figure 1:
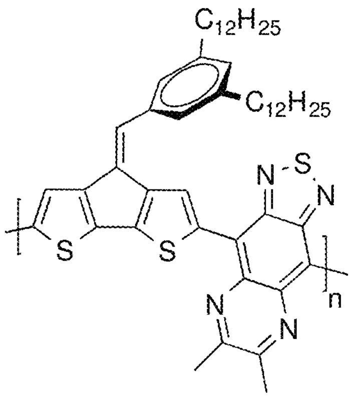
FIG. 1 shows a structural schematic illustration of the molecular structures of P1-P3.
Figure 1:
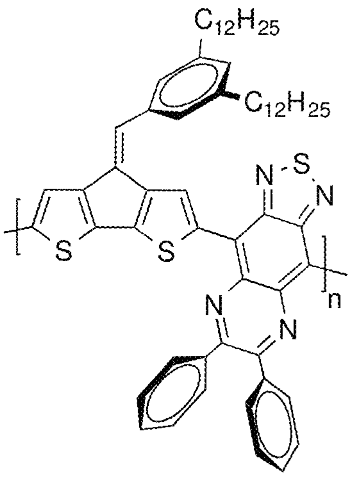
Figure 1:
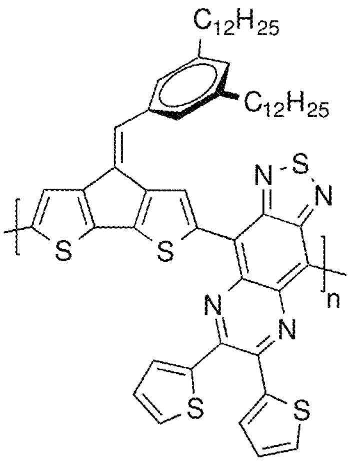

A microwave tube was charged with 2 (100 mg, 0.161 mmol) and quinoxaline derivative (0.161 mmol). The tube was brought inside a glove box and approximately 500 μl of xylenes containing 4.1 mg of $Pd(PPh_3)_4$ from a stock solution was added. The tube was sealed, removed from the glove box and subjected to the following reaction conditions in a microwave reactor: 120° C. for 5 min, 140° C. for 5 min, and 170° C. for 40 min. After this time, the reaction was allowed to cool leaving a solid gelled material. The mixture was dissolved in chlorobenzene, then precipitated into methanol and collected via filtration. The residual solid was loaded into an extraction thimble and washed successively with methanol (4 h), acetone (4 h), hexanes (12 h), and again with acetone (2 h). The polymer was dried in vacuo. FIG. 1 shows the molecular structures of P1-P3.

P1: Yield: 76.4 mg (0.093 mmol, 87%) of a black solid. The $^1H$ NMR spectra was very broad as the polymer showed a very strong tendency toward aggregation at 315 K. $^1H$ NMR (500 MHz, $CHCl_3$, 315 K): δ 9.60-6.50 (br, 6H), 3.51-2.87 (br m, 10H), 1.99-0.54 (br, 46H).

P2: Yield: 70.4 mg (0.086 mmol, 80%) of a black solid. The $^1H$ NMR spectra was very broad as the polymer showed a very strong tendency toward aggregation at 315 K. $^1H$ NMR (500 MHz, $CHCl_3$, 315 K): δ 9.70-6.50 (br, 16H), 3.72-2.73 (br m, 4H), 2.07-0.89 (br, 46H).

P3: Yield: 90.3 mg (0.094 mmol, 88%) of a black solid. The $^1H$ NMR spectra was very broad as the polymer showed a very strong tendency toward aggregation at 393 K. $^1H$ NMR (500 MHz, 398 K $CHCl_3$, 315 K): δ 9.70-6.50 (br, 12H), 3.74-2.81 (br m, 4H), 1.99-0.64 (br, 46H).

Example 4. Solid-State Optical and Electrochemical Properties of P1-P3

Figure 2:
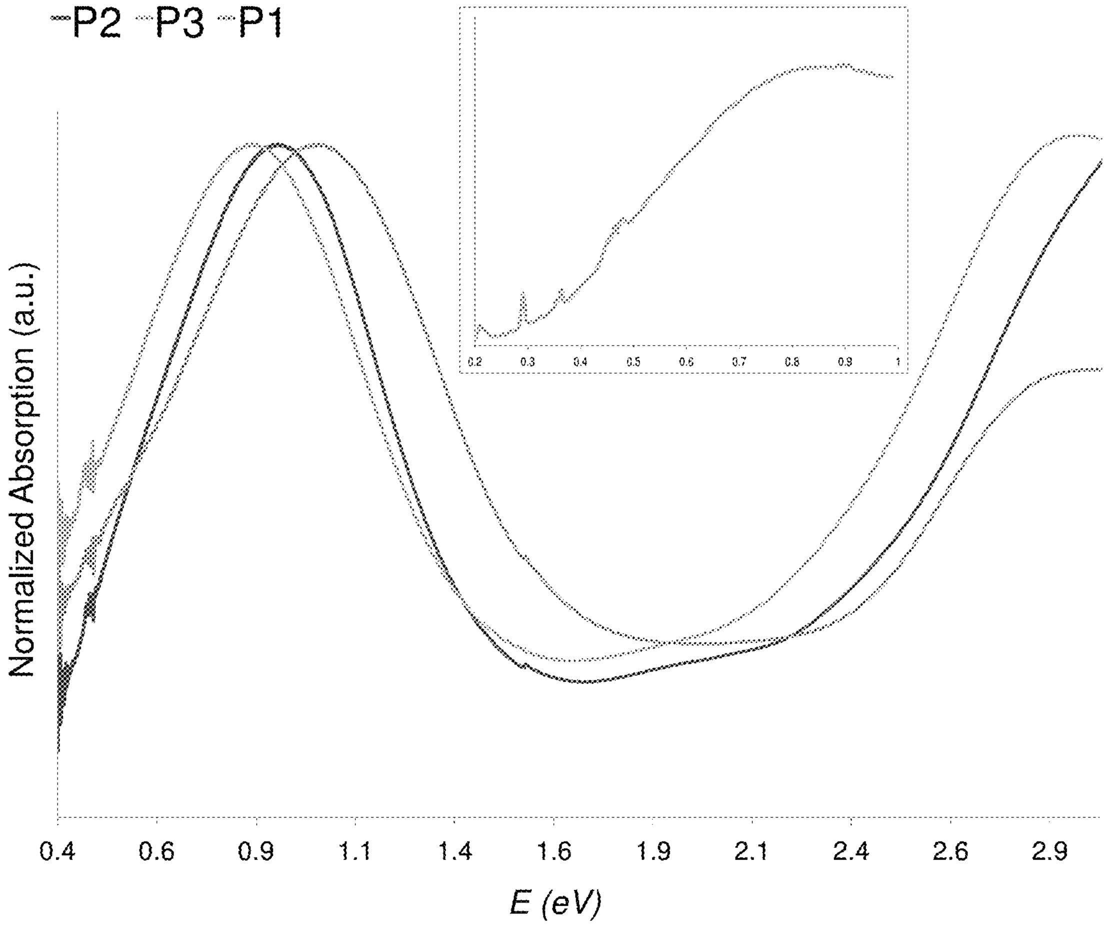
FIG. 2 shows a graphical illustration of the UV-Vis-IR absorption spectra of P1-P3 as a thin-film and the FT-IR spectra of P3 as a thin film.

The UV-Vis-IR absorption spectra of thin films of P1-P3 are compared in FIG. 2 and illustrate broad absorption profiles with maxima ($\lambda_{max}$) occurring between 1.2-1.5 m. The inset in FIG. 2 shows the FT-IR spectra of P3 as a thin film. The optical band gap $$(E_g^{opt})$$

of P3 is ~0.3 eV (as determined by FT-IR on sapphire substrates), as estimated from the absorption onset of the thin-film. Cyclic-voltammetry (CV) shows that the HOMO of P3 is located at ~-4.80 eV and the LUMO at −4.25 eV, as determined by the oxidation and reduction onset, respectively. This gives an electrochemical band gap $$(E_g^{elec})$$

of 0.55 eV. It is well-established that values obtained for $$E_g^{elec}$$

are typically larger than those for $$E_g^{opt}$$

and only provide an estimate of the HOMO-LUMO positions. A further red shift is evident in P3 ($\lambda_{max}$=1.48 μm) when compared to P1 and P2 with measureable absorbance extending to λ>6 μm in the solid state. Importantly, the presence of the olefin substituent allows for achieving much narrower gaps than the isomorphic imine derivatives, as a result of both steric and electronic considerations, affording the narrowest band gap solution-processable DA copolymers prepared to date.

Example 5. Fabrication of Electrically Conductive and Photoconductive Devices

More detailed electrical characterization of very narrow band gap DA copolymers has revealed that these semiconducting materials resemble inhomogeneous, phase separated conducting polymers. In these systems, it is likely that the transport properties are limited by poor control over sterics, electronics, film structure, and through the use of spacers (such as bridging thiophenes) to achieve planarity. A progression in the transport properties is evident when progressing to narrower band gaps in the novel materials of the invention. The electrical properties are also highly dependent on interchain arrangements and the solubilizing groups employed. Linear current-voltage (IV) characteristics obtained on thin-film devices of P1-P3 demonstrate intrinsic electrical conductivity in the absence of “dopants”. A large difference in the conductivity is evident when comparing P2 ($\sigma$~$10^{-3}$ S/cm) and P3 ($\sigma$~$10^{-1}$ S/cm), which may reflect different levels of electronic coupling arising from the presence of bulky aryl substituents on the TQ acceptor. The intrinsic electrical conductivity of these materials further highlights how structural and electronic control gives rise to the unique properties.

Silicon substrates with a 300 nm $SiO_2$ gate dielectric were cleaned using detergent, DI water, acetone, and IPA. The substrates were treated with UV-Ozone for 20 minutes. Gold contacts (50 nm) were thermally evaporated at $1\times10^{-7}$ torr using a shadow mask. Substrates were then treated with OTS solution in toluene to deposit a self-assembled monolayer. Following rinsing with toluene, acetone, and IPA, the active layer (10 mg/ml polymer in $CHCl_3$) was spun onto the substrate at 3000 rpm. Conductivity tests were conducted using a two point probe method under nitrogen. Scans were conducted from −10 to 10 V. Standard FET measurements with gate voltages did not result in a field effect.

Figure 3:
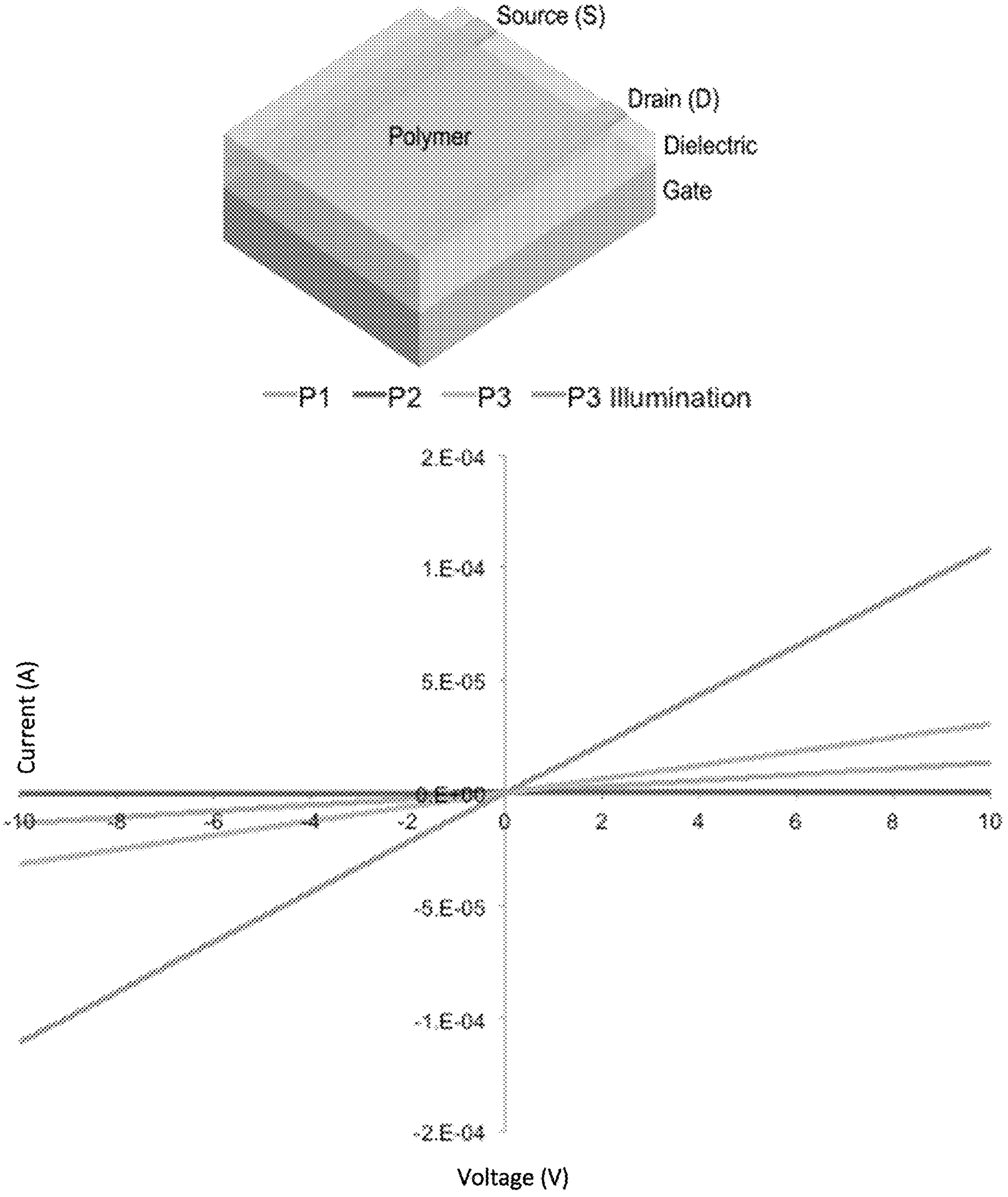
FIG. 3 shows a pictorial illustration of a device with the architecture $Si/SiO_2$/Au/OTS8/Polymer and a graphical illustration of I-V curves of P1-P3 and P3 after illumination.

FIG. 3 shows a device with the architecture Si/$SiO_2$/Au/OTS8/Polymer and IV curves of P1-P3 and P3 after illumination. A large increase in the conductivity of these materials is evident upon illumination (~3× as illustrated for P3), which stands in direct contrast to narrow band gap materials.

ADDITIONAL EXAMPLES

Donor-Acceptor Polymers with an Infrared Photoresponse

Donor-acceptor (DA) conjugated polymers provide an important platform for the development of solution-processed optoelectronic devices. The complex interrelation between electronic properties and conformational disorder in these materials complicates the identification of design guidelines to control the bandgap at low energies, limiting the design of new optoelectronic and device functionalities. The present invention demonstrates that DA polymers comprised of exocyclic olefin substituted cyclopentadithiophene donors, in combination with conventional electron acceptors, display very narrow optical band gaps $$\left(1.2 > E_g^{opt} > 0.7\text{ eV}\right)$$

and primary photoexcitations extending into the shortwave infrared. The invention includes use of any electron-deficient heteroaromatic ring system as the acceptor. Theoretical calculations reveal fundamental structure-property relationships toward band gap and energy level control in these spectral regions. Bulk heterojunction photodiodes fabricated using these new materials demonstrate a detectivity (D*) of $>10^{11}$ Jones within a spectral range of 0.6-1.43 μm and measurable D* to 1.8 μm, the longest reported to date for conjugated polymer-based systems. The present invention systematically controls the structural and electronic properties and the band gap $$\left(E_g^{opt} = \text{optical band gap}\right)$$

of conjugated copolymers within the $$1.2\text{ eV} > E_g^{opt} > 0.1\text{ eV}$$

range across multiple systems.

Introduction

The inherent flexibility afforded by molecular design has accelerated the development of a wide variety of (opto) electronic technologies based on solution-processable organic semiconductors (OSCs). Donor-acceptor (DA) polymers comprised of alternating electron-rich (donor) and electron-poor (acceptor) moieties have emerged as the dominant class of high performance materials to date in organic photovoltaic (OPV) and photodetector (OPD) applications. State-of-the-art OPDs, based on a bulk heterojunction (BHJ) architecture, have demonstrated a broad spectral response (0.3-1.45 μm), detectivities $(D^*)>10^{12}$ Jones (1 Jones=1 cm $Hz^{0.5}$ $W^{-1}$), and a linear dynamic range over 100 dB in the visible sub-band (0.5 and 0.8 μm). There is significant interest in expanding the scope of these materials to improve functionality in the near-infrared (NIR: 0.9-1.4 μm) and extend utility into the shortwave IR (SWIR: 1.4-3 μm) to serve as alternatives to conventional inorganic semiconductor materials.

Figure 4:
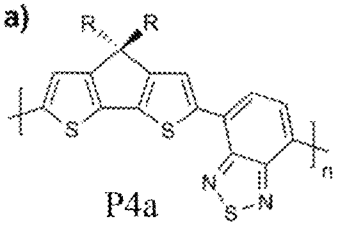
FIG. 4 shows molecular structures of: a) poly[2,6-(4,4-bis(alkyl)-4H-cyclopenta[2,1-b;3,4-b]-dithiophene)-alt-4,7-(2,1,3-benzothiadiazole)] (PCPDTBT), b) bridgehead imine substituted analog (P4b), where FG corresponds to a functional group, and c) [6,6]-Phenyl-$C_{71}$-butyric acid methyl ester ([70]PCBM).
Figure 4:
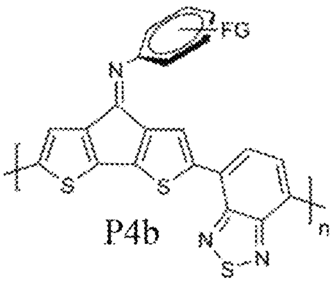
Figure 4:
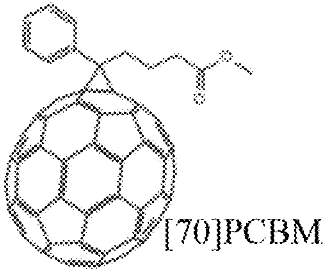

Unlike inorganic semiconductors, photoexcitation of OSCs does not lead to substantial instantaneous free carrier generation. Organic photoresponsive devices necessitate a lower ionization potential species (donor polymer) that manifests a singlet manifold transition ($S_0 \rightarrow S_1$) and possess a large intensity in the spectral region of interest. Photoexcitation results in bound electron-hole pairs (excitons), which require a suitable energy offset, facilitated by a higher electron affinity acceptor (typically a fullerene derivative, (FIG. 4), to separate the exciton and drive charge transfer at the interface (heterojunction) between the two materials. FIG. 4 shows molecular structures of: a) poly[2,6-(4,4-bis (alkyl)-4H-cyclopenta[2,1-b;3,4-b']-dithiophene)-alt-4,7-(2, 1,3-benzothiadiazole)] (PCPDTBT, P4a), b) bridgehead imine substituted analog (P4b), where FG corresponds to a functional group, and c) [6,6]-Phenyl-$C_{71}$-butyric acid methyl ester ([70]PCBM). Dissociated charges are transported to their respective electrodes through interpenetrating bicontinuous donor and acceptor networks formed through nanoscale phase separation, driven in part, by solubilizing substituents required for solution processing. While general design guidelines exist to tailor the HOMO-LUMO (highest occupied/lowest unoccupied molecular orbital) energies, absorption profiles, and transport characteristics of DA polymers, the complex interrelation between electronic properties and conformational disorder has precluded similar control at low energies.

These complexities motivated an investigation of molecular design strategies that yield a reduction in bandgap and promote the appropriate properties suitable for long wavelength (λ) light detection in a conventional BHJ architecture. The prototypical narrow bandgap polymer PCPDTBT (P4a) is shown in FIG. 4. In combination with [6,6]-Phenyl-$C_{71}$-butyric acid methyl ester ([70]PCBM), this material exhibits photoresponsivity extending into the NIR and high detectivities in solution-processed OPDs. Closely related bridgehead imine (C═NPh) substituted analogs (P4b) offer the advantage of systematic HOMO-LUMO modulation through varying electronic functionality on the phenyl (Ph) substituent. This design motif also permits careful control of structural and electronic features necessary to overcome conjugation saturation behavior and achieve solution-processable DA polymers with very narrow optical bandgaps $$\left(E_g^{opt} < 0.5\text{ eV}\right).$$

It seemed reasonable that similar considerations should apply to copolymers comprised of bridgehead olefin (C═CPh) substituted cyclopentadithiophene (CPDT) structural units, with the advantage of increasing the ionization potential (LUMO) of the resultant polymers to facilitate photoinduced electron transfer (PET) to conventional fullerene acceptors.

Example A

Materials and Methods. All manipulations of air and/or moisture sensitive compounds were performed under an inert atmosphere using standard glove box and Schlenk techniques. Reagents, unless otherwise specified, were purchased from Sigma-Aldrich and used without further purification. Solvents (xylenes, THF, toluene, and ethanol) were degassed and dried over 4 Å molecular sieves. Deuterated solvents ($C_6D_6$, $CDCl_3$, and $C_2D_2Cl_4$) were purchased from Cambridge Isotope Labs and used as received. 3,5-dibromobenzaldehyde and 4,7-dibromobenzo[c][1,2,5]thiadiazole were purchased from Oakwood Chemical and Sigma-Aldrich respectively, and purified by column chromatography prior to use. Tetrakis(triphenylphosphine) palladium(0) was purchased from Strem Chemicals and used as received. Alkylzinc halides were prepared according to a previously reported procedure. 2,6-dibromo-4H-cyclopenta [2,1-b:3,4-b']dithiophene, 4,7-dibromobenzo[c][1,2,5]selenadiazole, 4,7-dibromo[1,2,5]-selenadiazolo[3,4-c]pyridine, 4,9-bis(5-bromothiophen-2-yl)-6,7-dioctyl-[1,2,5]thiadiazolo[3,4-g]quinoxaline, and 4,6-Bis(5-bromo-2-thienyl) thieno[3,4-c][1,2,5]thiadiazole were prepared according to previously reported procedures. $^1H$ and $^{13}C$ NMR spectra were collected on a Bruker Ascend 600 MHz spectrometer and chemical shifts, δ (ppm) were referenced to the residual solvent impurity peak of the given solvent. Data reported as: s=singlet, d=doublet, t=triplet, m=multiplet, br=broad; coupling constant(s), J are given in Hz. Flash chromatography was performed on a Teledyne Isco CombiFlash Purification System using RediSep Rf prepacked columns. Microwave assisted reactions were performed in a CEM Discover microwave reactor. Matrix-assisted laser desorption/ionization time-of-flight (MALDI-TOF) mass spectra were measured on a Bruker Microflex LT system. The number average molecular weight ($M_n$) and dispersity (Đ) were determined by gel permeation chromatography (GPC) relative to polystyrene standards at 160° C. in 1,2,4-trichlorobenzene (stabilized with 125 ppm of BHT) in an Agilent PL-GPC 220 high temperature GPC/SEC system using a set of four PLgel 10 μm MIXED-B columns. Polymer samples were pre-dissolved at a concentration of 1.00-2.00 mg $mL^{-1}$ in 1,2,4-trichlorobenzene with stirring for 4 h at 150° C. Overlap of aromatic protons with solvent occurred in both $CDCl_3$ and $C_6D_6$ for compounds 1a, 1b, 2a, and 2b. The structures were confirmed using $^{13}C$ NMR and MALDI-TOF mass spectrometry.

UV-Vis-NIR Spectroscopy. UV-Vis-NIR spectra were recorded using a Cary 5000 UV-Vis-NIR spectrophotometer. Thin films were prepared by spin coating a 10 mg $mL^{-1}$ chlorobenzene ($C_6H_5Cl$) solution onto quartz substrates at 2000 rpm.

Electrochemistry. Electrochemical characteristics were determined by cyclic voltammetry (50 mV $s^{-1}$) carried out on drop-cast polymer films at room temperature in degassed anhydrous acetonitrile with tetrabutylammonium hexafluorophosphate (0.1 M) as the supporting electrolyte. The working electrode was a platinum wire, the counter electrode was a platinum wire and the reference electrode was Ag/AgCl. After each measurement the reference electrode was calibrated with ferrocene and the potential axis was corrected to the normal hydrogen electrode (NHE) using −4.75 eV for NHE.

Device Fabrication. Pre-patterned indium tin oxide (ITO) substrates were ultrasonically cleaned in detergent, deionized water and 2-propanol for 15 min sequentially. Polyethylenimine (PEIE) (35-40 wt %, 7000 g $mol^{-1}$, Sigma Aldrich) was diluted with 2-methoxyethanol to achieve a concentration of 0.4 wt %. The diluted PEIE solution was spin coated onto the cleaned ITO substrate at 3500 rpm to form a film of ~10 nm, which was then annealed at 120° C. for 10 min in ambient conditions. For P5, the polymer and [70]PCBM (Osilla Ltd.) in a 1:2 ratio were dissolved in anhydrous chlorobenzene:chloroform (3:1) at a polymer concentration of 14 mg $mL^{-1}$. For P6, the polymer and [70]PCBM (1:2) were dissolved in chlorobenzene:chloroform (2:1) at a polymer concentration of 15 mg $mL^{-1}$. The solutions were stirred at 45° C. overnight in a nitrogen atmosphere. Four percent (4%) 1,8-diiodooctane (DIO) was added prior to spin coating P6. For P7 and P8, the polymers (8.5 mg $mL^{-1}$ and 7.5 mg $mL^{-1}$) were dissolved in chlorobenzene at 80° C. overnight in a nitrogen atmosphere then filtered. [70]PCBM was added to give a solution with a 1:2 polymer:fullerene ratio and stirred at 80° C. for an additional 1 h. After this time, 3% DIO was added to the solution. The blend solutions were spin coated on the PEIE/ITO substrate at a spin speed of 1800, 1800, 700, and 300 rpm to form films with thicknesses of 175, 184, 385, and 255 nm for P5, P6, P7, and P8 based devices, respectively. To complete the fabrication of the OPD, 15 nm $MoO_3$, followed by 100 nm Ag, was deposited on top of the blend film through thermal evaporation in a vacuum chamber at a pressure of $3\times10^{-6}$ mbar. The effective areas of these photodetectors was 8.5 $mm^2$ (P5) and 9 $mm^2$ (P6-P8) measured with the help of an optical microscope. The devices were encapsulated between glass slides bonded with epoxy and subsequently characterized in air. The photodiode spectral response was amplified through a low-noise amplifier with an internal load resistor of 100 kΩ (for high gain) or 100Ω (for low gain) and measured with a lock-in amplifier, using a monochromatic light source modulated by a mechanical chopper at a frequency of 390 Hz. Cutoff filters at 455 nm, 645 nm, and 1025 nm were used to reduce the scattered light due to higher order diffraction. The lock-in amplifier can accurately measure a modulated photocurrent down to a magnitude of $2\times10^{-11}$ A.

Synthesis and Characterization 3,5-didodecylbenzaldehyde (1a). In a nitrogen filled glove box, Pd-PEPPSI-IPr (0.274 g, 3.5 mol %) and 3,5-dibromobenzaldehyde (3.04 g, 11.5 mmol) were added to an oven-dried flask equipped with a stir bar. Toluene (30 mL) was added and the reaction mixture was stirred at room temperature to dissolve the contents. A THF solution (~0.50 M) of n-dodecylzinc bromide (81.0 mL, 40.3 mmol) was then added dropwise over a period of 30 min using a dropping funnel. After stirring for 16 h at room temperature, the reaction was heated to 60° C. and stirred at that temperature for 2 h. Upon cooling, the reaction mixture was quenched with saturated $NH_4Cl$ (150 mL) and filtered through a Buchner funnel. The biphasic mixture was then poured into a separatory funnel, the water layer removed, and the organic phase washed with 3×100 mL 1 M $Na_3EDTA$ (3 equiv. NaOH with EDTA), water (1×100 mL), and brine (1×100 mL). The organic solution was then dried with $MgSO_4$ and filtered through Celite. Volatiles were removed in vacuo and purification by flash chromatography on silica gel (hexanes to hexanes:ethyl acetate=95:5 as the eluent) afforded a pale white solid (3.47 g, 68%). $^1H$ NMR (600 MHz, $CDCl_3$) δ 9.98 (1H, s), 7.51 (2H, s), 2.66 (4H, t, J=7.8 Hz), 1.64 (4H, m), 1.40-1.20 (36H, m), 0.89 (6H, t, J=6.7 Hz). $^{13}C$ NMR (151 MHz, $CDCl_3$) δ 192.95, 143.98, 136.82, 135.15, 127.29, 35.78, 32.07, 31.46, 29.82, 29.80, 29.72, 29.62, 29.57, 29.51, 29.42, 22.84, 14.25. MS (MALDI-TOF) m/z calculated for $C_{31}H_{54}O$: 442.42, found 442.61.

3,5-ditetradecylbenzaldehyde (1b). In a nitrogen filled glove box, Pd-PEPPSI-IPr (0.277 g, 3.5 mol %) and 3,5-dibromobenzaldehyde (3.07 g, 11.6 mmol) were added to an oven-dried flask equipped with a stir bar. Toluene (30 mL) was added and the reaction mixture was stirred at room temperature to dissolve the contents. A THF solution (~0.50 M) of n-tetradecylzinc bromide (82.0 mL, 40.7 mmol) was then added dropwise over a period of 30 min using a dropping funnel. After stirring for 16 h at room temperature, the reaction was heated to 60° C. and stirred at that temperature for 2 h. Upon cooling, the reaction mixture was quenched with saturated $NH_4Cl$ (150 mL) and filtered through a Buchner funnel. The biphasic mixture was then poured into a separatory funnel, the water layer removed, and the organic phase washed with 3×100 mL 1 M $Na_3EDTA$ (3 equiv. NaOH with EDTA), water (1×100 mL), and brine (1×100 mL). The organic solution was then dried with $MgSO_4$ and filtered through Celite. Volatiles were removed in vacuo and purification by flash chromatography on silica gel (hexanes to hexanes:ethyl acetate=95:5 as the eluent) afforded a colorless oil (4.06 g, 70%). $^1H$ NMR (600 MHz, $CDCl_3$) δ 9.97 (1H, s), 7.51 (2H, s), 2.66 (4H, t, J=7.8 Hz), 1.64 (4H, m), 1.40-1.20 (44H, m), 0.89 (6H, t, J=6.7 Hz). $^{13}C$ NMR (151 MHz, $CDCl_3$) δ 192.96, 143.97, 136.83, 135.13, 127.28, 35.78, 32.08, 31.46, 29.86, 29.84, 29.83, 29.81, 29.73, 29.62, 29.52, 29.42, 29.42, 22.84, 14.25. MS (MALDI-TOF) m/z calculated for $C_{35}H_{62}O$: 498.48, found 498.83.

2,6-dibromo-4-(3,5-didodecylbenzylidene)-4H-cyclopenta-[2,1-b:3,4-b']dithiophene (2a). Under nitrogen, sodium ethoxide (0.463 g, 6.80 mmol) was added to a suspension of 2,6-dibromo-4H-cyclopenta[2,1-b:3,4-b']dithiophene (1.04 g, 3.09 mmol) in ethanol (10 mL) at 50° C. After 30 min of stirring, a 50° C. solution of 1a (1.37 g, 3.09 mmol) in ethanol (20 mL) was added dropwise. The reaction mixture was slowly heated and refluxed under nitrogen for 3 h. The reaction was then allowed to cool to room temperature, quenched with DI water (100 mL) and extracted with dichloromethane. The organic layer was washed with water (1×100 mL), brine (1×100 mL), and then dried with $MgSO_4$. After filtration through a Buchner funnel, volatiles were removed in vacuo and purification by flash chromatography (pentane as the eluent) yielded a red oil that solidified upon standing (1.67 g, 71%). $^1H$ NMR (600 MHz, $C_6D_6$) δ 7.23 (1H, s), 7.01 (2H, s), 6.83 (1H, s), 2.57 (4H, t, J=7.8 Hz), 1.66 (4H, m), 1.47-1.21 (36H, m), 0.91 (6H, t, J=6.7 Hz). $^{13}C$ NMR (151 MHz, $C_6D_6$) δ 145.18, 143.55, 140.58, 140.48, 136.69, 136.22, 132.04, 130.38, 130.05, 127.74, 126.48, 123.29, 111.46, 110.40, 36.31, 32.38, 32.06, 30.21, 30.16, 30.13, 30.12, 30.08, 29.87, 29.87, 23.16, 14.40. MS (MALDI-TOF) m/z calculated for $C_{40}H_{56}Br_2S_2$: 760.81, found 760.22.

2,6-dibromo-4-(3,5-ditetradecylbenzylidene)-4H-cyclopenta[2,1-b:3,4-b']dithiophene (2b). Under nitrogen, sodium ethoxide (0.453 g, 6.67 mmol) was added to a suspension of 2,6-dibromo-4H-cyclopenta[2,1-b:3,4-b']dithiophene (1.02 g, 3.03 mmol) in ethanol (10 mL) at 50° C. After 30 min of stirring, a 50° C. solution of 1b (1.51 g, 3.03 mmol) in ethanol (20 mL) was added dropwise. The reaction mixture was slowly heated and refluxed under nitrogen for 3 h. The reaction was then allowed to cool to room temperature, quenched with DI water (100 mL) and extracted with dichloromethane. The organic layer was washed with water (1×100 mL), brine (1×100 mL), and then dried with $MgSO_4$. After filtration through a Buchner funnel, volatiles were removed in vacuo and purification by flash chromatography (pentane as the eluent) yielded a red oil that solidified upon standing (1.51 g, 61%). $^1H$ NMR (600 MHz, $C_6D_6$) δ 7.24 (1H, s), 7.01 (2H, s), 6.83 (1H, s), 2.57 (4H, t, J=7.8 Hz), 1.67 (4H, m), 1.47-1.21 (44H, m), 0.92 (6H, t, J=6.7 Hz). $^{13}C$ NMR (151 MHz, $C_6D_6$) δ 145.18, 143.56, 140.59, 140.50, 136.71, 136.23, 132.04, 130.40, 130.05, 128.22, 128.06, 127.90, 127.74, 126.48, 123.29, 111.46, 110.41, 36.30, 32.37, 32.05, 30.22, 30.21, 30.21, 30.21, 30.16, 30.12, 30.06, 29.86, 29.85, 23.15, 14.39. MS (MALDI-TOF) m/z calculated for $C_{44}H_{64}Br_2S_2$: 816.47, found 816.28.

(4-(3,5-didodecylbenzylidene)-4H-cyclopenta[2,1-b:3,4-b']dithiophene-2,6-diyl)bis(trimethylstannane) (3a). In a nitrogen filled glove box, 2a (0.995 g, 1.31 mmol), 5 equiv. $Me_3SnSnMe_3$ (2.14 g, 6.54 mmol), and $Pd(PPh_3)_4$ (0.0982 g, $8.50\times10^{-2}$ mmol) were combined in a 35 mL microwave tube. The mixture was dissolved in approximately 25 mL of toluene. The tube was sealed, removed from the glove box and heated at 80° C. for 12 h. The reaction was allowed to cool and volatiles were removed in vacuo. The residue was extracted with hexanes, filtered, and poured into a separatory funnel containing 50 mL DI water. The organic layer was washed with DI water (3×50 mL), dried over anhydrous $MgSO_4$, and all volatiles removed in vacuo. Purification was accomplished by flash chromatography on reverse phase silica (ethanol containing 1% triethylamine as the eluent) affording a viscous red oil (0.862 g, 71%). $^1H$ NMR (600 MHz, $C_6D_6$, 298 K) δ 7.52 (1H, s), 7.42 (2H, s), 7.36 (1H, s), 7.30 (1H, s), 7.06 (1H, s), 2.64 (4H, t, J=7.8 Hz), 1.70 (4H, m), 1.47-1.21 (36H, m), 0.92 (6H, t, J=6.7 Hz), 0.31 (9H, s), 0.23 (9H, s). $^{13}C$ NMR (151 MHz, $C_6D_6$) δ 150.78, 147.29, 145.74, 143.29, 143.28, 137.52, 137.50, 136.41, 131.59, 131.14, 129.14, 129.13, 128.22, 128.06, 127.90, 36.43, 32.38, 32.15, 30.21, 30.21, 30.18, 30.16, 30.06, 30.02, 29.87, 23.16, 14.42, −8.30, −8.37. MS (MALDI-TOF) m/z calculated for $C_{46}H_{74}S_2Sn_2$: 928.33, found 928.12.

(4-(3,5-ditetradecylbenzylidene)-4H-cyclopenta[2,1-b:3,4-b']dithiophene-2,6-diyl)bis(trimethylstannane) (3b). In a nitrogen filled glove box, 2b (0.940 g, 1.15 mmol), 5 equiv. $Me_3SnSnMe_3$ (1.88 g, 5.75 mmol), and $Pd(PPh_3)_4$ (0.0864 g, $7.48\times10^{-2}$ mmol) were combined in a 35 mL microwave tube. The mixture was dissolved in approximately 25 mL of toluene. The tube was sealed, removed from the glove box and heated at 80° C. for 12 h. The reaction mixture was allowed to cool and volatiles were removed in vacuo. The residue was extracted with hexanes, filtered, and poured into a separatory funnel containing 50 mL DI water. The organic layer was washed with water (3×50 mL), dried over anhydrous $MgSO_4$, and all volatiles were removed in vacuo. Purification was accomplished by flash chromatography on reverse phase silica (ethanol containing 1% triethylamine as the eluent) affording a viscous red oil (0.839 g, 74%). $^1H$ NMR (600 MHz, $C_6D_6$, 298 K) δ 7.53 (1H, s), 7.43 (2H, s), 7.37 (1H, s), 7.31 (1H, s), 7.07 (1H, s), 2.64 (4H, t, J=7.8 Hz), 1.70 (4H, m), 1.47-1.21 (44H, m), 0.92 (6H, t, J=6.7 Hz), 0.31 (9H, s), 0.23 (9H, s). $^{13}C$ NMR (151 MHz, $C_6D_6$) δ 150.79, 147.30, 145.75, 143.30, 143.28, 137.53, 137.51, 136.44, 131.59, 131.15, 129.19, 129.14, 128.22, 128.06, 127.90, 36.43, 32.38, 32.15, 30.22, 30.19, 30.17, 30.13, 30.06, 30.01, 29.87, 23.16, 14.40, −8.32, −8.39. MS (MALDI-TOF) m/z calculated for $C_{50}H_{82}S_2Sn_2$: 984.39, found 984.12.

Synthesis of P4. A microwave tube was loaded with 3a (150 mg, 0.162 mmol) and 4,7-dibromobenzo[c][1,2,5]-thiadiazole (45.4 mg, 0.154 mmol). The tube was brought inside a glove box and approximately 6.5 mg of $Pd(PPh_3)_4$ and 750 μL of xylenes were added. The tube was sealed and subjected to the following reaction conditions in a microwave reactor: 120° C. for 5 min, 140° C. for 5 min, and 170° C. for 40 min. After this time, the reaction was allowed to cool leaving a solid gelled material. The mixture was precipitated into methanol and collected via filtration. The residual solid was loaded into an extraction thimble and washed successively with methanol (4 h), acetone (4 h), hexanes (12 h), hexanes:THF (3:1) (12 h), and again with acetone (2 h). The polymer was dried in vacuo to give 81 mg (67%) of a blue solid. GPC (160° C., 1,2,4-trichlorobenzene) Mn=8.0 kg $mol^{-1}$, Đ=1.21. $\lambda_{max}$ (solution, $CHCl_3$, 25° C.)/nm 812 (ε/L $mol^{-1}$ $cm^{-1}$ 18,161); $\lambda_{max}$ (thin film)/nm 893. $^1H$ NMR (600 MHz, $C_2D_2Cl_4$, 398 K) δ 8.55-6.35 (8H, br m), 3.35-2.51 (4H, br), 2.30-0.85 (46H, br).

Synthesis of P5. A microwave tube was loaded with 3a (150 mg, 0.162 mmol) and 4,7-dibromobenzo[c][1,2,5]-selenadiazole (52.6 mg, 0.154 mmol). The tube was brought inside a glove box and approximately 6.5 mg of $Pd(PPh_3)_4$ and 750 μL of xylenes were added. The tube was sealed and subjected to the following reaction conditions in a microwave reactor: 120° C. for 5 min, 140° C. for 5 min, and 170° C. for 40 min. After this time, the reaction was allowed to cool leaving a solid gelled material. The mixture was precipitated into methanol and collected via filtration. The residual solid was loaded into an extraction thimble and washed successively with methanol (4 h), acetone (4 h), hexanes (12 h), hexanes:THF (3:1) (12 h), and again with acetone (2 h). The polymer was dried in vacuo to give 89 mg (71%) of a green solid. GPC (160° C., 1,2,4-trichlorobenzene) Mn=10.1 kg mol-1, Đ=2.90. $\lambda_{max}$ (solution, $CHCl_3$, 25° C.)/nm 878 (ε/L $mol^{-1}$ $cm^{-1}$ 19,073); $\lambda_{max}$ (thin film)/nm 927. $^1H$ NMR (600 MHz, $C_2D_2Cl_4$, 398 K) δ 8.55-6.25 (8H, br m), 3.43-2.43 (4H, br m), 2.27-0.81 (46H, br).

Synthesis of P6. A microwave tube was loaded with 3a (150 mg, 0.162 mmol) and 4,7-dibromo[1,2,5]selenadiazolo-[3,4-c]pyridine (52.7 mg, 0.154 mmol). The tube was brought inside a glove box and approximately 6.5 mg of $Pd(PPh_3)_4$ and 750 μL of xylenes were added. The tube was sealed and subjected to the following reaction conditions in a microwave reactor: 120° C. for 5 min, 140° C. for 5 min, and 170° C. for 40 min. After this time, the reaction was allowed to cool leaving a solid gelled material. The mixture was precipitated into methanol and collected via filtration. The residual solid was loaded into an extraction thimble and washed successively with methanol (4 h), acetone (4 h), hexanes (12 h), hexanes:THF (3:1) (12 h), and again with acetone (2 h). The polymer was dried in vacuo to give 83 mg (66%) of a green solid. GPC (160° C., 1,2,4-trichlorobenzene) Mn=13.2 kg $mol^{-1}$, Đ=1.64. $\lambda_{max}$ (solution, $CHCl_3$, 25° C.)/nm 883 (ε/L $mol^{-1}$ $cm^{-1}$ 14,260); $\lambda_{max}$ (thin film)/nm 911. $^1H$ NMR (600 MHz, $C_2D_2Cl_4$, 398 K) δ 8.75-6.20 (7H, br m), 3.40-2.53 (4H, br m), 2.52-0.79 (46H, br).

Synthesis of P7. A microwave tube was loaded with 3a (150 mg, 0.162 mmol) and 4,9-bis(5-bromothiophen-2-yl)-6,7-dioctyl-[1,2,5]thiadiazolo[3,4-g]quinoxaline (113 mg, 0.154 mmol). The tube was brought inside a glove box and approximately 6.5 mg of $Pd(PPh_3)_4$ and 750 μL of xylenes were added. The tube was sealed and subjected to the following reaction conditions in a microwave reactor: 120° C. for 5 min, 140° C. for 5 min, and 170° C. for 50 min. After this time, the reaction was allowed to cool leaving a solid gelled material. The mixture was precipitated into methanol and collected via filtration. The residual solid was loaded into an extraction thimble and washed successively with methanol (4 h), acetone (4 h), hexanes (12 h), THF (12 h), and again with acetone (2 h). The polymer was dried in vacuo to give 153 mg (80%) of a black solid. GPC (160° C., 1,2,4-trichlorobenzene) Mn=18.8 kg $mol^{-1}$, Đ=1.91. $\lambda_{max}$ (solution, $CHCl_3$, 25° C.)/nm 1073 (ε/L $mol^{-1}$ $cm^{-1}$ 34,009); $\lambda_{max}$ (thin film)/nm 1079. $^1H$ NMR (600 MHz, $C_2D_2Cl_4$, 398 K) δ 9.31-6.25 (10H, br m), 3.30-2.45 (8H, br m), 2.46-0.75 (76H, br).

Synthesis of P8. A microwave tube was loaded with 3b (150 mg, 0.152 mmol) and 4,6-Bis(5-bromo-2-thienyl) thieno[3,4-c][1,2,5]thiadiazole (67.2 mg, 0.145 mmol). The tube was brought inside a glove box and approximately 6.5 mg of $Pd(PPh_3)_4$ and 750 μL of xylenes were added. The tube was sealed and subjected to the following reaction conditions in a microwave reactor: 120° C. for 5 min, 140° C. for 5 min, and 170° C. for 30 min. After this time, the reaction was allowed to cool leaving a solid gelled material. The mixture was precipitated into methanol and collected via filtration. The residual solid was loaded into an extraction thimble and washed successively with methanol (4 h), acetone (4 h), hexanes (12 h), THF (12 h), and again with acetone (2 h). The polymer was dried in vacuo to give 109 mg (74%) of a purple solid. GPC (160° C., 1,2,4-trichlorobenzene) Mn=14.4 kg $mol^{-1}$, Đ=1.64. $\lambda_{max}$ (solution, $CHCl_3$, 25° C.)/nm 963 (ε/L $mol^{-1}$ $cm^{-1}$ 22,843); $\lambda_{max}$ (thin film)/nm 967. $^1H$ NMR (600 MHz, $C_2D_2Cl_4$, 398 K) δ 8.55-6.25 (10H, br m), 3.25-2.43 (4H, br m), 2.50-0.51 (54H, br).

Results and Discussion

Figure 5:
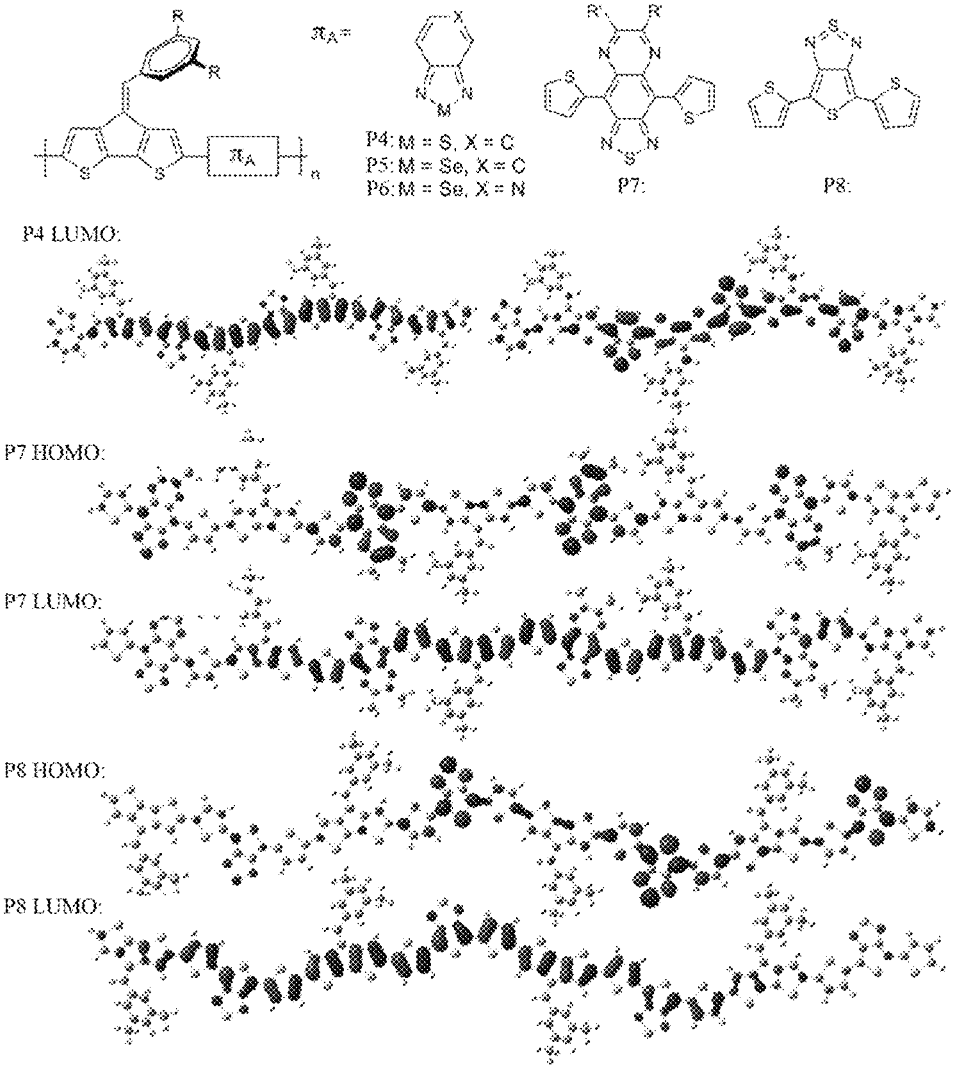
FIG. 5 shows optimized ground-state ($S_0$) geometric structures for P4, P7, and P8, and pictorial representations of the HOMO and LUMO wavefunctions as determined at the B3LYP/6-31G(d) level of theory.

FIG. 5 displays the copolymer structures considered in this study. FIG. 5 shows optimized ground-state ($S_0$) geometric structures for P4, P7, and P8, and pictorial representations of the HOMO and LUMO wavefunctions as determined at the B3LYP/6-31G(d) level of theory. DA polymers comprised of a C═CPh substituted CPDT donor (R, R'═$CH_3$ for theoretical examination) and acceptors based on 2,1,3-benzothiadiazole (BT, P4), 2,1,3-benzoselenadiazole (BSe, P5), pyridal[2,1,3]selenadiazole (PSe, P6), thiophene flanked [1,2,5]thiadiazolo[3,4-g]quinoxaline (TQ, P7), and thiophene flanked thieno[3,4-c][1,2,5]thiadiazole (TT, P8), were theoretically examined on the basis of incorporating design elements anticipated to lead to progressive band gap narrowing. The optimized ground-state ($S_0$) structures, electronic properties, and lowest excited-state ($S_1$) energies of P4-P8 were calculated with density functional theory (DFT) and time-dependent DFT, respectively, at the B3LYP/6-31G(d) level of theory. The HOMO and LUMO wavefunctions of P4, P7 and P8 are highlighted in FIG. 5 (n=4 shown for clarity). P5 and P6 display similar structural and nodal characteristics to P4.

The comparatively lower bandgap of P4

$$\left(E_g^{DFT} = 1.34 \text{ eV}\right)$$

relative to P4a and P4b $$(E_g^{DFT} = 1.56 \text{ eV and } 1.47 \text{ eV},$$

respectively) can be ascribed to planarization of the CPDT core (in contrast to the modest curvature of C, Si, and C═NPh substituted analogs), and a reduction in the overall bond length alternation. P4 is highly planar with negligible rotational disorder (donor/acceptor dihedral angle=179.36°), which contributes to extended electron delocalization. Solubilizing substituents are oriented nearly orthogonal and situated at a site remote to the polymer backbone in P4. Collectively, these structural features are likely to permit improved π-interactions, further mitigate backbone torsion, and increase resilience toward conjugation saturation behavior. The lowest vertical excitation energy $$\left(E_g^{vert}\right),$$

which more appropriately approximates the onset of optical absorption, was obtained through extrapolation of a series of oligomers (n=1-6) to n→∞ and fitting the data to the Kuhn equation. In moving across the series we note a progressive narrowing of $$E_g^{vert}: P4 = 1.04 \text{ eV}; P5 = 0.94 \text{ eV}; P6 = 0.88 \text{ eV}; P7 = 0.68 \text{ eV}; P8 = 0.63 \text{ eV},$$

illustrating iterative control throughout the NIR and extension into the SWIR. Structural and electronic characteristics associated with C═CPh substitution manifest in other donor/heterocyclic acceptor configurations (P7 and P8). As in several other similar materials, the HOMO is delocalized over the whole π-system and the LUMO is more localized on the acceptor. The spectra of the $(P4\text{-}P8)_6$ oligomers exhibit one dominant $S_0 \rightarrow S_1$ transition of HOMO→LUMO character with large oscillator strengths, consistent with DA polymers commonly utilized in photoresponsive devices.

Band gap engineering at low energies will require careful chemical, electronic, and structural control. Modular side-chain engineering approaches are also necessary owing to the immense difficulty in achieving the appropriate phase characteristics associated with polymers and heterojunction blends. To address these challenges, the inventors developed a synthetic route amenable to systematic structural and electronic variation as depicted in Scheme 4, which shows the synthesis of P4-P8. Linear ($R=C_{12}H_{25}$ and $C_{14}H_{29}$) solubilizing groups were introduced into the 3,5-positions of the Ph ring to minimize backbone torsion and promote solubility. The coupling of dodecylzinc bromide and tetradecylzinc bromide with 3,5-dibromobenzaldehyde was accomplished using a Pd-PEPPSI-IPr pre-catalyst. Optimization of the solvent system (toluene/THF=1:3), catalyst loading (3.5%), and heating of the reaction mixture ensured high conversions, providing the coupled products (1a and 1b) in overall yields>60% in the presence of the aldehyde functionality. The reaction of 1a and 1b with 2,6-dibromo-4H-cyclopenta[2,1-b:3,4-b']dithiophene using sodium ethoxide (NaOEt) in ethanol (EtOH) affords the desired C=CPh substituted CPDT donors (2a and 2b) in 71% and 61% yield. Reaction with 5 equiv. of hexamethylditin ($Me_3SnSnMe_3$) using $Pd(PPh_3)_4$ in toluene affords the bis-trimethylstannyl donors (3a and 3b) in >70% yields.

SCHEME 4

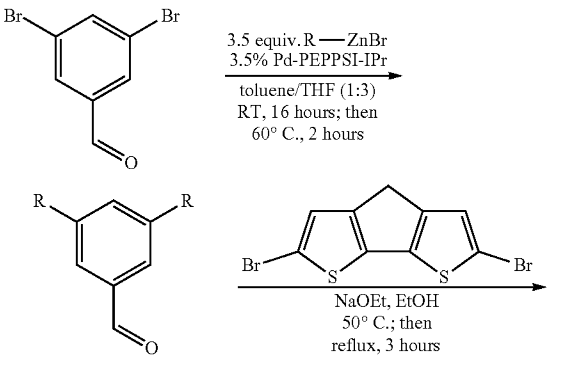

1a: $R = C_{12}H_{25}$
1b: $R = C_{14}H_{29}$

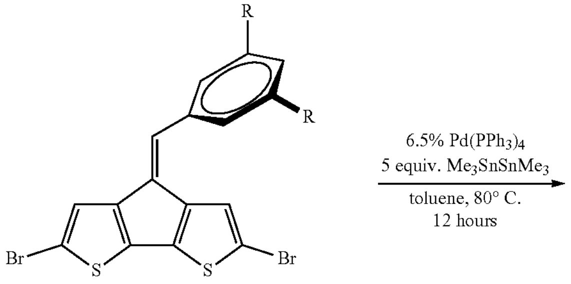

2a: $R = C_{12}H_{25}$
2b: $R = C_{14}H_{29}$

-continued

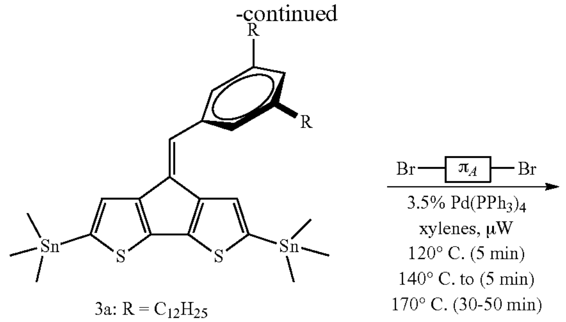

3a: $R = C_{12}H_{25}$
3b: $R = C_{14}H_{29}$

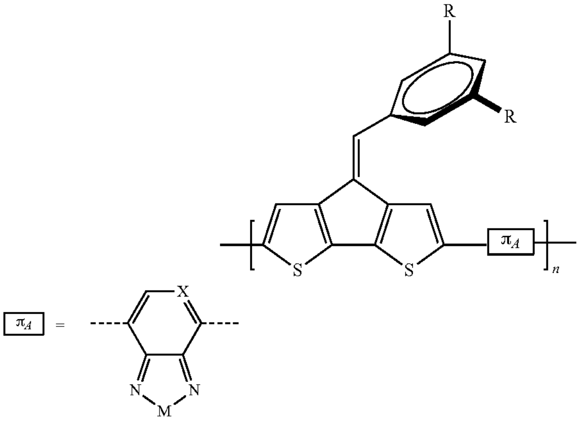

P4: M = S, X = C, $R = C_{12}H_{25}$
P5: M = Se, X = C, $R = C_{12}H_{25}$
P6: M = Se, X = N, $R = C_{12}H_{25}$

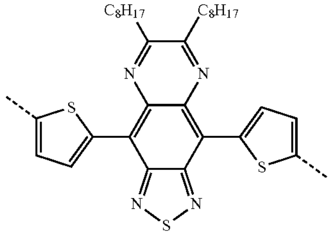

P7: $R = C_{12}H_{25}$

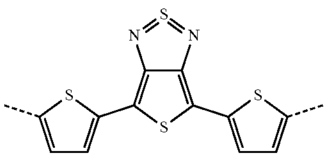

P8: $R = C_{14}H_{29}$

Copolymerization of 3a with 4,7-dibromobenzo[c]-[1,2,5]thiadiazole (P4), 4,7-dibromobenzo[c][1,2,5]-selenadiazole (P5), 4,7-dibromo-[1,2,5]selenadiazolo[3,4-c]pyridine (P6) 4,9-bis(5-bromothiophen-2-yl)-6,7-dioctyl-[1,2,5]thiadiazolo[3,4-g]quinoxaline (P7), and 3b with 4,6-bis(5-bromo-2-thienyl)thieno[3,4-c][1,2,5]thiadiazole (P8) was carried out via microwave heating using $Pd(PPh_3)_4$ (3.5 mol %) as the catalyst in xylenes. This resulted in the rapid formation of polymers in reaction times <60 minutes and isolated yields of 65-80% after purification by soxhlet extraction. P7 ($R=C_{12}H_{25}$, $R'=C_8H_{17}$) and P8 ($R=C_{14}H_{29}$) required additional solubilizing units to promote solubility of the extended π-systems in common organic solvents used for solution processing. Gel permeation chromatography (GPC) at 160° C. in 1,2,4-trichlorobenzene showed number average molecular weights ($M_n$) ~8-19 kg $mol^{-1}$ ensuring >10 repeat units to allow a comparison between experiment and theory, albeit well below typical high performance materials.

Figure 6:
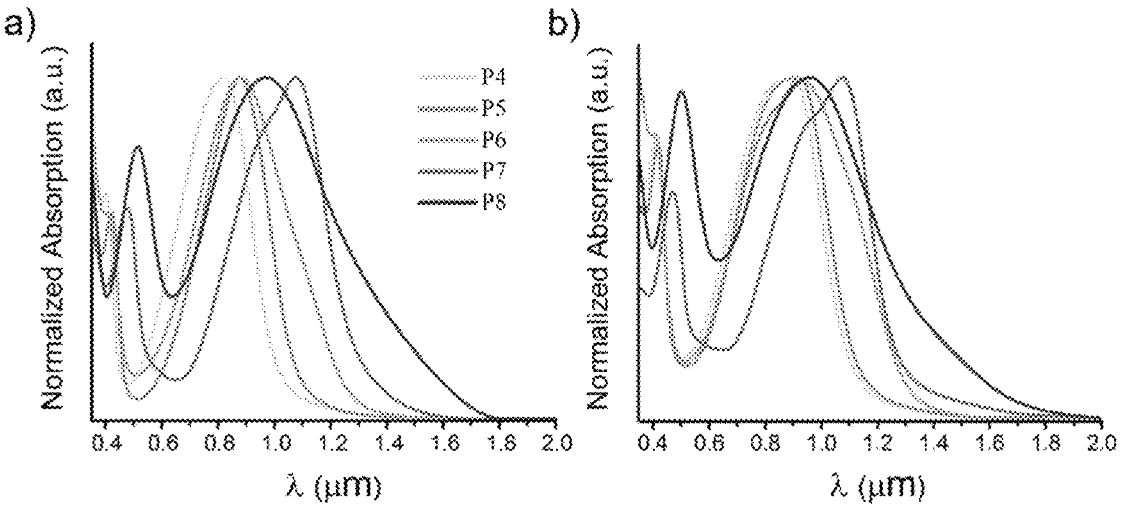
FIG. 6 shows a graphical illustration of: a) absorption spectra of P4-P8 at 25° C. in chloroform ($CHCl_3$) and b) as thin-films.

Absorption spectra of P4-P8 at 25° C. in chloroform ($CHCl_3$) and as thin-films are shown in FIG. 6. Broad absorption profiles that peak in the NIR ($\lambda_{max}$=0.89-1.08 μm) with electronic transitions extending into the SWIR (~1.8 μm) are evident. In transitioning from $CHCl_3$ at 25° C. to the solid state, $\lambda_{max}$ and the onset of optical absorption exhibit a bathochromic shift highly dependent on the structure of the polymer, indicating intermolecular interactions in the solid state. The optical band gap $$(E_g^{opt})$$

of P4 is ~1.1 eV, as estimated from the absorption onset of the thin film. Cyclic voltammetry (CV) is widely utilized to determine the frontier orbital energy levels of the donor and acceptor components in organic photoresponsive devices. CV shows that the HOMO is located at −5.01 eV and the LUMO at −3.65 eV, as determined by the oxidation and reduction onset, respectively. This gives an electrochemical band gap $$(E_g^{elec})$$

of 1.36 eV, in excellent agreement with theory $$(E_g^{DFT} = 1.34 \text{ eV}).$$

An increase exists in the HOMO and stabilization of the LUMO relative to P4a $$(R = C_{12}H_{25};\ E_{HOMO} = -5.33 \text{ eV};\ E_{LUMO} = -3.52 \text{ eV},\ E_g^{elec} \text{ of } 1.81 \text{ eV}).$$

Comparison with the corresponding C═NPh substituted analog shows an increase in both the HOMO-LUMO energies and overall narrowing of the bandgap $$(P4b\text{: } Ph = 3,5\text{-}C_{12}H_{25};\ E_{HOMO} = -5.40 \text{ eV};\ E_{LUMO} = -3.96 \text{ eV},\ E_g^{elec} \text{ of } 1.44 \text{ eV}).$$

Substitution of BT for BSe (P5), wherein a single atom in the benzochalcogenodiazole unit is varied from sulfur (S) to selenium (Se), results in red-shifted absorption profile ($\lambda_{max}$=0.93 μm) with measurable absorbance extending to λ>1.4 μm in the solid state. The electrochemical characteristics reflect a modest reduction in the LUMO energy $$(E_{HOMO} = -5.01 \text{ eV};\ E_{LUMO} = -3.75 \text{ eV};\ E_g^{elec} \text{ of } 1.26 \text{ eV}).$$

A further reduction is obtained by incorporating a PSe analog (P6), resulting in higher electron affinity in the backbone and a narrower band gap $$(E_g^{opt} = 0.94 \text{ eV}).$$

A pronounced bathochromic shift is evident in transitioning to the solid state in P6, leading to measurable absorbance extending to λ>1.6 μm. It should be noted that the PSe for BSe substitution also reduces the symmetry of the repeat unit, which may account for the broad spectral features. Electrochemical measurements are consistent with a reduction in both the HOMO-LUMO energies $$(E_{HOMO} = -5.10 \text{ eV};\ E_{LUMO} = -3.95 \text{ eV};\ E_g^{elec} \text{ of } 1.15 \text{ eV}).$$

Heteroannulated variants of BT, such as thiadiazoloquinoxaline (TQ), result in a significant reduction in the LUMO, which can be mitigated by the presence of thiophene spacers. A further narrowing of the bandgap was obtained in P7 ($\lambda_{max}$=1.08 μm) with measurable absorbance extending to λ>1.6 μm in the solid state. A plot of absorbance squared is consistent with low energy excitations at these wavelengths and $$E_g^{opt} \sim 0.85 \text{ eV } (1.46 \text{ μm}).$$

The pronounced absorption shoulder and similar spectral profiles in solution and the solid state are consistent with strong intermolecular interactions in P7. Substitution of the TQ-based acceptor with a thiophene flanked thieno[3,4-c][1,2,5]thiadiazole heterocycle results in a further redshift consistent with theoretical predictions $$(P8\text{: } E_{HOMO} = -4.85 \text{ eV};\ E_{LUMO} = -3.95 \text{ eV};\ E_g^{elec} \text{ of } 0.90 \text{ eV};\ E_g^{opt} \sim 0.74 \text{ eV}).$$

The utility of bridgehead C═CPh substitution in mitigating conjugation saturation behavior is evident in view of values for $$E_g^{elec} \text{ and } E_g^{opt}$$

that are similar with those from theory $$(E_g^{DFT} \text{ and } E_g^{vert}),$$

compared in Table 1. P4-P8 retain the appropriate difference in electrochemical potential relative to common fullerene acceptors, such as [60]PCBM and [70]PCBM (LUMO~−4.2 and −4.3 eV, respectively), providing the necessary driving force needed for efficient charge separation.

TABLE 1

Optical, electrochemical, and calculated properties of P4-P8.

| | $\lambda_{max}$ (μm)[a] | $E_g^{opt}$ [eV][b] | $E_g^{vert}$ [eV] | $E_{HOMO}/E_{LUMO}$ [eV][c] | $E_g^{elec}$ [eV][d] | $E_g^{DFT}$ [eV][e] |
|---|---|---|---|---|---|---|
| P4 | 0.89 | 1.11 | 1.04 | −5.01/−3.65 | 1.36 | 1.34 |
| P5 | 0.93 | 1.08 | 0.94 | −5.01/−3.75 | 1.26 | 1.24 |
| P6 | 0.91 | 0.94 | 0.88 | −5.10/−3.95 | 1.15 | 1.12 |
| P7 | 1.08 | 0.85 | 0.68 | −4.80/−3.66 | 1.14 | 0.91 |
| P8 | 0.97 | 0.74 | 0.63 | −4.85/−3.95 | 0.90 | 0.88 |

[a]Films spin coated from a $C_6H_5Cl$ solution (10 mg $mL^{-1}$).
[b]Estimated from the absorption onset of the film.
[c]$E_{Homo}$ calculated from the onset of oxidation, $E_{LUMO}$ calculated from the onset of reduction.
[d]$E_g^{elec}$ calculated from the difference between $E_{HOMO}$ and $E_{LUMO}$.
[e]*HOMO/LUMO* orbital energy gap ($E_g^{DFT}$).

Figure 7:
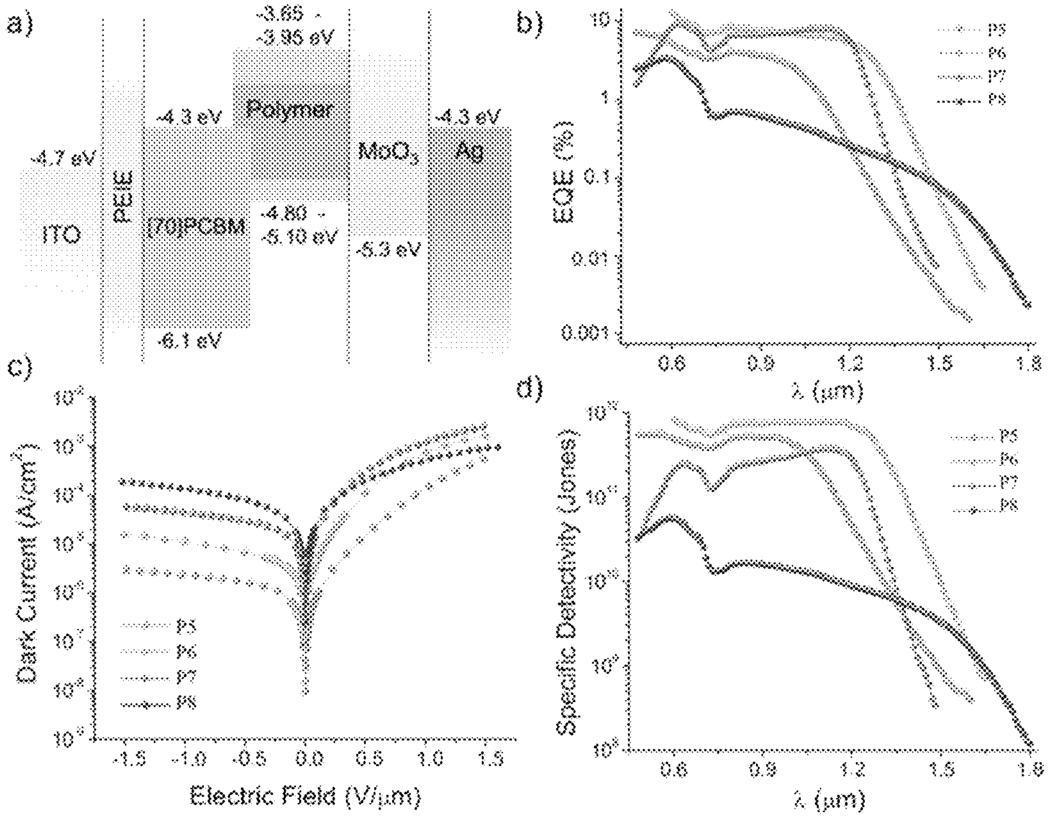
FIG. 7 shows graphical illustrations of: a) Energy diagram of the ITO/PEIE/Polymer:[70]PCBM/$MoO_3$/Ag photodiode, b) External quantum efficiency, c) current-voltage (I-V) characteristics measured in the dark, and d) Detectivity of polymer photodetectors.

To demonstrate the ultimate utility of copolymers based on C═CPh substitution, BHJ photodetectors were fabricated using P5-P8 in combination with [70]PCBM. FIG. 7 shows: a) Energy diagram of the ITO/PEIE/Polymer:[70]PCBM/$MoO_3$/Ag photodiode, b) External quantum efficiency, c) current-voltage (I-V) characteristics measured in the dark, and d) Detectivity of polymer photodetectors. The device test structure of the photodiode is shown in FIG. 7*a* and was used for screening purposes in the absence of significant optimization. The fabrication and measurement procedures were carried out as previously reported. Based on the energy level diagram in FIG. 7*a*, charge separated carriers can be efficiently generated by PET and subsequently transported via the BHJ nanomorphology to opposite electrodes. The low work function of 80% ethoxylated polyethylenimine (PEIE) modified indium tin oxide (ITO) favors the collection of electrons at the cathode. $MoO_3$ is used as the electron blocking layer at the anode. From initial examination, the devices in FIG. 7*b* show external quantum efficiencies (EQEs) similar to previously reported narrow bandgap organic devices demonstrating that photons absorbed by P5-P8 contribute to the photocurrent. Spectrally resolved NIR-SWIR EQEs of 4%, 7%, 6%, and 0.2% were measured at λ=0.90, 1.10, 1.20, and 1.35 μm for P5, P6, P7, and P8 based devices, respectively. We note that devices based on the P8:[70]PCBM combination generally resulted in poor film quality when compared to P5-P7 devices.

The specific detectivity (D*) is the main figure of merit that takes both dark current (FIG. 7*c*) and EQE (FIG. 7*b*) into account. It is defined as: $D^*=(A\Delta f)^{1/2}R/i_n$, where $R=J_{photo}/P_{illumin}$ is the responsivity related to EQE, A is the effective photodetector area, Δf is the electrical bandwidth, and $i_n$ is the noise current measured in the dark and is shown in FIG. 7*d*. In P5 devices, peak specific detectivities at zero bias, where $D^*>10^{11}$ Jones are obtained in the region of maximum absorption (0.6<λ<1.1 μm). At $\lambda_{max}$, $D^*=5\times10^{11}$ Jones is obtained with measurable photocurrent spanning the range of absorption ($D^*=1\times10^{10}$ Jones at λ=1.3 μm). P6 devices exhibit $D^*>10^{11}$ Jones within a range of 0.6<λ<1.3 μm, $D^*=2\times10^{11}$ Jones at λ=1.33 μm, and $D^*>1\times10^{10}$ Jones at λ=1.5 μm. Addition of [70]PCBM alters the absorption spectra of P6, leading to a bathochromic shift and increased photocurrent at longer λ. P7 devices operate between 0.6<λ<1.5 μm with $D^*=3\times10^{11}$ Jones at $\lambda_{max}$=1.2 μm. It should be noted that D* obtained for devices based on P6 and P7, in the absence of optimization, are greater than fused porphyrins ($D^*=1.6\times10^{11}$ Jones at λ=1.09 μm and $2.3\times10^{10}$ Jones at λ=1.35 μm) and are comparable to cooled PbS detectors in this range. P8 devices exhibit $D^*>10^9$ Jones within a range of 0.6<λ<1.65 μm, with measurable photocurrent spanning the range of absorption ($D^*=1.2\times10^8$ Jones at λ=1.8 μm). The photocurrent generation of P8 spans the technologically relevant region from 1-1.8 μm, traditionally accomplished using alloys of $Ga_xIn_{1-x}As$. FIG. 7*d* demonstrates a progressive increase in the dark current as the bandgap is narrowed potentially limiting D* obtained with the P8:[70]PCBM combination, but pointing toward improvements associated with material and device optimization.

CONCLUSIONS

These results demonstrate detection of longer λ light than was previously possible using OSCs and highlight the potential of tunable NIR-SWIR photoresponsive DA polymers that can be applied in a variety of photodetection applications traditionally limited to inorganic semiconductors, colloidal quantum dots, and carbon nanotubes. From a broader perspective, more precise narrow bandgap DA polymers of the present invention will enable targeted engineering of the bandgap at low energies, the generation of materials for fundamental studies, and enable new functionality in the IR spectral regions.

Donor-Acceptor Conjugated Polymers with Tunable Open Shell Configurations and High Spin Ground States Organic semiconductors with tunable electronic structures, cooperative electronic properties based on n-electrons, and controlled spin pairing underlie the development of next generation (opto)electronic technologies. In particular, n-conjugated molecules with intramolecular high spin ground states are of fundamental interest for revealing emergent phenomena and are anticipated to play a role in future magnetic, spintronic, and quantum information technologies. While significant achievements have been made in the fundamental chemistry of organic high spin molecules, nearly all are unstable or highly localized. The present invention demonstrates the coalescence of molecular design features that gives rise to a charge neutral, very narrow bandgap donor-acceptor conjugated polymer with a high spin (S=1) ground state. The material is synthesized using conventional/scalable synthetic approaches, is solution-processable, adopts an amorphous solid-state morphology, demonstrates intrinsic electrical conductivity, and exhibits stability under ambient conditions. Quantum chemical calculations demonstrate that very narrow bandgaps afforded through extended conjugation are related to the coexistence of nearly degenerate states, and that building blocks bearing non-disjoint (cross-conjugated) functionalities along the polymer backbone can modulate the electronic topology and promote intramolecular ferromagnetic coupling in the extended π-system. Electron paramagnetic resonance and superconducting quantum interference device magnetometry studies are consistent with antiferromagnetically interacting triplet (S=1) polymer chains exhibiting a high-to-low spin energy gap of $9.30\times10^{-3}$ kcal mol (J=1.62 $cm^{-1}$, 2 $J/k_B$=4.67 K). The results provide new molecular design guidelines to access, stabilize, and tune the properties of high spin diradicals with novel spin-spin interactions and magnetic functionalities.

Results and Discussion.

Figure 8:
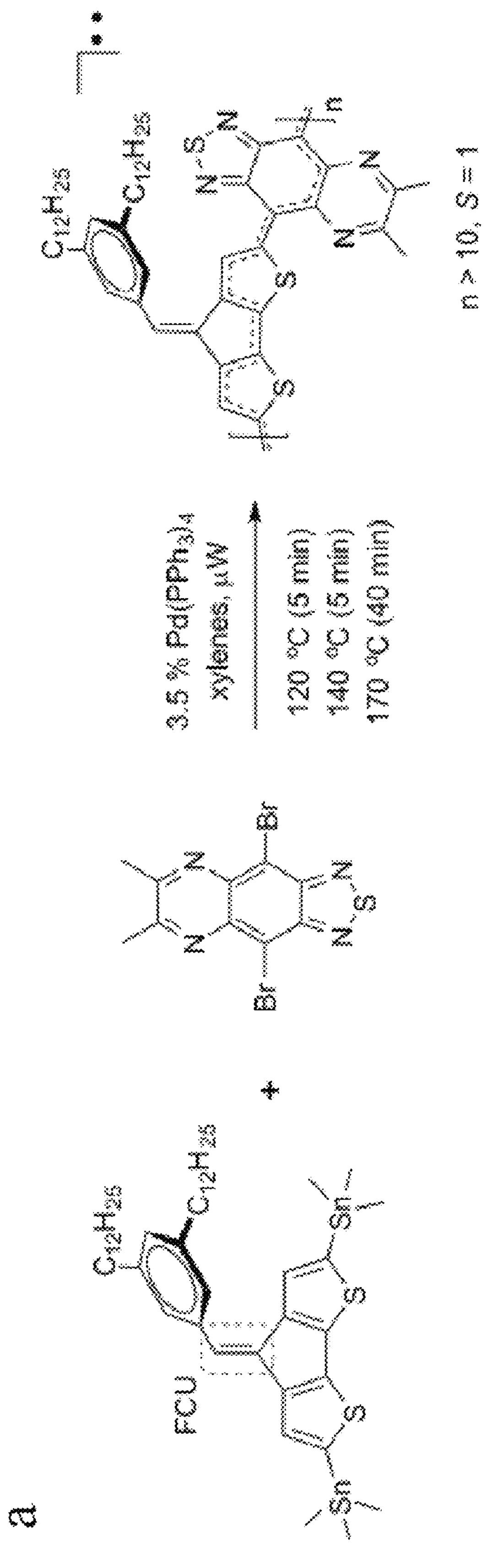
FIG. 8 shows a summary of: a) The synthesis and molecular structure of the polymer (P1) with the exocyclic substituent acting as an FCU installed at the bridgehead position (red box), b) Spin unrestricted density functional theory (UDFT) indicates that the singlet-triplet gap rapidly approaches an inflection point as conjugation length increases, and c) Electron density contours calculated at the UDFT level of theory for singly occupied molecular orbitals (SOMO) of an oligomer of P1.
Figure 8:
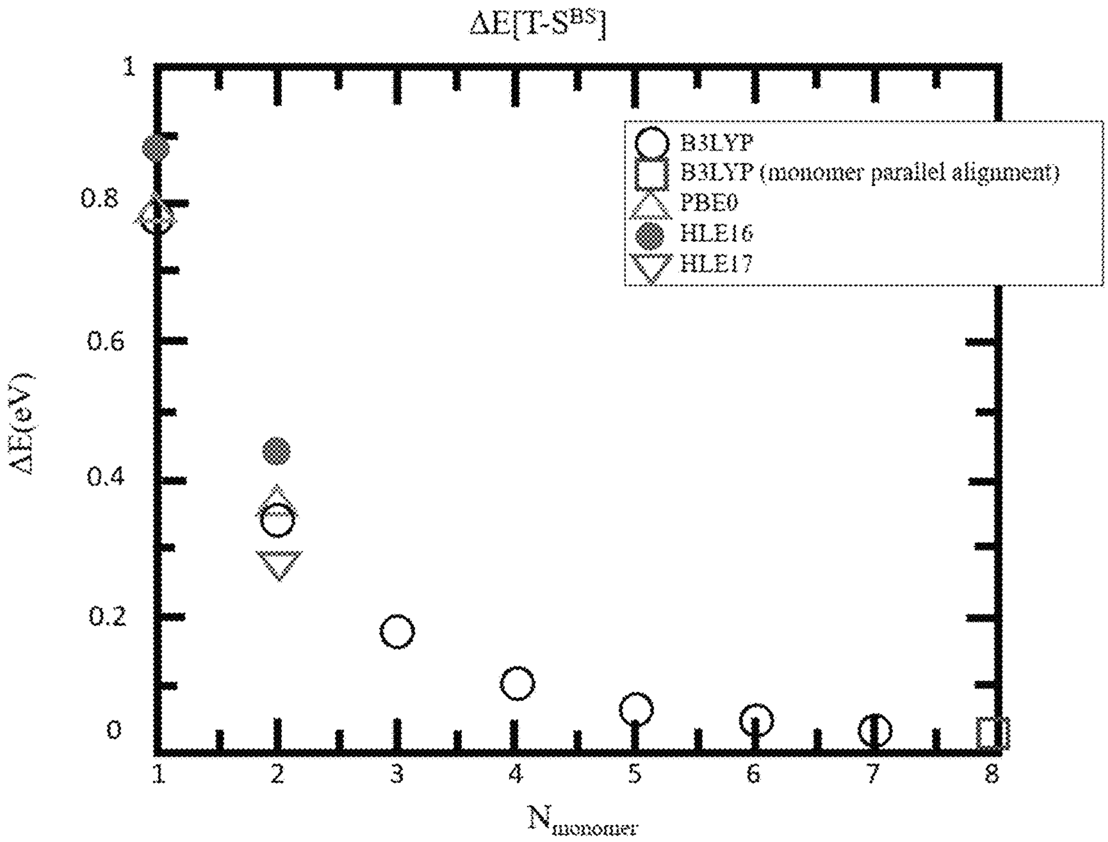
Figure 8:
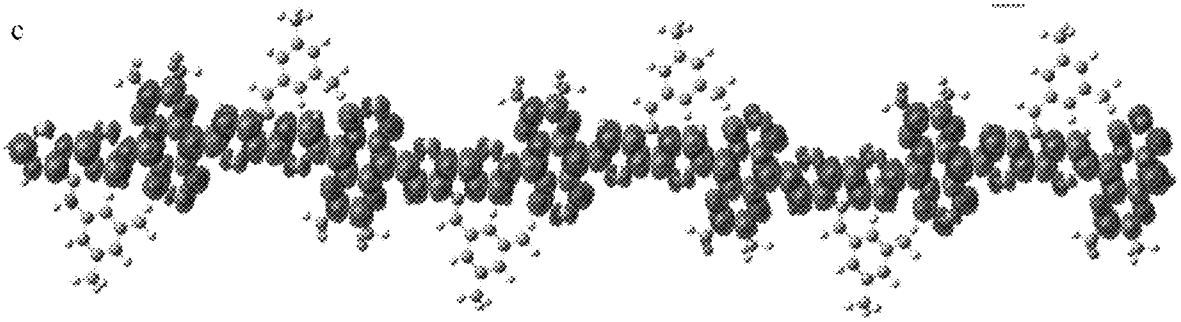

The complexities associated with the synthesis and application of high spin organic systems motivated the investigation of design strategies which may favor and stabilize this electronic configuration. A high spin (S=1), very narrow bandgap DA copolymer was produced and synthesized as follows. The inventors first identified a narrow bandgap copolymer structure $$\left(E_g^{DFT} < 0.2 \text{ eV}\right)$$

comprised of an exocyclic olefin (C═CPh) substituted 4H-cyclopenta[2,1-b:3,4-b]dithiophene (CPDT) donor and a strong thiadiazoloquinoxaline (TQ) acceptor (C═CPhCPDT-alt-TQ, P1 in FIG. 8) using density functional theory. The invention includes use of any electron-deficient heteroaromatic ring system as the acceptor. FIG. 8 shows a summary of molecular design and synthesis: a) The synthesis and molecular structure of the polymer (P1) with the FCU installed at the bridgehead position (red box); b) Spin unrestricted density functional theory (UDFT) indicates that the singlet-triplet gap rapidly approaches an inflection point as conjugation length increases; and c) Electron density contours calculated at the UDFT level of theory for singly occupied molecular orbitals (SOMO) of an oligomer of P1. Closely related alternating donor/acceptor units along the backbones of neutral polymers have proven beneficial for achieving promising optoelectronic functionality. The cross-conjugated olefin substituent at the donor bridgehead stabilizes the HOMO-LUMO through planarization of the polymer backbone, affords careful control of molecular indices such as bond-length alternation (BLA), torsion, and allows strategic placement of solubilizing substituents necessary for solution processing. This steric arrangement promotes a more fully conjugated system and strong DA intramolecular electronic interactions affording control of the bandgap at very low energies. Ancillary substituents on the TQ acceptor promote the adaptation of biradicaloid (open-shell) character through "aromatic" stabilization not available to the canonical structure and fosters intramolecular π-delocalization offering a balance between electron localization and effective conjugation. This topology imposed orbital degeneracy is further modulated by the (non-disjoint) cross-conjugated olefin substituent at the bridgehead position, which acts as an intramolecular FCU and inverts the energy of spin pairing, which only becomes possible at longer chain length (n>10). The extended electronic character of the polymer affords thermodynamic stabilization while long alkyl chains orthogonal to the polymer backbone provide kinetic stabilization and preclude dimerization/crosslinking.

Nature of the Ground State Electronic Structure.

Figure 9:
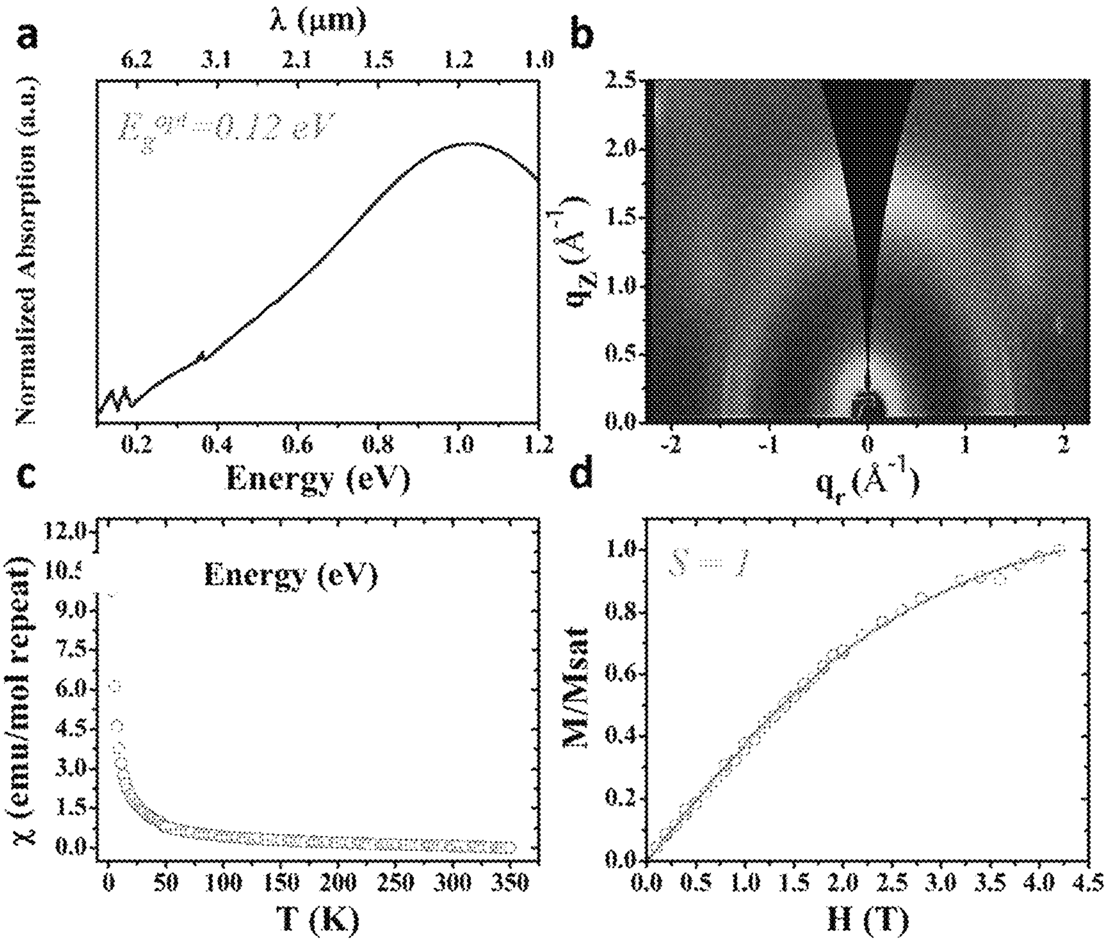
FIG. 9 shows optical, structural, and spin-spin exchange characteristics.

The properties of P1 were studied by Electron paramagnetic resonance (EPR) spectroscopy (frozen matrix) and superconducting quantum interference device (SQUID) magnetometry of solid powder samples. The EPR Intensity from 4 to 50 K reveals a continuous decrease of the spin susceptibility. The data can be fitted to the Bleaney-Bowers equation from 4 to 25 K and yields a high-to-low spin energy gap, $\Delta E(T_1 \rightarrow S_0)$, of $9.3\times10^{-3}$ kcal $mol^{-1}$ (J=1.62 $cm^{-1}$, 2 $J/k_B$=4.67 K). The temperature dependence of the magnetic susceptibility indicated a paramagnetic ground state after subtraction of the diamagnetic component (FIG. 9*c*). FIG. 9 shows optical, structural, and spin-spin exchange characteristics:

$$a)\ E_g^{opt}$$

was estimated from the absorption onset ($\lambda_{onset}$≈0.12 eV) via FTIR on NaCl substrates; b) Two-dimensional GIWAXS pattern of a thin film on a silicon substrates. The color scale shown in panel corresponds to the scattered intensities (a.u.); c) Temperature-dependent susceptibility measurement using a SQUID magnetometer is consistent with the EPR Intensity measurement after subtraction of the diamagnetic background; and d) The ground-state spin-multiplicity was confirmed from M(H) measurement at 3 K, confirming the triplet is lower in energy than an open-shell singlet ground-state. The triplet ground state was unequivocally confirmed via SQUID by fitting the data obtained from variable-field magnetization measurements at 3 K to the Brillouin function for J≈kT[26] (FIG. 9*d*). Inclusion of a mean-field correction term (Θ) yielded S=0.91 and Θ=2.1 with the best fit obtained when $\Delta E_{st}$ was set to 4.67 K, the value determined in the variable-temperature EPR measurement. The positive mean-field parameter indicates weak intermolecular antiferromagnetic interaction between neighboring spins on different polymer chains.

Examples B

Example 6. This example involved the detailed material synthesis procedure for P1B. A microwave tube was loaded with (4-(3,5-didodecylbenzylidene)4H-cyclopenta[2,1-b:3,4-b']dithiophene-2,6-diyl)bis(trimethylstannane) (150 mg, 0.162 mmol) and 4,9-dibromo-6,7-dimethyl-[1,2,5]thiadiazolo[3,4-g]quinoxaline (57.8 mg, 0.155 mmol). This tube was brought inside the glovebox, and 750 μL of a $Pd(PPh_3)_4$/xylenes stock solution (3.5 mol %) was added. The tube was sealed and subjected to the following reaction conditions in a microwave reactor with stirring: 120° C. for 5 min, 140° C. for 5 min, and 170° C. for 30 min. After this time, the reaction was allowed to cool, leaving a solid gelled material. The mixture was precipitated into methanol and collected via filtration. The residual solid was loaded into an extraction thimble and washed successively (under a $N_2$ atmosphere and in the absence of light) with methanol (2 h), acetone (2 h), hexanes (2 h), a 1:1 mixture of hexanes and tetrahydrofuran (12 h), and then acetone (2 h). The polymer was dried in vacuo to give 85 mg (68%) of a black solid. Data are as follows: Mn=15.0 $kgmol^{-1}$ and Đ=1.50; $^1$HNMR (600 MHz, 1,1,2,2-tetrachloroethane-$d_2$, 398 K); δ 8.00 to 6.50 (6H, br m), 3.60 to 2.50 (4H, br m), 2.30 to 1.15 (40H, br m), 1.10 to 0.80 (6H, br in), and 0.72 (6H, s); absorption; $\lambda_{max}$ (solution, 1,2-dichlorobenzene, 25° C.)=1.25 μm, $\lambda_{max}$ (thin film)=1.30 μm, and ε=16,057 L $mol^{-1}$ $cm^{-1}$.

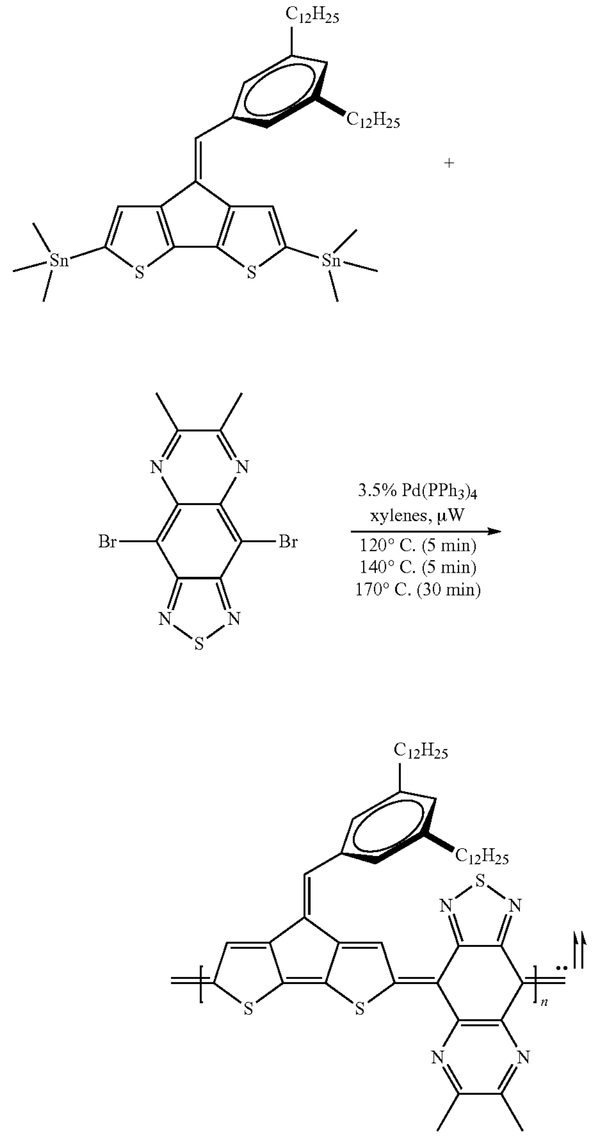

P1B

Example 7. This example involved the detailed material synthesis procedure for P2B. A microwave tube was loaded with (4-(3,5-ditetradecylbenzylidene)-4H-cyclopenta[2,1-b:3,4-b']dithiophene-2,6-diyl)bis(trimethylstannane) (88 mg, 0.089 mmol) and 4,9-dibromo-6,7-dimethyl-[1,2,5)thiadiazolo[3,4-g)quinoxaline (31.8 mg, 0.085 mmol). The tube was brought inside the glovebox, and 410 μL of a Pd(PPh3) 4/xylenes stock solution (3.5 mol %) was added. The tube was sealed and subjected to the following reaction conditions in a microwave reactor with stirring: 120° C. for 5 min, 140° C. for 5 min, and 170° C. for 30 min. After this time, the reaction was allowed to cool, leaving a solid gelled material. The mixture was precipitated into methanol and collected via filtration. The residual solid was loaded into an extraction thimble and washed successively (under a $N_2$ atmosphere and in the absence of light) with methanol (2 h), acetone (2 h), hexanes (2 h), a 1:1 mixture of hexanes and tetrahydrofuran (12 h), and then acetone (2 h). The polymer was dried in vacuo to give 62 mg (77%) of a black solid. Absorption: $\lambda_{max}$ (solution, $CHCl_3$, 25° C.)=1.21 μm, $\lambda_{max}$ (thin film)=1.32 μm.

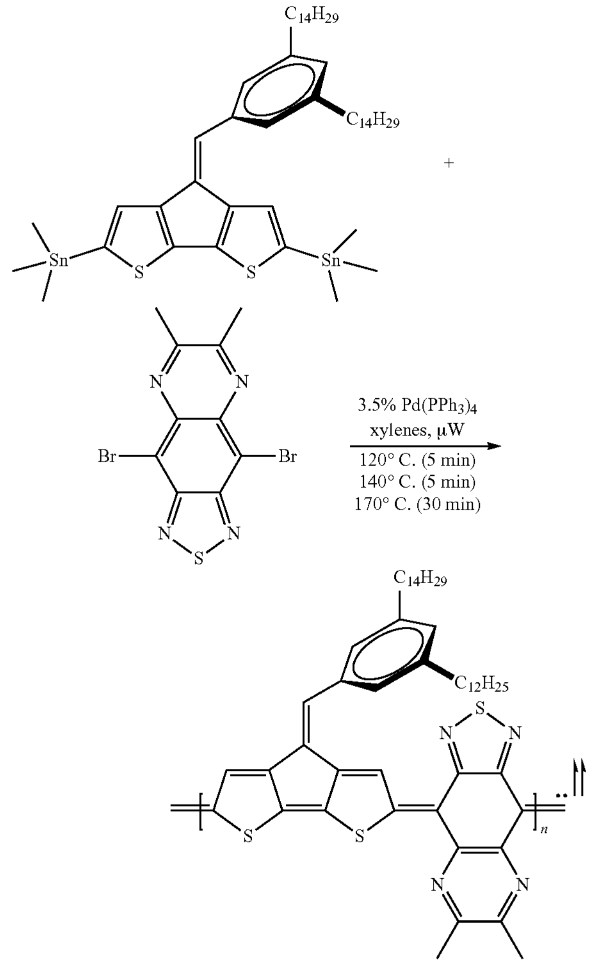

Example 8. This example involved the material synthesis procedure for P3B, P4B, and P5B. General procedure for the polymer synthesis: (4,4-dialkyl-4H-cyclopenta[2,1-b:3,4-b']dithiophene-2,6-diyl)bis(trimethyl-stannane) (0.107 mmol, 1.05 equiv), 4,9-dibromo-6,7-dialkyl-[1,2,5]thiadiazolo[3,4-g] quinoxaline (0.101 mmol, 1.0 equiv) were weighed into a microwave tube with a stir bar and 3.5 mol % of $Pd(PPh_3)_4$ in 250 μL xylene was added inside the glove box. The tube was sealed and subjected to the reaction conditions in a microwave reactor. The reaction mixture was cooled to room temperature, and the polymer was precipitated into methanol. The polymer was then filtered and purified by Soxhlet extraction (under $N_2$ atmosphere and protected from light) using methanol (2 h), acetone (2 h), hexanes (12 h) and followed by acetone (2 h) in the end. The residual solvent under reduced pressure was removed to afford the black solid product.

P3B: Conditions: 120° C. for 5 min, 140° C. for 5 min, and 170° C. for 20 min. Yield: 80%. $^1H$ NMR (600 MHz, 1,1,2,2-Tetrachloroethane-$d_2$, 398 K): δ 9.41-9.04 (br, 2H), 3.23-2.85 (br, 4H, CDT-$CH_2$), 2.36-2.15 (br, 4H, $CH_2$), 1.44-0.93 (br, 88H, $CH_2$, $CH_3$). Absorption: $\lambda_{max}$ (solution, $CHCl_3$, ambient temperature)=1.15 μm; $\lambda_{max}$ (thin film)=1.23 μm; ε=23413 L $mol^{-1}$ $cm^{-1}$. ICP-OES: Pd=0.15 wt % (0.014 mmol g−1) and no Fe and Sn were detected.

P4B: Conditions: 120° C. for 5 min, 140° C. for 5 min, 170° C. for 60 min, and 190° C. for 10 min. Yield: 72%.

$^1$H NMR (600 MHz, chloroform-d, 333 K): δ 9.38-9.16 (br, 1H), 7.99-7.84 (br, 2H), 7.69-7.24 (br, 4H), 2.26-2.11 (br, 2H, $CH_2$), 1.44-0.80 (br, 64H, $CH_2$, $CH_3$). Absorption: $\lambda_{max}$(solution, $CHCl_3$, ambient temperature)=1.38 μm; $\lambda_{max}$ (thin film)=1.46 μm; F: =33841 L $mol^{-1}$ $cm^{-1}$.

P5B: Conditions: 120° C. for 5 min, 140° C. for 5 min, 170° C. for 60 min, and 190° C. for 10 min. Yield: 79%. $^1$H NMR (600 MHz, chloroform-d, 333 K): δ 9.31-8.88 (br, 1H), 7.95-7.40 (br, 3H), 7.24-6.93 (br, 2H), 2.34-1.85 (br, 4H, $CH_2$), 1.44-0.97 (br, 60H), 0.96-0.76 (br, 6H). Absorption: $\lambda_{max}$ (solution, $CHCl_3$, ambient temperature)=1.46 μm; $\lambda_{max}$ (thin film)=1.66 μm; ε=33087 L $mol^{-1}$ $cm^{-1}$.

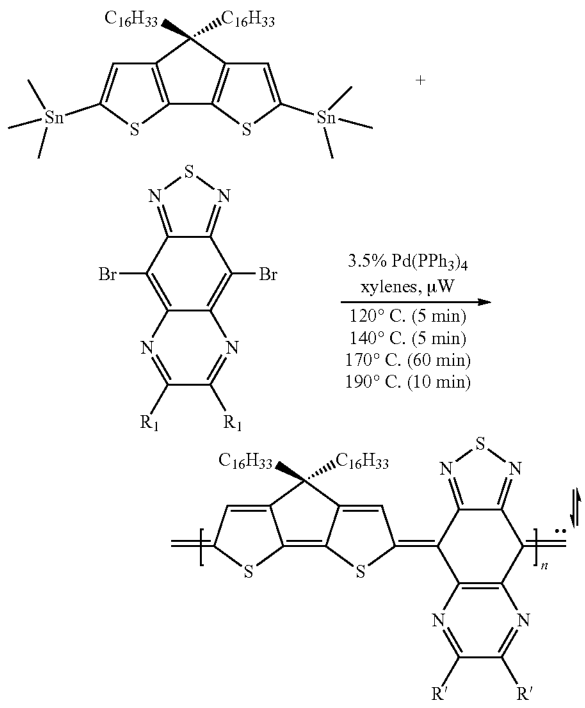

P3B R' = Me

P4B R' = 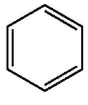

P5B R' = 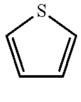

Example 9. This example involved the detailed material synthesis procedure for P6B. 4-(3,5-bis(hexadecyloxy)benzylidene)-4H-cyclopenta[2,1-b:3,4-b']dithiophene-2,6-diyl)bis(trimethylstannane) (100 mg, 0.093 mmol, 1.05 equiv), 4,7-bis(5-bromothiophen-2-yl)-$2\lambda^4\delta^2$-benzo[1,2-c;4,5-c']bis[1,2,5]thiadiazole (46 mg, 0.08 mmol, 1.0 equiv) were weighed into a microwave tube with a stir bar and 3.5 mol % of $Pd(PPh_3)_4$ in 430 μL xylene was added inside the glove box. The tube was sealed and subjected to the following reaction conditions in a microwave reactor with stirring: 120° C. for 5 min, 140° C. for 5 min, and 170° C. for 5 min. The reaction mixture was cooled to room temperature, and the polymer was precipitated into methanol. The polymer was then filtered and purified by Soxhlet extraction (under $N_2$ atmosphere and protected from light) using methanol (2 h), acetone (2 h), hexanes (2 h), 2:1 mixture of hexanes and THF (12 h) and followed by acetone (2 h) in the end. The polymer was dried in vacuo to afford 83 mg (80%) black solid product. Absorption: $\lambda_{max}$ (solution, $CHCl_3$, ambient temperature)=1.18 μm; $\lambda_{max}$ (thin film)=1.29 μm.

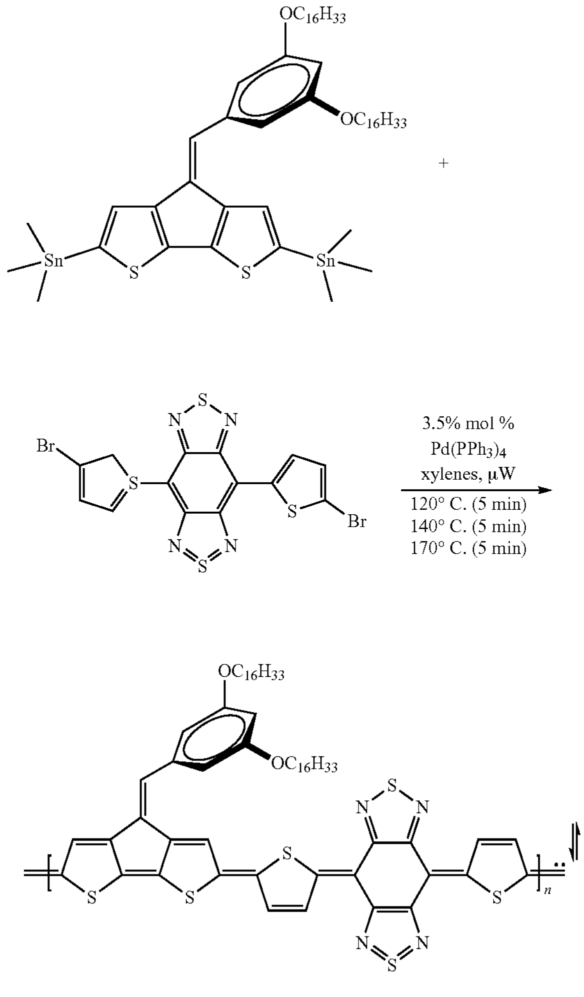

Example 10. This Example Involved the Detailed Material Synthesis Procedure for P7B: P7B: 4-(3,5-bis(hexadecyloxy)benzylidene)-4H-cyclopenta[2,1-b: 3,4-b 1dithiophene-2,6-diyl)bis(trimethylstannane) (80 mg, 0.075 mmol, 1.05 equiv), 4,7-bis(5-bromo selenophen-2-yl)-$2\lambda^4\delta^2$-benzo[1,2-c;4,5-c']bis[1,2,5]thiadiazole (43 mg, 0.071 mmol, 1.0 equiv) were weighed into a microwave tube with a stir bar and 3.5 mol % of $Pd(PPh_3)_4$ in 340 μL xylene was added inside the glove box. The tube was sealed and subjected to the following reaction conditions in a microwave reactor with stirring: 120° C. for 5 min, 140° C. for 5 min, and 150° C. for 5 min. The reaction mixture was cooled to room temperature, and the polymer was precipitated into methanol. The polymer was then filtered and purified by Soxhlet extraction (under $N_2$ atmosphere and protected from light) using methanol (2 h), acetone (2 h), hexanes (2 h), 1:1 mixture of hexanes and THF (12 h) and followed by acetone (2 h) in the end. The polymer was dried in vacuo to afford 63 mg (70%) black solid product. Absorption: $\lambda_{max}$ (solution, $CHCl_3$ ambient temperature)=1.40 μm; $\lambda_{max}$ (thin film)=1.49 μm.

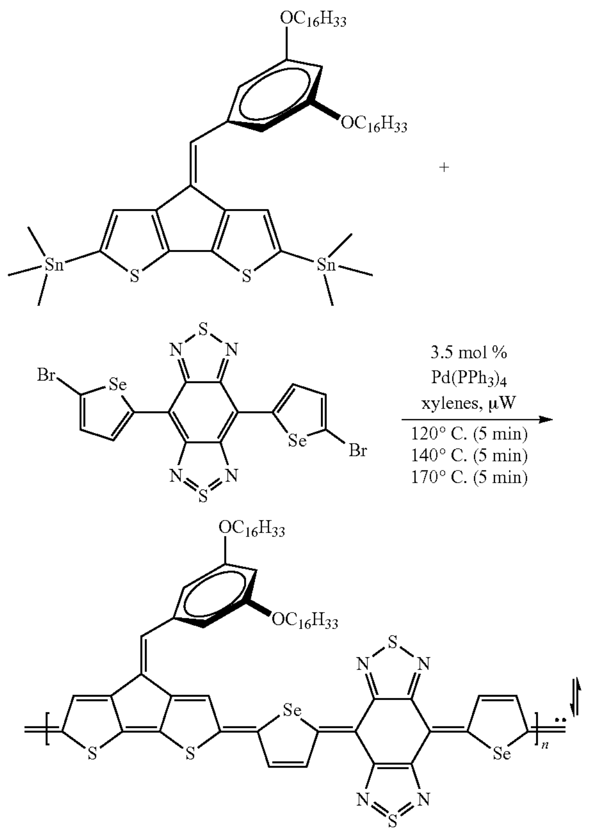

P7B

TABLE 1

| Polymer | Solution $\lambda_{max}$ [a] (μm) | Film $\lambda_{max}$ [b] (μm) | $E_g^{opt}$ [c] [eV] | $E_{HOMO}$ [d] [eV] | $E_{LUMO}$ [e] [eV] | $E_g^{elec}$ [f] [eV] |
|---|---|---|---|---|---|---|
| P1B | 1.25 | 1.30 | 0-0.5 | -4.79 | -4.23 | 0.56 |
| P2B | 1.21 | 1.32 | 0-0.5 | -4.65 | -3.95 | 0.70 |
| P3B | 1.15 | 1.23 | 0.66 | -5.15 | -4.00 | 1.15 |
| P4B | 1.38 | 1.46 | 0.59 | -5.52 | -4.35 | 0.9 |
| P5B | 1.46 | 1.66 | 0.54 | -5.07 | -4.27 | 0.8 |
| P6B | 1.18 | 1.29 | 0.50 | -4.85 | -4.00 | 0.85 |
| P7B | 1.40 | 1.49 | 0.44 | -4.5 | -3.65 | 0.85 |

[a] Dilute solution was made from $CHCl_3$.
[b] Films spin coated from a $C_6H_5Cl$ solution (10 mg $mL^{-1}$).
[c] Estimated from the absorption onset of the film.
[d] $E_{HOMO}$ calculated from the onset of oxidation,
[e] $E_{LUMO}$ calculated from the onset of reduction,
[f] $E_g^{elec}$ calculated from the difference between $E_{HOMO}$ and $E_{LUMO}$.

Examples C

Example 11

A series of donor acceptor polymers comprised of exocyclic olefin substituted 4-benzylidene-4H-cyclopenta[2,1-b:3,4-b']bithiophene (C═CPhCDT) donors were prepared to form P1C-P11C.

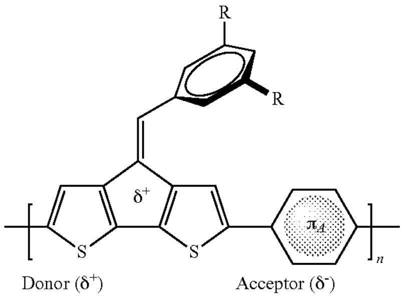

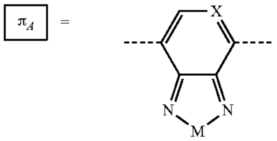

P1C: M = S, X = C, R = $C_{12}H_{25}$
P2C: M = Se, X = C, R = $C_{12}H_{25}$
P3C: M = Se, X = N, R = $C_{12}H_{25}$
P10C: M = Se, X = C, R = $OC_{12}H_{25}$
P11C: M = Se, X = N, R = $OC_{12}H_{25}$

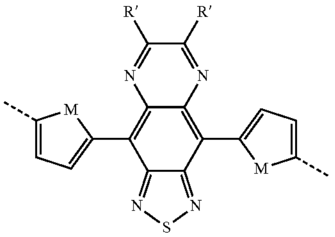

P4C: M = S, R = $C_{12}H_{25}$, R' = $C_8H_{17}$
P6C: M = S, R = $OC_{12}H_{25}$, R' = $C_8H_{17}$
P7C: M = Se, R = $OC_{16}H_{33}$, R' = $C_8H_{17}$
P8C: M = S, R = $OC_{12}H_{25}$, R' = $C_{12}H_{25}$
P9C: M = S, R = $C_{14}H_{29}$, R' = $C_8H_{17}$

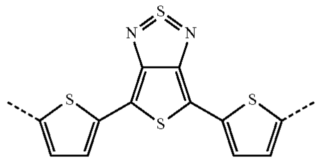

P5C: R = $C_{14}H_{29}$

Donor Acceptor polymers P1C-P11C displayed narrow optical bandgaps from 1.2-0.7 eV.

Example 12

Narrow bandgap polymer, P12C was prepared, (poly (4-(5-(4-(3,5-bis(dodecyloxy)benzylidene)-4H-cyclopenta

[2,1-b:3,4-b]dithiophen-2-yl)thiophen-2-yl)-6,7-dioctyl-9-(thiophen-2-yl)-[1,2,5]thiadiazole [3,4-g]quinoxaline). The extended conjugation in this material promotes a narrow bandgap of approximately, $E_g$~1.1 eV, with an absorption maximum ($\lambda_{max}$) of 1050 nm.

P12C

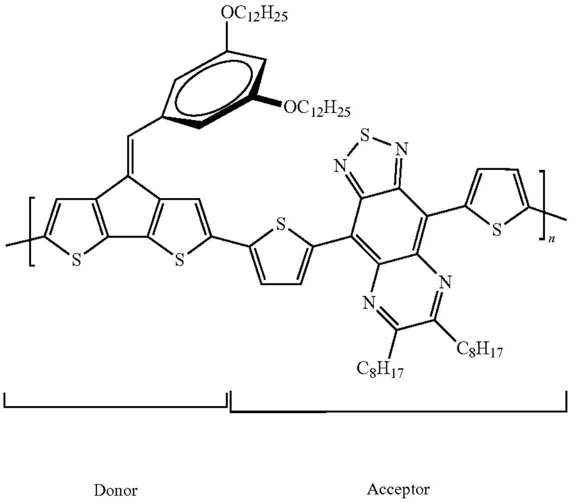

Examples D

Example 13

Narrow bandgap polymers were prepared to form P1D-P8D:

Figure 10 shows the CT gap or effective bandgap (eV) for P1D - P3D & P5D - P8D.

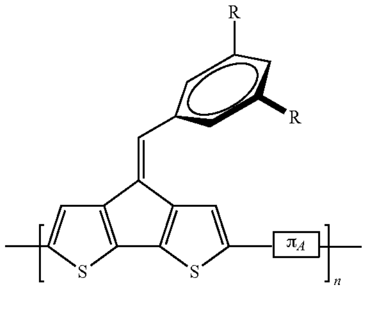

-continued

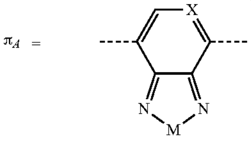

P1D: M = S, X = C, R = $C_{12}H_{25}$
P3D: M = Se, X = N, R = $C_{12}H_{25}$
P8D: M = Se, X = C, R = $C_{12}H_{25}$

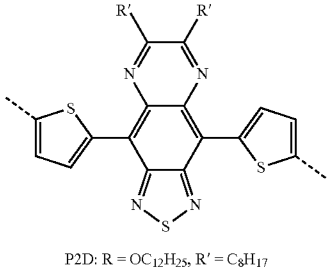

P2D: R = $OC_{12}H_{25}$, R' = $C_8H_{17}$
P5D: R = $OC_{12}H_{25}$, R' = $OC_{10}H_{21}$
P6D: R = $OC_{12}H_{25}$, R' = $C_{12}H_{25}$
P7D: R = $OC_{12}H_{25}$, R' = $OC_{16}H_{33}$

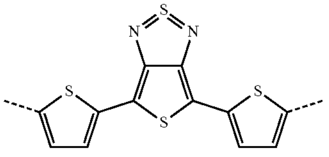

P4D: R = $C_{14}H_{29}$

All parameters presented herein including, but not limited to, sizes, dimensions, times, temperatures, pressures, amounts, quantities, ratios, weights, volumes, and/or percentages, and the like, for example, represent approximate values. Further, references to 'a' or 'an' concerning any particular item, component, material, or product is defined as at least one and could be more than one.

The above detailed description is presented to enable any person skilled in the art to make and use the invention. Specific details have been revealed to provide a comprehensive understanding of the present invention and are used for explanation of the information provided. These specific details, however, are not required to practice the invention, as is apparent to one skilled in the art. Descriptions of specific applications, analyses, materials, components, dimensions, and calculations are meant to serve only as representative examples. Various modifications to the preferred embodiments may be readily apparent to one skilled in the art, and the general principles defined herein may be applicable to other embodiments and applications while still remaining within the scope of the invention. There is no intention for the present invention to be limited to the embodiments shown and the invention is to be accorded the widest possible scope consistent with the principles and features disclosed herein.

While various embodiments of the present invention have been described above and in the attached documents, it should be understood that they have been presented by way of example and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. The applicants have described the preferred embodiments of the invention, but it should be understood that the broadest scope of the invention includes such modifications as additional or different methods and materials. Many other advantages of the invention will be apparent to those skilled in the art from the above descriptions, reference documents, and the subsequent claims. Thus, the present invention should not be limited by any of the above-described exemplary embodiments.

The process, apparatus, system, methods, products, and compounds of the present invention are often best practiced by empirically determining the appropriate values of the operating parameters, or by conducting simulations to arrive at best design for a given application. Accordingly, all suitable modifications, combinations, and equivalents should be considered as falling within the spirit and scope of the invention.

REFERENCES

1. Arias, A. C.; MacKenzie, J. D.; McCulloch, I.; Rivnay, J.; Salleo, A., Materials and Applications for Large Area Electronics: Solution-Based Approaches. *Chem. Rev.* 2010, 110, 3-24.
2. Chen, S.; Deng, L.; Xie, J.; Peng, L.; Xie, L.; Fan, Q.; Huang, W., Recent Developments in Top-Emitting Organic Light-Emitting Diodes. *Adv. Mater.* 2010, 22, 5227-5239.
3. Gelinck, G.; Heremans, P.; Nomoto, K.; Anthopoulos, T. D., Organic Transistors in Optical Displays and Microelectronic Applications. *Adv. Mater.* 2010, 22, 3778-3798.
4. Baran, D.; Balan, A.; Celebi, S.; Meana Esteban, B.; Neugebauer, H.; Sariciftci, N. S.; Toppare, L., Processable Multipurpose Conjugated Polymer for Electrochromic and Photovoltaic Applications. *Chem. Mater.* 2010, 22, 2978-2987.
5. Krebs, F. C., Fabrication and Processing of Polymer Solar Cells: A Review of Printing and Coating Techniques. *Sol. Energy Mater. Sol. Cells* 2009, 93, 394-412.
6. Geffroy, B.; le Roy, P.; Prat, C., Organic Light-Emitting Diode (OLED) Technology: Materials, Devices and Display Technologies. *Polym. Int.* 2006, 55, 572-582.
7. Guo, Y.; Yu, G.; Liu, Y., Functional Organic Field-Effect Transistors. *Adv. Mater.* 2010, 22, 4427-4447.
8. Usta, H.; Facchetti, A.; Marks, T. J., N-Channel Semiconductor Materials Design for Organic Complementary Circuits. *Acc. Chem. Res.* 2011, 44, 501-510.
9. Dong, H.; Zhu, H.; Meng, Q.; Gong, X.; Hu, W., Organic Photoresponse Materials and Devices. *Chem. Soc. Rev.* 2012, 41, 1754-1808.
10. Li, G.; Zhu, R.; Yang, Y., Polymer Solar Cells. *Nat. Photon.* 2012, 6, 153-161.
11. Nelson, J., Polymer: Fullerene Bulk Heterojunction Solar Cells. *Mater. Today* 2011, 14, 462-470.
12. He, F.; Yu, L., How Far Can Polymer Solar Cells Go? In Need of a Synergistic Approach. *J. Phys. Chem.* Lett. 2011, 2, 3102-3113.
13. Azzellino, G.; Grimoldi, A.; Binda, M.; Caironi, M.; Natali, D.; Sampietro, M., Fully Inkjet-Printed Organic Photodetectors with High Quantum Yield. *Adv. Mater.* 2013, 25, 6829-6833.
14. Baeg, K. J.; Binda, M.; Natali, D.; Caironi, M.; Noh, Y. Y., Organic Light Detectors: Photodiodes and Phototransistors. *Adv. Mater.* 2013, 25, 4267-4295.
15. Emerging Applications of Near-Infrared Organic Materials. In *Near-Infrared Organic Materials and Emerging Applications*, CRC Press 2013; pp 115-170.
16. Fabiano, S.; Musumeci, C.; Chen, Z.; Scandurra, A.; Wang, H.; Loo, Y. L.; Facchetti, A.; Pignataro, B., From Monolayer to Multilayer N-Channel Polymeric Field-Effect Transistors with Precise Conformational Order. *Adv. Mater.* 2012, 24, 951-956.
17. Rogalski, A., Infrared Detectors: An Overview. *Infrared Physics & Technology* 2002, 43, 187-210.
18. Fabian, J.; Nakazumi, H.; Matsuoka, M., Near-Infrared Absorbing Dyes. *Chem. Rev.* 1992, 92, 1197-1226.
19. Beverina, L.; Fu, J.; Leclercq, A.; Zojer, E.; Pacher, P.; Barlow, S.; Van Stryland, E. W.; Hagan, D. J.; Brédas, J.-L.; Marder, S. R., Two-Photon Absorption at Telecommunications Wavelengths in a Dipolar Chromophore with a Pyrrole Auxiliary Donor and Thiazole Auxiliary Acceptor. *J. Am. Chem. Soc.* 2005, 127, 7282-7283.
20. Qian, G.; Wang, Z. Y., Near-Infrared Organic Compounds and Emerging Applications. *Chem. Asian J.* 2010, 5, 1006-1029.
21. Kiyose, K.; Kojima, H.; Nagano, T., Functional near-Infrared Fluorescent Probes. *Chem. Asian J.* 2008, 3, 506-515.
22. Holder, E.; Tessler, N.; Rogach, A. L., Hybrid Nanocomposite Materials with Organic and Inorganic Components for Opto-Electronic Devices. *J. Mater. Chem.* 2008, 18, 1064-1078.
23. Havinga, E. E.; ten Hoeve, W.; Wynberg, H., A New Class of Small Band Gap Organic Polymer Conductors. *Polym. Bull.* 1992, 29, 119-126.
24. Facchetti, A., I-Conjugated Polymers for Organic Electronics and Photovoltaic Cell Applications. *Chem. Mater.* 2011, 23, 733-758.
25. Zhou, H.; Yang, L.; You, W., Rational Design of High Performance Conjugated Polymers for Organic Solar Cells. *Macromolecules* 2012, 45, 607-632.
26. Gendron, D.; Leclerc, M., New Conjugated Polymers for Plastic Solar Cells. *Energy Environ. Sci.* 2011, 4, 1225-1237.
27. Tautz, R.; Da Como, E.; Limmer, T.; Feldmann, J.; Egelhaaf, H.-J.; von Hauff, E.; Lemaur, V.; Beljonne, D.; Yilmaz, S.; Dumsch, I.; Allard, S.; Scherf, U., Structural Correlations in the Generation of Polaron Pairs in Low-Bandgap Polymers for Photovoltaics. *Nature Commun.* 2012, 3, 970.
28. Allard, S.; Forster, M.; Souharce, B.; Thiem, H.; Scherf, U., Organic Semiconductors for Solution-Processable Field-Effect Transistors (OFETs). *Angew. Chem. Int. Ed.* 2008, 47, 4070-4098.
29. Wang, C.; Dong, H.; Hu, W.; Liu, Y.; Zhu, D., Semiconducting Pi-Conjugated Systems in Field-Effect Transistors: A Material Odyssey of Organic Electronics. *Chem. Rev.* 2012, 112, 2208-2267.
30. Cheng, Y.-J.; Yang, S.-H.; Hsu, C.-S., Synthesis of Conjugated Polymers for Organic Solar Cell Applications. *Chem. Rev.* 2009, 109, 5868-5923.
31. Clarke, T. M.; Durrant, J. R., Charge Photogeneration in Organic Solar Cells. *Chem. Rev.* 2010, 110, 6736-6767.
32. Gong, X.; Tong, M.; Xia, Y.; Cai, W.; Moon, J. S.; Cao, Y.; Yu, G.; Shieh, C. L.; Nilsson, B.; Heeger, A. J., High-Detectivity Polymer Photodetectors with Spectral Response from 300 nm to 1450 nm. *Science* 2009, 325, 1665-1667.
33. Jiang, X.; Schaller, R. D.; Lee, S. B.; Pietryga, J. M.; Klimov, V. I.; Zakhidov, A. A., Pbse Nanocrystal/Conducting Polymer Solar Cells with an Infrared Response to 2 Micron. *J. Mater. Res.* 2011, 22, 2204-2210.
34. Arnold, M. S.; Zimmerman, J. D.; Renshaw, C. K.; Xu, X.; Lunt, R. R.; Austin, C. M.; Forrest, S. R., Broad Spectral Response Using Carbon Nanotube/Organic Semiconductor/C60 Photodetectors. *Nano Lett.* 2009, 9, 3354-3358.

35. Zimmerman, J. D.; Diev, V. V.; Hanson, K.; Lunt, R. R.; Yu, E. K.; Thompson, M. E.; Forrest, S. R., Porphyrin-Tape/C(60) Organic Photodetectors with 6.5% External Quantum Efficiency in the Near Infrared. *Adv. Mater.* 2010, 22, 2780-2783.
36. Zimmerman, J. D.; Yu, E. K.; Diev, V. V.; Hanson, K.; Thompson, M. E.; Forrest, S. R., Use of Additives in Porphyrin-Tape/C60 Near-Infrared Photodetectors. *Org. Electron.* 2011, 12, 869-873.
37. Yuen, J. D.; Wudl, F., Strong Acceptors in Donor-Acceptor Polymers for High Performance Thin Film Transistors. *Energy & Environmental Science* 2013, 6, 392-406.
38. Abe, M., Diradicals. *Chem. Rev.* 2013, 113, 7011-7088.
39. Dediu, V. A.; Hueso, L. E.; Bergenti, I.; Taliani, C., Spin Routes in Organic Semiconductors. *Nat Mater* 2009, 8, 707-716.
40. Zhang, Q.; Sun, Y.; Xu, W.; Zhu, D., Organic Thermoelectric Materials: Emerging Green Energy Materials Converting Heat to Electricity Directly and Efficiently. *Adv. Mater.* 2014.
41. Bubnova, O.; Khan, Z. U.; Wang, H.; Braun, S.; Evans, D. R.; Fabretto, M.; Hojati-Talemi, P.; Dagnelund, D.; Arlin, J. B.; Geerts, Y. H.; Desbief, S.; Breiby, D. W.; Andreasen, J. W.; Lazzaroni, R.; Chen, W. M.; Zozoulenko, I.; Fahlman, M.; Murphy, P. J.; Berggren, M.; Crispin, X., Semi-Metallic Polymers. *Nat. Mater.* 2014, 13, 190-194.
42. Zeng, T.; Ananth, N.; Hoffmann, R., Seeking Small Molecules for Singlet Fission: A Heteroatom Substitution Strategy. *J. Am. Chem. Soc.* 2014.
43. Clark, J.; Lanzani, G., Organic Photonics for Communications. *Nat. Photon.* 2010, 4, 438-446.
44. Dang, M. T.; Hirsch, L.; Wantz, G., P3ht:Pcbm, Best Seller in Polymer Photovoltaic Research. *Adv. Mater.* 2011, 23, 3597-3602.
45. Brédas, J. L.; Heeger, A. J.; Wudl, F., Towards Organic Polymers with Very Small Intrinsic Band Gaps. I. Electronic Structure of Polyisothianaphthene and Derivatives. *J. Chem. Phys.* 1986, 85, 4673-4678.
46. Zhu, Z.; Waller, D.; Gaudiana, R.; Morana, M.; Muhlbacher, D.; Scharber, M.; Brabec, C., Panchromatic Conjugated Polymers Containing Alternating Donor/Acceptor Units for Photovoltaic Applications. *Macromolecules* 2007, 40, 1981-1986.
47. Ono, K.; Tanaka, S.; Yamashita, Y., Benzobis(thiadiazole)s Containing Hypervalent Sulfur Atoms: Novel Heterocycles with High Electron Affinity and Short Intermolecular Contacts between Heteroatoms. *Angew. Chem. Int. Ed.* 1994, 33, 1977-1979.
48. Kitamura, C.; Tanaka, S.; Yamashita, Y., Design of Narrow-Bandgap Polymers. Syntheses and Properties of Monomers and Polymers Containing Aromatic-Donor and o-Quinoid-Acceptor Units. *Chem. Mater.* 1996, 8, 570-578.
49. Karikomi, M.; Kitamura, C.; Tanaka, S.; Yamashita, Y., New Narrow-Bandgap Polymer Composed of Benzobis(1,2,5-Thiadiazole) and Thiophenes. *J. Am. Chem. Soc.* 1995, 117, 6791-6792.
50. Steckler, T. T.; Zhang, X.; Hwang, J.; Honeyager, R.; Ohira, S.; Zhang, X.-H.; Grant, A.; Ellinger, S.; Odom, S. A.; Sweat, D.; Tanner, D. B.; Rinzler, A. G.; Barlow, S.; Brédas, J.-L.; Kippelen, B.; Marder, S. R.; Reynolds, J. R., A Spray-Processable, Low Bandgap, and Ambipolar Donor-Acceptor Conjugated Polymer. *J. Am. Chem. Soc.* 2009, 131, 2824-2826.
51. Azoulay, J. D.; Koretz, Z. A.; Wong, B. M.; Bazan, G. C., Bridgehead Imine Substituted Cyclopentadithiophene Derivatives: An Effective Strategy for Band Gap Control in Donor-Acceptor Polymers. *Macromolecules* 2013, 46, 1337-1342.
52. Foster, M. E.; Zhang, B. A.; Murtagh, D.; Liu, Y.; Sfeir, M. Y.; Wong, B. M.; Azoulay, J. D., Solution-Processable Donor-Acceptor Polymers with Modular Electronic Properties and Very Narrow Bandgaps. *Macromol. Rapid Commun.* 2014, 35, 1516-1521.
53. Coppo, P.; Adams, H.; Cupertino, D. C.; Yeates, S. G.; Turner, M. L., Synthesis, Solid State Structure and Polymerisation of a Fully Planar Cyclopentadithiophene. *Chem. Commun.* 2003, 2548-2549.
54. Hubert, C.; Tran, K.; Hauquier, F.; Cougnon, C.; Pilard, J.-F.; Gosselin, P.; Rault-Berthelot, J.; Raoult, E., Anodic Behaviour of Methylidene-Cyclopentadiaryl Derivatives: Cyclic Voltammetry and Theoretical Study. *New J. Chem.* 2007, 31, 1730.
55. Zotti, G.; Schiavon, G.; Zecchin, S.; Berlin, A.; Pagani, G., Electrochemical Reduction of 4-ylidene-substituted Polycylcopentadithiophenes. Polythiophene Chain Bridging by Electrohydrodimerization. *Synthetic Metals.* 1994, 66, 149-155.
56. Zotti, G.; Berlin, A.; Pagani, G.; Berlin, A.; Schiavon, G.; Zecchin, S., Conductivity in Redox Modified Conducting Polymers. In-situ Conductivity of Poly(cyclopentadithiophenes) Bearing p-Nitro-phenyl and 4-N-methylpyridinium Groups. *Adv. Mater.* 1995, 7, 48-52.
57. Kozaki, M.; Tanaka, S.; Yamashita, Y., Preparation and Properties of Novel Polythiophenes Containing 1,3-Dithiol-2-ylidene Moieties. *J. Org. Chem.* 1994, 59, 442-450.
58. Chuang, C.-H. M.; Brown, P. R.; Bulović, V.; Bawendi, M. G., Improved Performance and Stability in Quantum dot Solar Cells through Band Alignment engineering. *Nat. Mater.* 2014, 13, 796-801.
59. Green, M. A.; Ho-Baillie, A.; Snaith, H. J., The Emergence of Perovskite Solar Cells. *Nat. Photon.* 2014, 8, 506-514.
60. Khatib, O.; Yuen, J. D.; Wilson, J.; Kumar, R.; Di Ventra, M.; Heeger, A. J.; Basov, D. N., Infrared Spectroscopy of Narrow Gap Donor-Acceptor Polymer-Based Ambipolar Transistors. *Phys. Rev. B* 2012, 86.

ADDITIONAL EXAMPLES REFERENCES [1]

G. Li, R. Zhu, Y. Yang, *Nat. Photon.* 2012, 6, 153-161.

S. Zhang, L. Ye, J. Hou, Adv. *Energy Materials* 2016, 6, 1502529.

J. Qi, J. Han, X. Zhou, D. Yang, J. Zhang, W. Qiao, D. Ma, Z. Y. Wang, *Macromolecules* 2015, 48, 3941-3948.

H. Yao, L. Ye, H. Zhang, S. Li, S. Zhang, J. Hou, *Chem. Rev.* 2016, 116, 7397-7457.

X. Gong, M. Tong, Y. Xia, W. Cai, J. S. Moon, Y. Cao, G. Yu, C. L. Shieh, B. Nilsson, A. J. Heeger, *Science* 2009, 325, 1665-1667.

X. Gong, M. H. Tong, S. H. Park, M. Liu, A. Jen, A. J. Heeger, *Sensors* 2010, 10, 6488-6496.

K. J. Baeg, M. Binda, D. Natali, M. Caironi, Y. Y. Noh, *Adv. Mater.* 2013, 25, 4267-4295.

R. D. Jansen-van Vuuren, A. Armin, A. K. Pandey, P. L. Burn, P. Meredith, *Adv. Mater.* 2016, 28, 4766-4802.

A. Rogalski, *Infrared Phys. Technol.* 2002, 43, 187-210.

L. Dou, Y. Liu, Z. Hong, G. Li, Y. Yang, *Chem. Rev.* 2015, 115, 12633-12665.

J. Qi, W. Qiao, Z. Y. Wang, *Chem. Rec.* 2016, 16, 1531-1548.

S. P. Singh, G. D. Sharma, *Chem. Rec.* 2014, 14, 419-481.

S. R. Forrest, *Nature* 2004, 428, 911-918.

T. Rauch, M. Boberl, S. F. Tedde, J. Furst, M. V. Kovalenko, G. Hesser, U. Lemmer, W. Heiss, O. Hayden, *Nat. Photon.* 2009, 3, 332-336.

T. M. Clarke, J. R. Durrant, *Chem. Rev.* 2010, 110, 6736-6767.

D. M. Stoltzfus, J. E. Donaghey, A. Armin, P. E. Shaw, P. L. Burn, P. Meredith, *Chem. Rev.* 2016, 116, 12920-12955.

O. Ostroverkhova, *Chem. Rev.* 2016, 116, 13279-13415.

S. H. Park, A. Roy, S. Beaupré, S. Cho, N. Coates, J. S. Moon, D. Moses, M. Leclerc, K. Lee, A. J. Heeger, *Nat. Photon.* 2009, 3, 297-302.

J. J. M. Halls, C. A. Walsh, N. C. Greenham, E. A. Marseglia, R. H. Friend, S. C. Moratti, A. B. Holmes, *Nature* 1995, 376, 498-500.

G. Yu, J. Gao, J. C. Hummelen, F. Wudl, A. J. Heeger, *Science* 1995, 270, 1789-1791.

T. Wang, M. K. Ravva, J.-L. Brédas, *Adv. Funct. Mater.* 2016, 26, 5913-5921.

R. Noriega, J. Rivnay, K. Vandewal, F. P. Koch, N. Stingelin, P. Smith, M. F. Toney, A. Salleo, *Nat. Mater.* 2013, 12, 1038-1044.

Z. B. Henson, K. Mullen, G. C. Bazan, *Nat. Chem.* 2012, 4, 699-704.

R. C. Coffin, J. Peet, J. Rogers, G. C. Bazan, *Nat. Chem.* 2009, 1, 657-661.

Z. Zhu, D. Waller, R. Gaudiana, M. Morana, D. MUhlbacher, M. Scharber, C. Brabec, *Macromolecules* 2007, 40, 1981-1986.

J. D. Azoulay, Z. A. Koretz, B. M. Wong, G. C. Bazan, *Macromolecules* 2013, 46, 1337-1342.

D. B. Rodovsky, J. Peet, N. Shao, J. D. Azoulay, G. C. Bazan, N. Drolet, Q. Wu, M. Y. Sfeir, *J. Phys. Chem. C* 2013, 117, 25955-25960.

B. F. Wright, K. Sunahara, A. Furube, A. Nattestad, T. M. Clarke, G. C. Bazan, J. D. Azoulay, A. J. Mozer, *J. Phys. Chem. C* 2015, 119, 12829-12837.

M. E. Foster, B. A. Zhang, D. Murtagh, Y. Liu, M. Y. Sfeir, B. M. Wong, J. D. Azoulay, *Macromol. Rapid Commun.* 2014, 35, 1516-1521.

P. Coppo, H. Adams, D. C. Cupertino, S. G. Yeates, M. L. Turner, *Chem. Commun.* 2003, 2548-2549.

P. Coppo, M. L. Turner, *J. Mater. Chem.* 2005, 15, 1123-1133.

N. P. Godman, S. K. Adas, K. M. Hellwig, D. W. Ball, G. J. Balaich, S. T. Iacono, *J. Org. Chem.* 2016, 81, 9630-9638.

B. Pal, W.-C. Yen, J.-S. Yang, C.-Y. Chao, Y.-C. Hung, S.-T. Lin, C.-H. Chuang, C.-W. Chen, W.-F. Su, *Macromolecules* 2008, 41, 6664-6671.

C. Du, C. Li, W. Li, X. Chen, Z. Bo, C. Veit, Z. Ma, U. Wuerfel, H. Zhu, W. Hu, F. Zhang, *Macromolecules* 2011, 44, 7617-7624.

R. Yang, R. Tian, Q. Hou, W. Yang, Y. Cao, *Macromolecules* 2003, 36, 7453-7460.

G. L. Gibson, T. M. McCormick, D. S. Seferos, *J. Am. Chem. Soc.* 2012, 134, 539-547.

J. Ohshita, M. Miyazaki, F.-B. Zhang, D. Tanaka, Y. Morihara, *Polym. J.* 2013, 45, 979-984.

J. Song, C. Zhang, C. Li, W. Li, R. Qin, B. Li, Z. Liu, Z. Bo, *J. Polym. Sci., Part A: Polym. Chem.* 2010, 48, 2571-2578.

I. Kmínek, D. Výprachtický, J. Kříž, J. Dybal, V. Cimrová, *J. Polym. Sci., Part A: Polym. Chem.* 2010, 48, 2743-2756.

G. C. Welch, R. C. Bakus, S. J. Teat, G. C. Bazan, *J. Am. Chem. Soc.* 2013, 135, 2298-2305.

L. Pandey, C. Risko, J. E. Norton, J.-L. Brédas, *Macromolecules* 2012, 45, 6405-6414.

C. Risko, M. D. McGehee, J.-L. Brédas, *Chem. Sci.* 2011, 2, 1200-1218.

J.-L. Brédas, *J. Chem. Phys.* 1985, 82, 3808-3811.

D. Venkateshvaran, M. Nikolka, A. Sadhanala, V. Lemaur, M. Zelazny, M. Kepa, M. Hurhangee, A. J. Kronemeijer, V. Pecunia, I. Nasrallah, I. Romanov, K. Broch, I. McCulloch, D. Emin, Y. Olivier, J. Cornil, D. Beljonne, H. Sirringhaus, *Nature* 2014, 515, 384-388.

A. Troisi, A. Shaw, *J. Phys. Chem. Lett.* 2016, 7, 4689-4694.

J. Gierschner, J. Cornil, H. J. Egelhaaf, *Adv. Mater.* 2007, 19, 173-191.

J. Mei, Z. Bao, *Chem. Mater.* 2014, 26, 604-615.

H. Chen, J. Peet, S. Hu, J. Azoulay, G. Bazan, M. Dadmun, *Adv. Funct. Mater.* 2014, 24, 140-150.

K. R. Graham, C. Cabanetos, J. P. Jahnke, M. N. Idso, A. El Labban, G. O. Ngongang Ndjawa, T. Heumueller, K. Vandewal, A. Salleo, B. F. Chmelka, A. Amassian, P. M. Beaujuge, M. D. McGehee, *J. Am. Chem. Soc.* 2014, 136, 9608-9618.

A. C. Jakowetz, M. L. Böhm, J. Zhang, A. Sadhanala, S. Huettner, A. A. Bakulin, A. Rao, R. H. Friend, *J. Am. Chem. Soc.* 2016, 138, 11672-11679.

G. Zotti, G. Schiavon, S. Zecchin, A. Berlin, G. Pagani, *Synth. Met.* 1994, 66, 149-155.

C. M. Cardona, W. Li, A. E. Kaifer, D. Stockdale, G. C. Bazan, *Adv. Mater.* 2011, 23, 2367-2371.

T. C. Parker, D. G. Patel, K. Moudgil, S. Barlow, C. Risko, J.-L. Brédas, J. R. Reynolds, S. R. Marder, *Mater. Horiz.* 2015, 2, 22-36.

Z. Wu, W. Yao, A. E. London, J. D. Azoulay, T. N. Ng, *ACS Appl. Mater. Interfaces* 2017, 9, 1654-1660.

Y. Zhou, C. Fuentes-Hernandez, J. Shim, J. Meyer, A. J. Giordano, H. Li, P. Winget, T. Papadopoulos, H. Cheun, J. Kim, M. Fenoll, A. Dindar, W. Haske, E. Najafabadi, T. M. Khan, H. Sojoudi, S. Barlow, S. Graham, J.-L. Brédas, S. R. Marder, A. Kahn, B. Kippelen, *Science* 2012, 336, 327-332.

J. Ajuria, I. Etxebarria, W. Cambarau, U. Munecas, R. Tena-Zaera, J. C. Jimeno, R. Pacios, *Energy Environ. Sci.* 2011, 4, 453-458.

J. D. Zimmerman, V. V. Diev, K. Hanson, R. R. Lunt, E. K. Yu, M. Thompson, S. R. Forrest, *Adv. Mater.* 2010, 22, 2780-2783.

J. D. Zimmerman, E. K. Yu, V. V. Diev, K. Hanson, M. E. Thompson, S. R. Forrest, *Org. Electron.* 2011, 12, 869873.

ADDITIONAL EXAMPLES REFERENCES [2]

Coffin, R. C., Peet, J., Rogers, J. & Bazan, G. C. Streamlined microwave-assisted preparation of narrow-bandgap conjugated polymers for high-performance bulk heterojunction solar cells. *Nat. Chem.* 1, 657-661 (2009).

Azoulay, J. D., Koretz, Z. A., Wong, B. M. & Bazan, G. C. Bridgehead Imine Substituted Cyclopentadithiophene Derivatives: An Effective Strategy for Band Gap Control in Donor-Acceptor Polymers. *Macromolecules* 46, 1337-1342 (2013).

London, A. E. et al. Donor-acceptor polymers with tunable infrared photoresponse. *Polym. Chem.* 8, 2922-2930 (2017).

Bleaney, B. & Bowers, K. D. Anomalous Paramagnetism of Copper Acetate. *Proceedings of the Royal Society of London. Series A. Mathematical and Physical Sciences* 214, 451-465 (1952).

Rajca, A. Organic Diradicals and Polyradicals: From Spin Coupling to Magnetism? *Chem. Rev.* 94, 871-893 (1994).

Bechlars, B. et al. High-spin ground states via electron delocalization in mixed-valence imidazolate-bridged divanadium complexes. *Nat. Chem.* 2, 362-368 (2010).

Rajca, A. et al. High-Spin S=2 Ground State Aminyl Tetraradicals. *J. Am. Chem. Soc.* 135, 18205-18215 (2013).

Skorka, L. et al. High-Spin Polymers: Ferromagnetic Coupling of S=1 Hexaazacyclophane Units up to a Pure S=2 Polycyclophane. *J. Phys. Chem. B.* 121, 4293-4298 (2017).

What is claimed is:

1. A narrow band gap conjugated polymer prepared by copolymerizing at least one first donor monomer or oligomer having the formula:

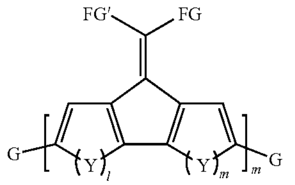

wherein G is a leaving group suitable for a cross-coupling polymerization reaction, FG is selected from the group consisting of unsubstituted $C_0$-$C_{36}$ hydrocarbyl, substituted $C_1$-$C_{36}$ hydrocarbyl, unsubstituted $C_6$-$C_{20}$ aryl, substituted $C_6$-$C_{20}$ aryl, unsubstituted $C_3$-$C_{20}$ heteroaryl, substituted $C_3$-$C_{20}$ heteroaryl, $C_6$-$C_{20}$ arylene substituted with a $C_1$-$C_{36}$ hydrocarbyl, F, Cl, Br, I, CN, —$R^2$, $SR^2$—OH, —$OR^2$, —COOH, —$COOR^2$, —$NH_2$, —$NHR^2$, or $NR^2R^3$, where $R^2$ and $R^3$ are independently selected from a $C_1$-$C_{24}$ hydrocarbyl group;

FG' is selected from the group consisting of unsubstituted $C_6$-$C_{20}$ aryl, substituted $C_6$-$C_{20}$ aryl, unsubstituted $C_3$-$C_{20}$ heteroaryl, substituted $C_3$-$C_{20}$ heteroaryl, unsubstituted hydrocarbyl, and substituted hydrocarbyl; and when FG' is the unsubstituted hydrocarbyl or the substituted hydrocarbyl, FG cannot be $C_0$-hydrocarbyl;

m is an integer of at least 1;

Y is selected from the group consisting of S, $BR^3$, $PR^3$, Se, Te, NH, or Si, wherein $R^3$ is a $C_1$-$C_{24}$ hydrocarbyl group;

with at least one acceptor second monomer selected from a)-b) that provide a structural unit in the copolymer:

a) substituted and unsubstituted monomers derived from the group consisting of thiadiazoloquinoxaline, quinoxaline, thienothiadiazole, thienopyridine, thienopyrazine, pyrazinoquinoxaline, benzothiadiazole, bis-benzothiadiazole, benzobisthiadiazole, thiazole, thiadiazolothienopyrazine, thiadiazoloquinoxaline and diketopyrrolopyrrole, and b) monomers selected from the group consisting of:

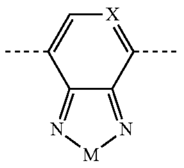

P4: M = S, X = C
P5: M = Se, X = C
P6: M = Se, X = N

P7

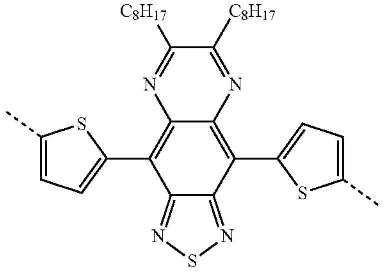

P8

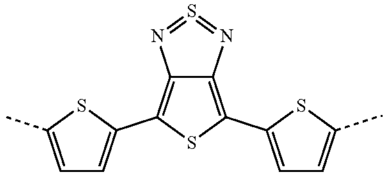

and;

wherein the conjugated polymer has a band gap of 0.1 to 1.2 eV.

2. The polymer of claim 1, wherein the second monomer is selected from the group consisting of a substituted benzothiadiazole, an unsubstituted benzothiadiazole, a substituted thiadiazolothienopyrazine, an unsubstituted thiadiazolothienopyrazine, and P8

P8

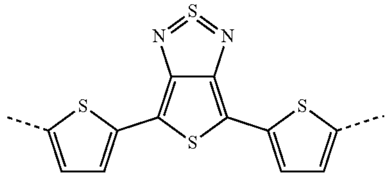

3. The polymer of claim 2, wherein the substituted thiadiazolothienopyrazine is a structural unit selected from the group consisting of:

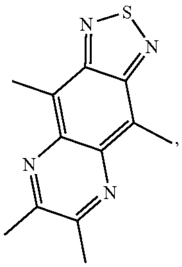,

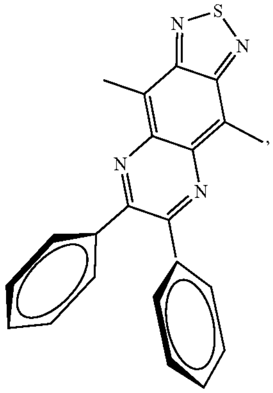,

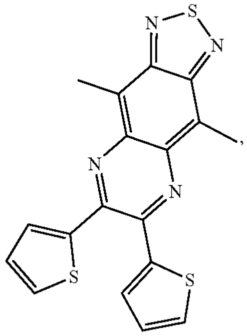, and

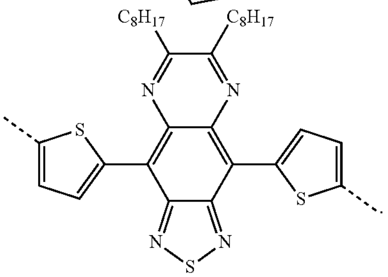

4. The polymer of claim 1, wherein FG and FG' are selected from the group consisting of unsubstituted hydrocarbyl and substituted hydrocarbyl.

5. The polymer of claim 1, wherein the first monomer is an electron-deficient heteroaromatic ring system.

6. The polymer of claim 1, wherein the second monomer is an interchain unit comprising an electron-deficient heteroaromatic ring system.

7. The polymer of claim 1, wherein G is selected from the group consisting of Br, Cl, I, triflate (trifluoromethanesulfonate), a trialkyl tin compound, boronic acid (—B$(OH)_2$), or a boronate ester (—$B(OR^5)_2$, where each $R_5$ is $C_1$-$C_{12}$ alkyl or the two $R^5$ groups combine to form a cyclic boronic ester.

8. The polymer of claim 1, wherein G is selected from the group consisting of Br, H, or any group suitable for direct heteroarylation polycondensation.

9. The polymer of claim 1, wherein the donor is incorporated into a molecule or oligomer.

10. The polymer of claim 1, further comprising a third monomer comprising double or triple bonds separated by a single bond.

11. The polymer of claim 1, wherein the polymers synthesized have the formula:

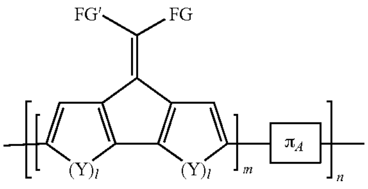

or

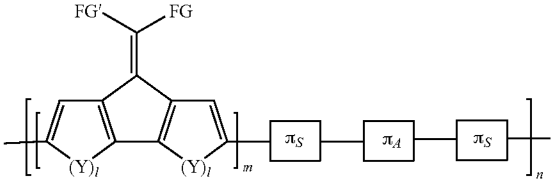

wherein G is a leaving group suitable for a cross-coupling polymerization reaction, a) FG is selected from the group consisting of unsubstituted $C_0$-$C_{36}$ hydrocarbyl, substituted $C_1$-$C_{36}$ hydrocarbyl, unsubstituted $C_6$-$C_{20}$ aryl, substituted $C_6$-$C_{20}$ aryl, unsubstituted $C_3$-$C_{20}$ heteroaryl, substituted $C_3$-$C_{20}$ heteroaryl, $C_6$-$C_{20}$ arylene substituted with a $C_1$-$C_{36}$ hydrocarbyl, F, Cl, Br, I, CN, —$R^2$, $SR^2$—OH, —$OR^2$, —COOH, —$COOR^2$, —$NH_2$, —$NHR^2$, or $NR^2R^3$, where $R^2$ and $R^3$ are independently selected from a $C_1$-$C_{24}$ hydrocarbyl group;

FG' is selected from the group consisting of unsubstituted $C_6$-$C_{20}$ aryl, substituted $C_6$-$C_{20}$ aryl, unsubstituted $C_3$-$C_{20}$ heteroaryl, and substituted $C_3$-$C_{20}$ heteroaryl; or b) FG and FG' are selected from the group consisting of unsubstituted hydrocarbyl and substituted hydrocarbyl;

m is an integer of at least 1;

Y is selected from the group consisting of S, $BR^3$, $PR^3$, Se, Te, NH, or Si, wherein $R^3$ is a $C_1$-$C_{24}$ hydrocarbyl group;

with at least an acceptor second monomer selected from a)-b) that provide a structural unit in the copolymer:

a) substituted and unsubstituted monomers derived from the group consisting of thiadiazoloquinoxaline, quinoxaline, thienothiadiazole, thienopyridine, thienopyrazine, pyrazinoquinoxaline, benzothiadiazole, bis-benzothiadiazole, benzobisthiadiazole, thiazole, thiadiazolothienopyrazine, thiadiazoloquinoxaline and diketopyrrolopyrrole, and b) monomers selected from the group consisting of:

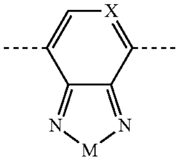

P4: M = S, X = C
P5: M = Se, X = C
P6: M = Se, X = N

-continued

P7

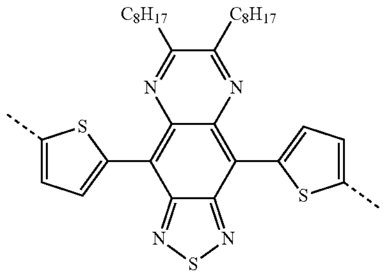

P8

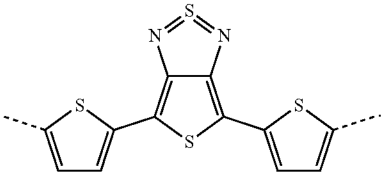

$\pi_s$ represents a conjugated spacer comprising double or triple bonds in a molecule separated by a single bond, across which some sharing of electrons occurs; and n is an integer>1.

12. The polymer of claim 1, wherein the first monomer comprises at least one monomer or oligomer having the formula:

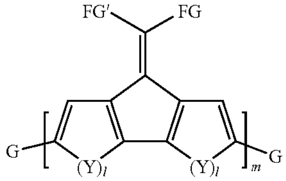

where G is a leaving group suitable for a cross-coupling polymerization reaction, FG is $C_0$ hydrocarbyl;

FG' is selected from the group consisting of substituted $C_6$-$C_{20}$ aryl and substituted $C_3$-$C_{20}$ heteroaryl; and Y is selected from the group consisting of S, $BR^3$, $PR^3$, Se, Te, NH or Si, wherein $R^3$ is a $C_1$-$C_{24}$ hydrocarbyl group.

13. The polymer of claim 1, wherein the polymer is configured for use to tune structural properties, electrical properties, or a combination thereof, of electronic devices and to form improved materials for electronic devices.

14. The polymer of claim 13, wherein the electrical devices are organic optoelectronic devices.

15. The polymer of claim 14, wherein the electrical devices are hybrid organic-inorganic optoelectronic devices.

* * * * *